United States Patent [19]
Geary

[11] Patent Number: 6,070,160
[45] Date of Patent: *May 30, 2000

[54] NON-LINEAR DATABASE SET SEARCHING APPARATUS AND METHOD

[75] Inventor: Wade S. Geary, Salt Lake City, Utah

[73] Assignee: Artnet Worldwide Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/593,487

[22] Filed: Jan. 29, 1996

Related U.S. Application Data

[63] Continuation-in-part of application No. 08/446,202, May 19, 1995, abandoned.

[51] Int. Cl.⁷ .................................................. G06F 17/30
[52] U.S. Cl. ..................... 707/4; 707/3; 707/5; 705/1; 382/149
[58] Field of Search .................................... 395/603, 604, 395/605, 606; 707/3, 5; 382/149; 705/1

[56] References Cited

U.S. PATENT DOCUMENTS

| | | | |
|---|---|---|---|
| 4,999,806 | 3/1991 | Chernow et al. | 364/900 |
| 5,099,426 | 3/1992 | Carlgren et al. | 395/759 |
| 5,241,671 | 8/1993 | Reed et al. | 707/1 |
| 5,263,126 | 11/1993 | Chang | 395/51 |
| 5,379,366 | 1/1995 | Noyes | 395/54 |
| 5,379,420 | 1/1995 | Ullner | 707/6 |
| 5,384,894 | 1/1995 | Vassiliadis et al. | 395/61 |
| 5,544,256 | 8/1996 | Brecher et al. | 382/149 |
| 5,634,051 | 5/1997 | Thomson | 395/605 |
| 5,884,272 | 3/1999 | Walker et al. | 705/1 |

*Primary Examiner*—Thomas G. Black
*Assistant Examiner*—Charles L. Rones
*Attorney, Agent, or Firm*—Brown Raysman Millstein Felder & Steiner LLP

[57] ABSTRACT

A method and apparatus for creating, storing, identifying, transferring, managing and searching databases of information related to subjective works, such as art, music, film, dance, theater or other fields generally recognized as requiring subjective human judgment by an "expert" to make subjective, objective, or mixed decisions regarding value, interest, and relationships one to another. The invention may be embodied in a general purpose digital computer programmed to host routines operating by deterministic logic, fuzzy logic, or both. A user may input information related to the nature or type of item requested and receive identification of a subjective match for the item. The routines may utilize a thesaurus and processes for relaxing search requirements to assure a match. In one embodiment, an expert system resident in a computer may create, manage and rapidly search databases of subjectively characterized items, such as art works, music, or real estate, for example, by unique characteristics. The invention may include a method for securely transmitting data corresponding to a result, to prevent storage by a recipient computer. For example, an image may be represented in a self-executing, self-destructive, standard 7 bit ASCII text E-mailable packet without attachments.

33 Claims, 33 Drawing Sheets

NON-LINEAR DATABASE SET SEARCHING APPARATUS AND METHOD

This application is a continuation-in-part of application Ser. No. 08/446,202, abandoned on Apr. 1, 1996.

BACKGROUND

1. The Field of the Invention

This invention relates to programmable digital computers and, more particularly, to novel systems and methods for programming computers to host databases and search engines for rapid storage and retrieval of information relating to non-deterministic or subjective data sets, such as art works, using both discrete and fuzzy logic to complete the searches using the search engines.

2. The Background Art

Art works, used in this description as an example of non-deterministic or subjective data sets, are created, bought, sold, brokered, stored, displayed, and otherwise moved in commerce throughout the world. Each piece of art is unique. Age, condition, artist, style, and a host of other factors serve to distinguish each piece of art. Albeit some prints may be very similar to other pieces of art, each piece has its own history and condition and, therefore, is unique. A serious difficulty for art collectors is locating works of art desired to complete collections, add a theme, match a decor, or to meet a fancy.

Printed catalogues of art work are sometimes produced by galleries and publishers of art works. Moreover, certain encyclopedias and indices exist for cataloging certain known works of general interest. Also, as with most collectable objects, art works may be listed according to condition, value, artist, or even individual piece, in various collector pricing guides.

The problem remains that an art collector or an ordinary purchaser (retail customer, wholesale buyer, etc.) cannot reliably locate a piece of art. Similarly, an individual seller cannot easily make available a work of art for sale. Moreover, art purchases are largely limited to individual transactions between individuals speaking face to face. For certain widely published works, art brokerages were developed to facilitate purchase and sale of art works. Unfortunately, the ability to track and locate works on demand is largely absent without a substantial investment of manual labor. A certain serendipity is often required, and generally dependent upon the written catalogues and individual contacts which are available to the individual person seeking a piece of art work.

In that various databasing techniques exist, a host of commercial products provide database systems for organizing information. However, the construction of a data structure for an individual database is still largely dependent upon a user's individual needs. Currently, a convenient system for databasing art works is not readily available.

Similarly, search systems and indexing systems exist for documents. However, those search engines typically index every word in a document. Such systems typically have particularly severe restrictions on the methods of search, the flexibility of the search, and a requirement for absolute matches between words sought. The current versions of many of the document storage and retrieval software for indexing text are not readily applicable to art works.

Art, by its very nature, is not easily categorized in absolute terms. Moreover, the lines between different categories of art work are not necessarily distinct in every case.

Thus, a search system is needed for searching art works in such a way that a customer may locate an art work according to limited information. For example, a customer may only have an artist's name. Alternatively, a customer may only know that a certain style is appropriate and that certain artists may have art works of the desired style. Similarly, a customer may have a specific, previously seen, art work in mind but not know either the author's name or the name of the work. Thus, it is desirable to create a system that can use an expert's knowledge to search for art works. What is needed is a system for doing an indexed search, to the extent that such a search is feasible and useful, capable of using an expert system for searching based upon an art expert's opinion, and capable of operating using "fuzzy" logic which does not demand absolute mathematical precision in searching. It is also desirable to have a system that could learn, by continually being updated from the experience of users of the system. To facilitate such searching, a method for databasing and indexing selected information about art works is also very desirable.

BRIEF SUMMARY AND OBJECTS OF THE INVENTION

In view of the foregoing, it is a primary object of the present invention to provide a search method and apparatus for conducting both a deterministic search and a fuzzy logic search of databases, and to provide for high speed searching of databases identifying important parameters related to works of a non-deterministic, subjective nature which are generally recognized as requiring a human who is trained as an "expert" in a specific field to use that expert knowledge to make judgments about these traditionally subjective subjects. Art, in this case is used as an example of a non-deterministic or subjective data set, which would require such a system, particularly when a prospective purchaser may mis-identify or not be able to identify properly certain information in a database relating to such subjects.

It is another object of the invention to provide for a thesaurus of terminology and an expert system that can provide expertise by a digital computer for locating such non-deterministic works, particularly art works.

It is another object of the invention to provide creation, management, and rapid searching of databases identifying art, or other non-deterministic data sets, from a large number of sources.

It is another object of the invention to provide a system adaptable to continued learning and thus easily programmable to add realistic knowledge to an expert system hosted on a digital computer.

Consistent with the foregoing objects, and in accordance with the invention as embodied and broadly described herein, an art searching method and apparatus is disclosed in one embodiment of the present invention as including a plurality of databases containing information relating to potential publishers, buyers and sellers of art works, artists, specific art works, customer purchasing and billing statistics, market statistics, and marketing information.

In one embodiment of an apparatus and method made in accordance with the invention, a series of search engines is programmed for running on a digital computer. The search engines may rely on both deterministic and fuzzy logic. Search terms may be adapted by methods such as exchanging them with synonyms, truncation, swapping information between fields searched, searching by key words, use of complex indices to rapidly move between different databases, and to broaden the scope of a search and to find elusive relationships between otherwise unrelated fields in different databases, and to selectively ignore or modify search terms that narrow a search excessively.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 32, is not intended to limit the scope of the invention, as claimed, but it is merely representative of the presently preferred embodiment of the invention.

The presently preferred embodiment of the invention may be best understood by reference to the drawings, wherein like parts are designated by like numerals throughout.

Figure 1:
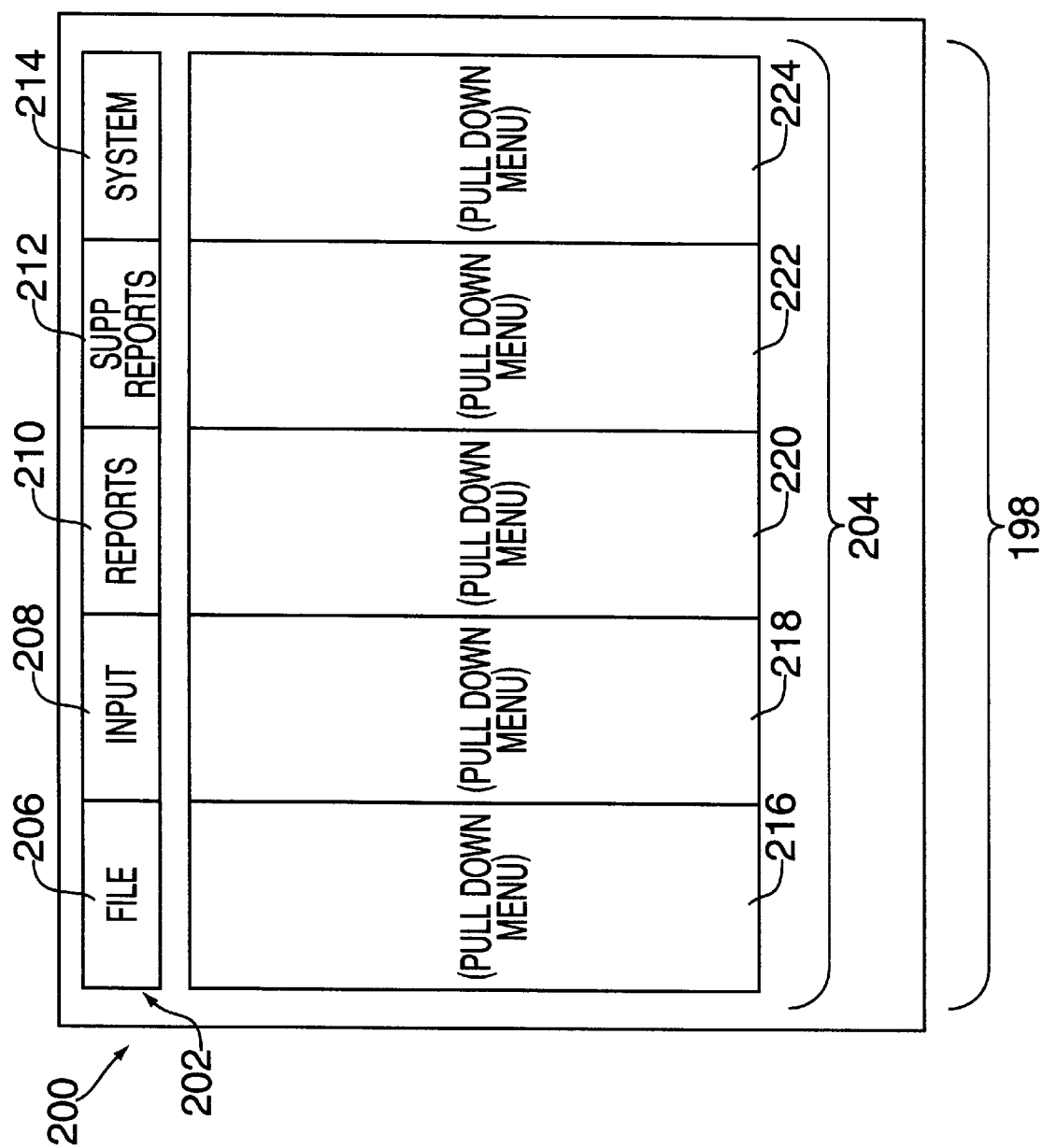
FIG. 1 is a schematic diagram of a screen illustrating the menu selections for accessing routines programming a computer to search for art works.
Figure 2:
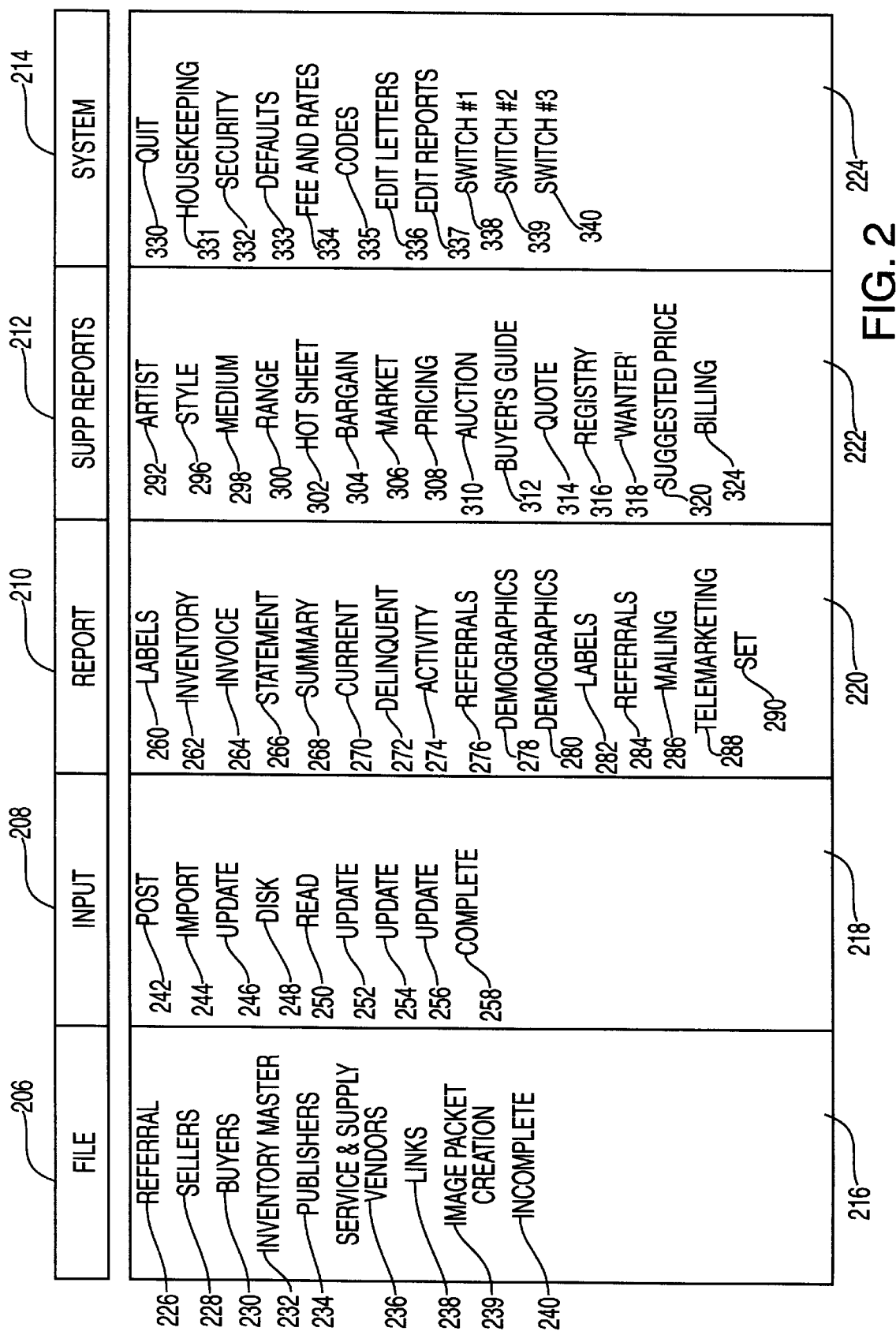
FIG. 2 is a detailed view of the menus of FIG. 1.
Figure 3:
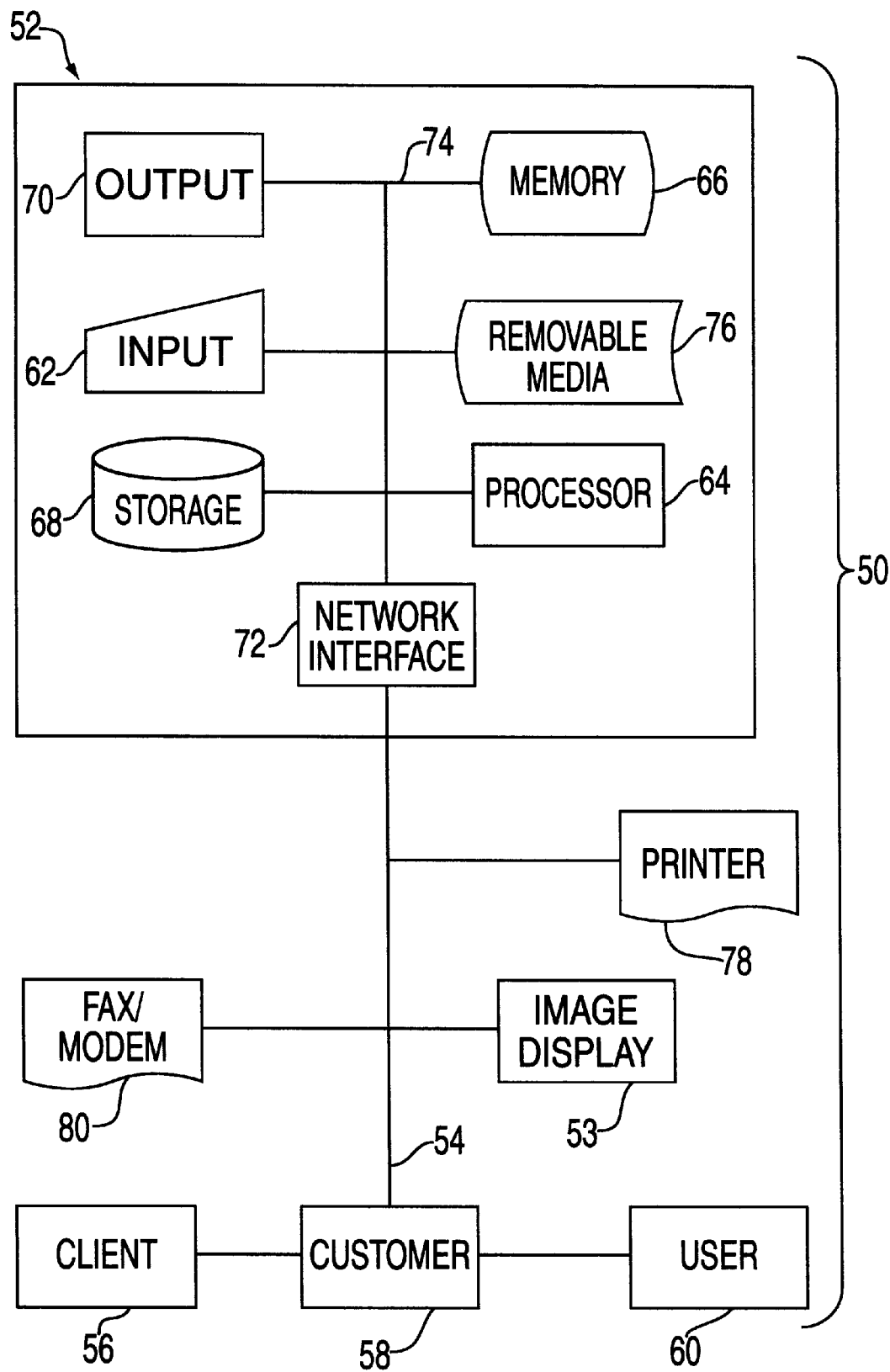
FIG. 3 is a schematic block diagram of the hardware components for using the menus of FIG. 1 to search for art works.
Figure 4:
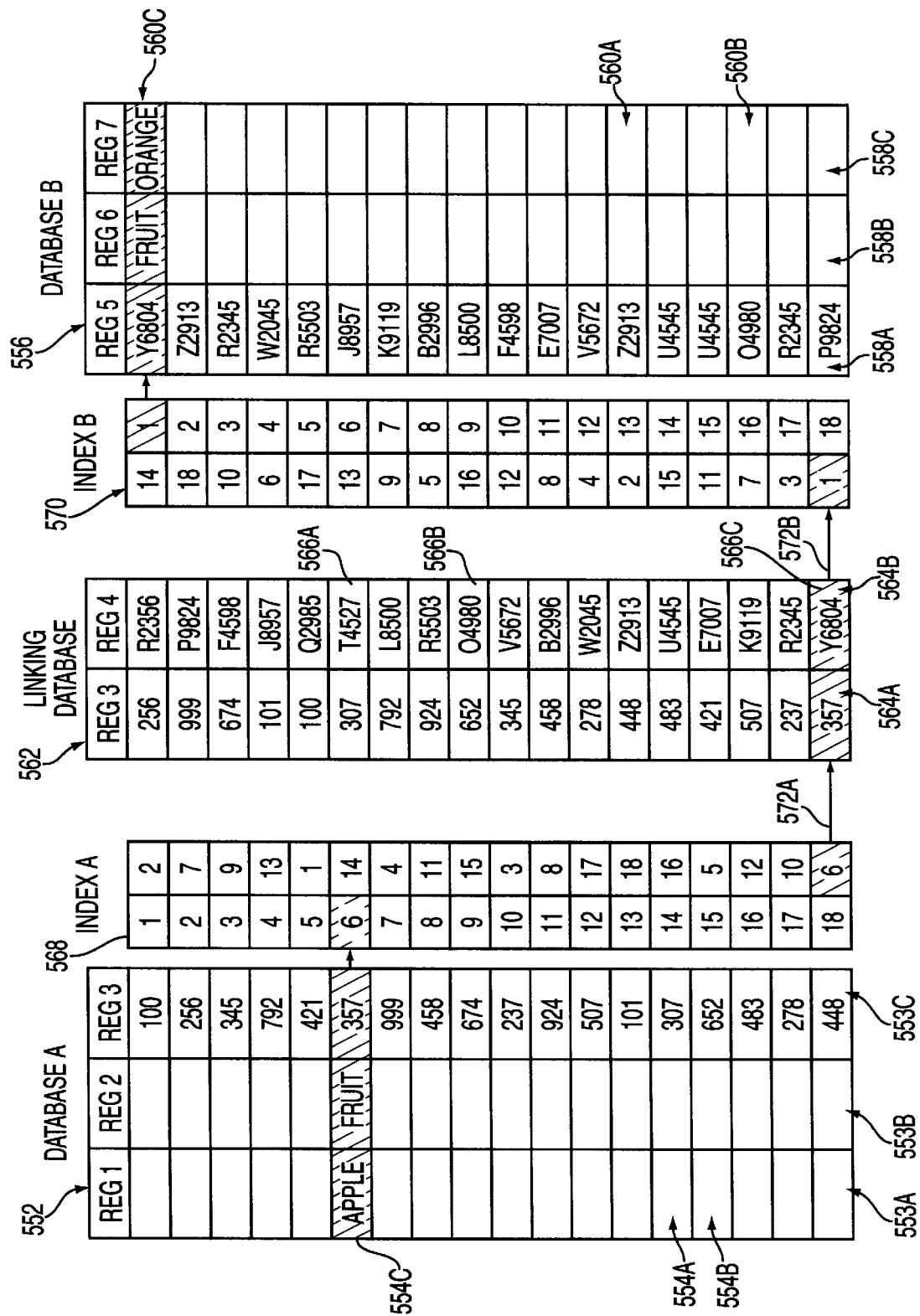
FIG. 4 is a schematic diagram of a database structure for linking databases in the system of FIGS. 1–3.
Figure 5:
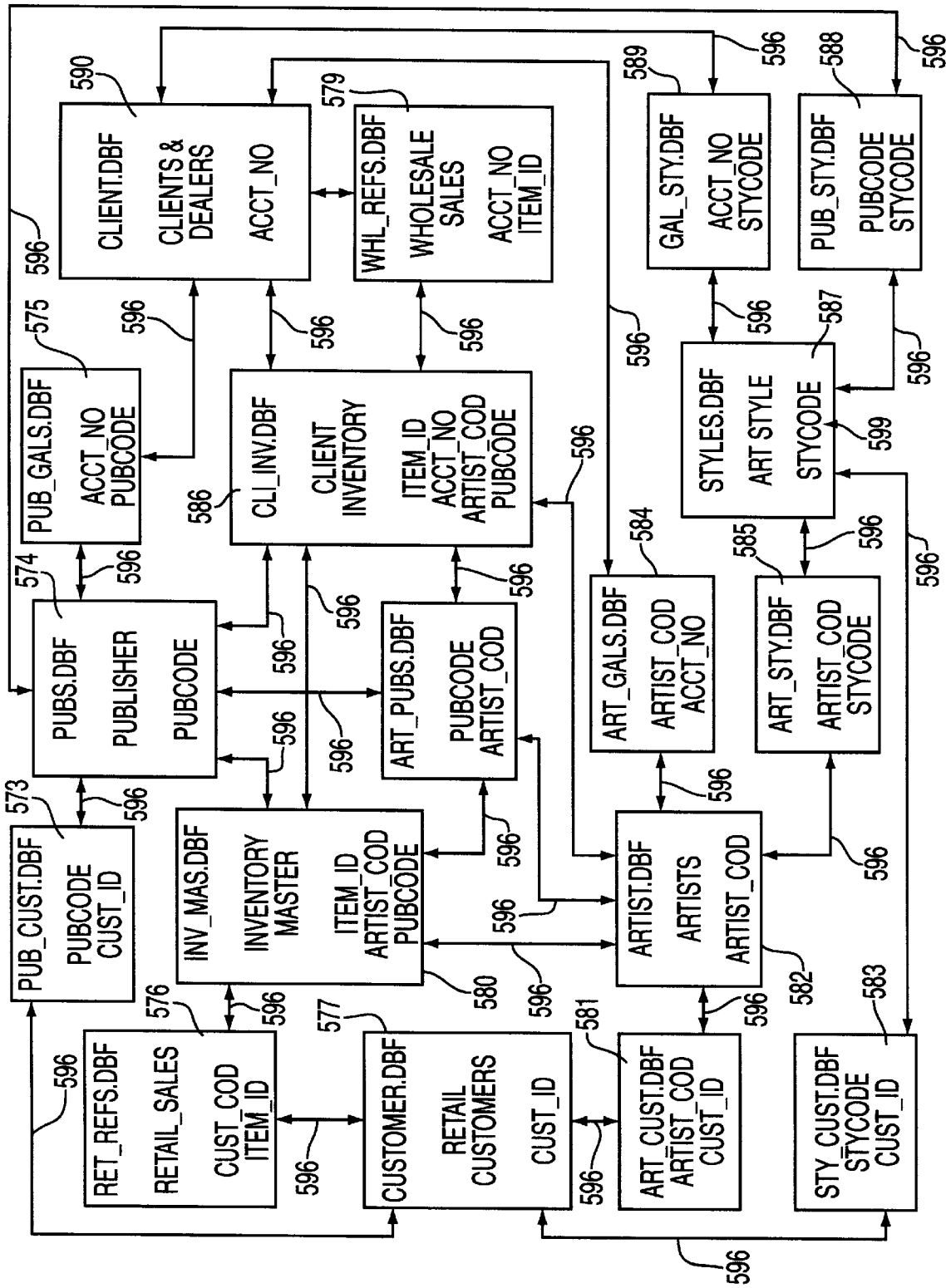
FIG. 5 is a schematic diagram of the databases and the linking therebetween for the system of FIGS. 1–3.

Reference is next made to FIGS. 6–32, which illustrate in more detail one preferred embodiment of a schematic diagram derived from the apparatus of the block diagram of FIG. 3 programmed with the menus and routines of FIGS. 1–2 to create, manage and search the databases of FIGS. 4–5. Those of ordinary skill in the art will, of course, appreciate that various modifications to the detailed schematic diagrams of FIGS. 2–32 may easily be made without departing from the essential characteristics of the invention, as described in connection with the block diagram of FIG. 1–5 above. Thus, the following description of the detailed schematic diagrams of FIGS. 1–32 is intended only as an example, and it simply illustrates one presently preferred embodiment of a schematic diagram that is consistent with the foregoing description of FIGS. 1–5 and the invention as claimed herein. The various functional blocks of FIGS. 1–5 are outlined in FIGS. 6–32 and are numbered with like numerals.

Referring to FIGS. 1–5, and more particularly to FIG. 3, system 50 may be configured in accordance with the invention to include a computer 52 connected to a network or inter network 54. In an alternative embodiment, the computer 52 may stand alone, with a user operating directly on the computer 52 of the system 50.

A client computer 56 may also connect to the network or inter network 54. The network 54 may be a local area network, but may also be configured to include wide area networks. Moreover, an inter network between multiple area networks may also serve as the network 54. Networks or inter networks 54 may be utilized by the system 50 to transmit text, images or other information in a secure or public fashion to the image display 53 (monitor, etc.), user system 60, the customer system 58 or the client system 56. The client computer 56, customer computer 58 and user computer 60 may have access to service the needs respectively of clients listing works, customers seeking art works and users operating the system 50 to conduct searches, update databases, operate the administrative functions of the system 50, and so forth.

In one presently preferred embodiment of the present invention, a client and a customer may access a user operating directly on the system 50 at the computer 52. The computer 52 may include an input device 62 for providing data to the processor 64. The computer 52 may also include a memory device 66 for temporary storage of applications (programmed, executable files) as well as data used by the processor 64. A storage device 68 may be included in the computer 52 for long term, non-volatile storage of applications and data. An output device 70 may include monitors, printouts or other devices. Such output may alternately be directed to a network or inter network 54 to facilitate "off line" information access by users not directly attached to the system 50. Images and other information may be directed to a user's monitor for "off line" viewing via the image display 53. Since a network interface 72 connects the computer 52 to the network 54, results may be output to any of the computers 56, 58, 60 over the network 54, as well. The results transmitted to the image display 53 in such a fashion may include data and software to control, protect and present results. Similarly, in one preferred embodiment, the system 50 may permit the computers 56, 58, and 60 to send input to the computer 52. A bus 74 may connect the input device 62, processor 64, memory device 66, storage device 68, output device 70 and network interface 72 to one another, and to a removable media device 76.

For reasons of computer security, as well as various incompatibilities existing between various computers 52, 56, 58, 60, removable media such as electromagnetic diskettes may be associated with a removable media device 76 for receiving inputs and providing outputs to the computers 52, 56, 58, and 60. A printer 78 and a fax/modem 80 may be connected to the network 54. Alternatively, the printer 78 and fax/modem 80 may be connected to the bus 74 as a part of the computer 52.

The system 50 may be configured to a host in the computer 52 to provide a program 200 comprising instructions for configuring the computer 52 to store, retrieve, search, and otherwise provide information regarding art works. The program 200 may be configured to include a menu bar 202 displayed on an output device 70 (such as a screen 198) of the computer 52 or on one of the computers 56, 58, 60. The menu bar 202 may include pull down menus 204. For example, a file block 206, an input block 208, a report block 210, a supplemental report block 212, and a system block 214, may form the menu bar 202. Each of the blocks 206, 208, 210, 212, 214 may correspond to a pull down menu 204.

The pull down menus 204, include a file menu 216, an input menu 218, a report menu 220, a supplemental report menu 222, and a system menu 224. Selection of the file menu 216, by a user provides access to routines for referring prospective buyers (customers) to prospective sellers (clients). Selection of the referral 226 from the file menu 216, provides searching capability in a variety of databases, by a variety of search methods, by a user seeking to find a work for a customer located in a client's inventory. In addition, the referral 226, may be selected to do numerous types of searches using a host of indexes across a series of databases.

The file menu 216 may also include menu selections for sellers 228, buyers 230, inventory masters 232, publishers 234, service and supply vendors 236, links 238, and incomplete referrals 240. A user may make a selection from the file menu 216 by any of several conventional means, including the clicking on a mouse, moving a cursor with a scrolling key on a keyboard, a touch screen, a button object on the screen, or the like through any input device 62 so configured. The file menu 216, thus may give access to a user for accessing the databases identifying search strategies, search engines, and their related databases in the storage device 68 or memory device 66 by selecting the referral 226 entry on the file menu 216. Similarly, a user may access for information or maintenance, a database of all potential sellers of art works, whether dealers, museums, galleries, collectors, etc., by selecting the sellers 228 entry in the file menu 216. Potential buyers may be identified in databases accessible to a user by selection of the buyers 230 entry in the file menu 216. Databases associated with an inventory master database may be selected by using the inventory master 232, while databases of publishers of art works may be accessed by the publishers 234. Vendors of supplies such as framing, art supplies, and related services, that an artist, purchaser, or seller may need may be identified through a database accessible through the service and supply vendors 236 by entry in the file menu 216.

Various databases may be created for the purpose of providing links or binding between particular fields of interest in different databases. A user may access these databases of binding information for maintenance or use by selection of the art links 238 entry. The image packet creation 239 may allow a user to create "E-mailable" ASCII files which, when received by a user, can be executed to display a multi-media presentation of available artworks in the form of an advertising presentation, sales presentation, etc. to an image display device 53. Such packets may be created in such a way as to not require a recipient to have any particular software and/or hardware in order to display the presentation on the image display device 53. In such an instance, the image display device 53 may be simply a VGA or SVGA or other high-resolution monitor connected to the client computer 56, the customer computer 58 or the user computer 60 attached directly or indirectly to the network or inter network 54 via the standard ASCII text (7 bit) E-mail system of any type.

Additionally, a customer who has requested an art work which was not available by a user conducting a search using the referral 226 selection, may nevertheless be provided with a potential seller of the requested work at a later date. Thus, a user may, through the incomplete referrals 240 selection in the file menu 216, provide information to a potential buyer regarding the availability of the desired work of art.

An input menu 218 may include several entries for conducting transactions with clients and customers. For example, a post 242 may post transactions manually to a client inventory database. An import 244 and update 246, in addition to a disk 248, read 250, update 252, update 254, update 256, and complete 258 may support the input and output of information passing from clients to users to customers.

The post step or post menu entry 242, or simply post 242 from the input menu 218, one of the pull-down menus 204 may mark transactions by year, month and day. Also, a transaction may be coded. The individual transaction code characters may be used to indicate the nature and status of the transaction. For example, "A" may indicate that the charge may be automatic and may be charged automatically to a credit card. In addition, the letter "P" may indicate that a payment has been received. Thus, a check which was received in advance would be posted as a "P" payment.

The "F" may indicate a fee. Fees marked by "F" may indicate that fees have been posted by hand by a user. "S" may indicate a special fee posted by the computer. For example, a fee may be generated automatically for subscription costs, if subscriptions are opened and continue until closed by a user. A "B" may indicate a renewal fee, which may also be generated automatically by the computer. Further, notes may be input for reference by a user. The user may input notes, but not show them on a statement. Similarly, a "B" may indicate billing. "B" may be a record of a billing and need not effect the transaction. It may merely record the information that may be sent out on a billing statement, having no affect on the cost of the subject transaction. The transaction code may be used to enable the system 50 to process such things as statements, billings, letters, renewal notices, delinquent and collection notices, and the like.

The import 244 entry may be used to import information into the databases of the system 50. Information may be imported from a file, a keyboard in which the information has been input by key stroke, an optical character recognition program reading an image, or the like. Information may be imported by the use of a text file or a rich text file or any suitable mechanism known in the art. After the use of import 244, a user may label columns in imported documents and link the data contained therein to a field in one of the databases of the system 50. Thus, imported data may be linked to an artist, publisher, and so forth, even if not imported in a form automatically recognized by the system 50.

A client database may actually be a list of more than just subscribers or even clients, but rather of all known art dealers, artists, museums, collectors and the like. In addition, a status code may tell a user whether or not a gallery may actually be a subscriber. For example, data may be imported from standard indices, directories, and catalogues provided by third-parties. Included in these catalogs and directories may be lists of galleries and dealers who deal with a specific art style, artist or publisher's works.

The import 244 routine or process may read a text file and break the text file text into fields which are then stored in a database. Thus, this input routine 244 may convert the text input file to a database. The import 244 process need only look at a column of text data and identify to the database what fields the entries in the columns should be assigned to.

The inventory routine may be provided to a client with a screen identical to that of the main user. Thus, a client desiring to input an inventory list may access the same screen, receive the same prompts, and create a database listing of all of the art in an inventory of the client. However, all titles, artist, gallery, museum and publisher information may be linked. Thus, any time one of these pieces of information occurs, such as, for example, an artist, each art work item may be given a unique item identification code, each artist may be given an artist code, and each publisher may have a publisher code input. Thus, any time a work is identified in a database, it may have an individual item ID code, as well as an artist ID code, and publisher ID code in order to be found in a database and located physically, as in the case of a customer (uniquely identified by an account number) seeking to purchase a work.

Linking may be done automatically by the system. The import 244 routine may first search for an artist's name, trying to match the artist's name that was input by a user for a client or by a database that was imported. The routine may first search for a proper artist match based on an exact match. If an exact match is not found, then the search engine may degrade the search to look for the closest match. The artist database may be searched first to find an exact match or the closest match for a newly input artist's name. The artist's name may be set by the routine, and the routine may begin to look for titles. The same process may be repeated for titles, first looking for an exact match and then for the closest match that would logically be the proper title.

The next database field to be searched may be the edition type. The type of the work may be a separate field. Thus, the type field may have an identifier indicating that it may be a print, a painting, a sculpture, cel art work, or may have similar identifiers. Numerous edition codes may be used to specify specific pieces of art (for example, prints), which may vary in value according to the nature of the edition. A link routine may next try to create a link with an edition type, following a linking of edition type. In some cases, for example when a work is an original, the edition type may simply be selected to be the medium. For example, a painting may be an oil, acrylic, or the like and may be on masonite, canvas, or some other underlying material. Similarly, a sculpture may be done in marble, bronze, or acrylic. If an artist is not located as a match by the routine, based on the input information, the routine may next display a browse window for a user to select an artist from a list of artists. This list shows all artists, but locates a pointer at the closest artist as determined by the routine. A user may then browse over other artists if the selected artist is not deemed correct.

In addition, every artist may be linked to a publisher. The user may then see a screen that lists the publishers who are linked to each given artist selected by a user. Thus, a user may select a publisher from a list of known publishers of an individual artist's work. On the other hand, if a user is persuaded that a publisher listed by the input data received from a client is incorrect, then a user may input a new publisher who carries the works of the listed artist.

In addition, every artist may be linked to a museum. The user may then see a screen that lists the museums who are linked to each given artist selected by a user. Thus, a user may select a museum from a list of known museums having an individual artist's work. On the other hand, if a user is persuaded that a museum listed by the input data received from a client is incorrect, then a user may input a new museum who displays the works of the listed artist.

Once the import 244 process has updated inventory from files received, it may thereafter link the title, artist, publisher and edition type for the work input. The disk 248 routine or process may not only provide to a requesting client a listing of the client's inventory, but provide also to the requesting client a copy of the ACIUM program, which permits the individual client to update a list of their inventory, to create a listing for themselves, and to maintain that listing for their own use. The disk 248 process provides a reconciliation list of all the inventory as known by the user for an individual client. Thus, by use of another routine, the client may update for the user the inventory of the client based on errors found between its known inventory and the reconciliation list provided by the user.

The read 250 routine may read data from a diskette of inventory data from a client, while the update 252 routine may prepare a new copy of the code (ACIUM) for return to the client. The update 252 routine may be used to make a copy of the latest code for a creation tool (ACIUM) used by a client to create database information for submission to the user. If the databases of the client are outdated, that is, the data structures are no longer those used by the program, then the update 254 routine may update those data structures by downloading information to the user.

The update 254 may open all databases corresponding to a client and verify that the correct fields exist. If the correct fields do not represent the data structure of the current ACIUM program, or are not usable by the current ACIUM program, then the user may return to the client a new copy of the ACIUM program accessing the correct database fields.

Moreover, the user may invoke the update 254 routine to download to the client the database as maintained by the user, and containing the newly received data from the client in the new, correct database formats. That is, the database information, although saved by a client in outdated field formats, may still be uploaded by the user and returned in the proper format to a client.

The update 256 routine may permit a user to deny entry of "suspicious" data into a database of the system 50. The word "suspicious," indicates that the system 50 (for example, via a housekeeping routine, or a referral routine) has been tracking all calls for a work and the number of callers repeating requests for the same item, or repeating referrals to a specific item. If a high rate of calls detected for a specific work or if a high rate of calling is detected for alternate works after a customer has been referred to a specific seller of a work, an entry for a work may be deemed "suspicious."

If an individual customer calls repeatedly for a piece, this may indicate that the entry may be incorrect and suspicious, since the customer has not been able to locate the piece. Also, if numerous customers have called for a piece and then each has called back requesting another number, this may indicate that other information in the database may be incorrect.

For example, a customer may call seeking a specific piece of art. The system may provide to that customer the information on where that particular piece of art may be obtained at the lowest possible price. However, if the client calls again seeking that same piece of art, then something in the database may be wrong. For example, the work may have been improperly listed as framed or unframed when it may be the opposite. In addition, a piece may have other data, such as the price, incorrectly listed, so that when a buyer calls a seller provided by the user, the information may be incorrect, and the sale may not be consummated.

The system may then create a "suspicious" file indicating entries that have appeared because of not moving promptly or receiving multiple calls from a single user or multiple calls by multiple users who have called back about other pieces. Thus, those items or entries which have appeared suspicious to the system and then thereby identified, are checked by input data clerks later to determine whether or not there are errors.

The complete 258 routine permits a user to complete a "wanter." A wanter may be a request for a piece that has been requested by a specific buyer, but no listing has been found within the system 50. For example, it may be the habit of some art dealers to use the system 50 as a resource for finding a piece for a buyer who was already in their shop (gallery). Thus, many subscribers actually are dealers who do not want to turn a customer away who has something specific in mind. As a practical matter, in marketing art, buyers may typically have a specific style, artist, piece (work), or the like in mind before coming to a gallery looking for something of that nature. Thus, a gallery operator may subscribe to the system 50, for the simple benefit of not having to ever turn a customer away. Any customer who has a request, can be satisfied by the gallery owner accessing pieces identified by the system 50. Thus, these types of subscribers may not always list the art in their own galleries.

Thus, when a piece has not been found by searching by the system 50, it may not be economically reasonable to continue searching for a low-cost work, such as a print, for example. Instead, a wanter list may be published periodically to all persons receiving mailings or downloading results from the system 50. Thus, an art dealer who may have an unlisted work may find that it may be wanted, providing an immediate sale for that gallery. Similarly, an art gallery owner may be aware of other galleries or owners within his own area or through which he has networked contacts who have an inventory including such pieces not listed in the database of the system 50. Thus, a wanter list, or wanter sheet, may provide a listing of these pieces and provide an instant sale.

The report 220 may include labels 260 for printing address labels for mailings, inventory 262 for inventory and client listing, invoice 264 for billing, statement 266 for providing current statements to clients, summary 268 for summarizing all receivable accounts, current 270 for reporting current receivable accounts, delinquent 272 for reporting delinquent, activity 274 for summarizing all account activities over a period of interest, including new accounts opened, renewals of subscriptions and the like.

Also, reports of interest may include referrals 276 identifying buying and selling facilitated by the system, demographics 278 identifying size, location, and sales volume of clients whose works are listed by the system.

Demographics 280 may identify customer demographics of buyers by geography, patterns and the like. Labels 282 may prepare address labels for advertising of services, or other labels actually generated and printed to go on outgoing mailings. Labels 282 differs from labels 260 in that labels 260 identifies a list of all labels for the information of the user. Thus, labels 260 may print out a listing of all labeling, and therefore communications outgoing, over a period of time, such as a day or a week or a month.

The report menu 220 may also include an entry that may be selected for referrals 284 for creating a report listing client referral activity rates and success rates in consummating sales. Mailing 286 may be selected by a user for generating leads from a database, based on a variety of decision parameters, such as activity rates and the like.

Telemarketing 288 may be selected for exporting a list of subscribers, while set 290 may permit a user to determine which telemarketing group may be invoked for a campaign. Groups may be selected by demographics, region, buying habits, location, interests, time zone or the like. Such groups represent lists of contacts or "leads" which may be exported to an output device 70 such as a screen, printer 78, or the like, or to a network or inter network 54 in order to facilitate access by a telemarketing organization or firm which may undertake such a telemarketing campaign. In the currently presented embodiment, such telemarketing firm or organization may be present within the company utilizing "in house" telemarketing systems as described above, and management systems which may include information produced directly by the set 290 routine to be used for organizational purposes. For example, the set 290 routine may also provide for various management of information including calendars, planners, logs, scheduling, calling lists, call-back lists, duplicate contact checking and the like.

The inventory 262 entry may also include numerous other features. The system 50 may maintain databases of numerous statistical parameters, such as the retail average, the wholesale average, the wholesale low, second low, and third lowest prices, as well as the wholesale high price. The system 50 may store for later use the daily, weekly, and monthly value for each of these parameters. However, each client may be provided with a published list giving these averages only for some period, such as for example, the previous 30 days.

In addition, the system 50 may use a standard deviation of all works except for a specific work. If the standard deviation of the averages, including the targeted work, is no different than the standard deviation of all works absent the targeted work, then the targeted work may not be figured into averages inasmuch as the targeted work caused too great an aberration in the standard deviation for all averaged prices. Standard deviation evaluation may be done for each piece of art each day. Thus, the routine may be run for every piece of art with and without itself included in the standard deviation, every day. This functional feature of the system is a protection against aberrations. For example, data improperly entered by a client may misrepresent the nature of a work. A plate may be listed as a print, a difference of several hundred percentages in value. Thus, the aberrational plate would not be allowed to depress the market averages for the prints.

Selection of the referrals 276 entry of the report menu 220 may enable a user to track the rate of success and the rate of sale for individual clients (potential sellers) who have works identified in databases, listed with the system 50. Those referrals received may be divided (characterized) by many significant parameters. These may be used to determine a specific referral rate. The number of galleries that submit changes in inventories that were originally listed, indicating that those works have been sold, may provide a rate of sale figure. The number of sales divided by the number of referrals may provide a rate of success. Thus, a seller's rate of success in selling may be maintained. Similarly, a buyer's rate of success may be calculated by dividing the number of purchases by a buyer by the number of requests for pieces.

Certain assumptions may be made in determining buying and selling patterns. If an art work listed in an inventory database of the system 50, has been removed from inventory and has received a referral, then the assumption may be made by the system 50 that a sale was made as a direct result of the referral for the listed piece now removed. If a buyer calls, specifically desiring a piece, and is given a referral, then the buyer may be assumed to have purchased such a piece, since the price quoted is the lowest listed price available. Moreover, if a referral is given for the next higher price for a piece, then the procedure would be equivalent.

However, in the event that a piece is requested, but no suitable piece has been found, then the wanter sheet may include a listing for that piece and an entry may be made when a seller calls identifying the availability of such a piece. In the case of a prospective buyer, who cannot find an inventory with the desired piece, a wanter may be created. Upon receipt of a wanter, a dealer (seller, broker, wholesaler, gallery) may respond to the system 50 that the piece may be available. The user may complete the wanter in a database of the system 50 indicating that the piece may be available for the buyer who desired the piece. The buyer may then be contacted to determine whether the piece may still be desired. If it is, then the user may provide to the buyer and the seller identification for each other and a contact may be made. A dealer may subscribe for a single search, or a dealer may subscribe for annual continued access.

The supplemental reports menu 222, also called simply supplemental reports, may include a number of entries 292–324. For example, an artist report 292 may be selected to identify works available, style, date of birth, death date, country of origin, and the like to uniquely identify an artist. An artist report 292 for a wholesale buyer may also include pricing information in addition to identification of artist. A style report 296 may provide a listing of art works indexed according to styles. Similarly, a medium report 298 may provide a listing of art works according to the type of medium in which they were created, while a range report 300 may identify art works by cost for comparable items. A hot sheet report 302 may include a top selling list for some previous period, while a bargain report 304 may identify art works currently listed by the system 50 at well below market prices. A market report 306 may provide a variety of marketing information according to style, artist, or other parameter of interest to a customer. A pricing report 308 may identify wholesale pricing information available to clients and may be useful as it may include a highest, average, as well as several of the lowest prices listed in the databases of the system 50. For example, the three lowest prices are oftentimes useful to provide a statistically significant sample, and to filter out aberrations in an individual price of a specific piece.

An auction report 310 may provide a listing of auction sales, with pricing information for the specific art works. The buyers guide 312 may print information on artists listed in the databases of the system 50. A quote report 314 may report the statistics identifying average market prices for works by any parameter stored in the database. For example, style, type, artist, size, and various other parameters may effect the value of an art work. Thus, a quote 314 may be printed for purposes of establishing an average market value. A registry report 316 may produce a report identifying art works and information relating thereto which are desired to be maintained in the system even after a work has been sold and would otherwise no longer be listed in inventory databases.

A wanter report 318 may be printed to send to clients so that those clients may fill the request for a specific piece that was not located by using the searches of the system 50. A suggested price report 320 may identify wholesale estimated prices and suggested price 320 for items in inventory. A billing report 324 may be printed for providing a customized report of billing histories or other information relating to client billings.

Each of the reports 292–324 may also be referred to as a report program or as a program. That is, an artist report 292 program creates a report corresponding to artists. Similarly, the suggested price routine 320 creates and provides a suggested price 320 report for consumption by clients.

For example, the suggested price report 320 may provide an estimated retail cost as a function of wholesale costs and may provide an estimated wholesale cost as a function of retail costs. The relationship between these numbers may be developed by an analysis of the style, edition, the rate of escalation of cost and other factors which are available in the databases. It is important to note that such relationships are not, strictly speaking, mathematical, but are, in effect, abstract relationships and vary according to variables which may not be known or readily discernible by the system 50. Thus, in order to ascertain such relationships, a "fuzzy" relationship must be established based upon actual observed ratios of wholesale to retail price, when many different factors are taken into account. The system 50 takes the parameter for style, or if this information may not be available, estimates a style characteristic. The system then references the database to determine what a base ratio for that style of art work may be.

It is assumed that, for purposes of the fuzzy logic system, every style of art, and edition type or medium, has a base ratio. The base may be set by style, and then adjusted according to other parameters of influence. Because of the law of supply and demand, editions which have larger publications (unlimited editions, very broadly distributed limited editions), have a smaller difference between wholesale and retail market value.

A painting, or the like may be treated differently. The system 50 may search for particular pieces of a specific artist's work, specifically the piece in question (e.g. a similar size of a print of a same edition of the same piece by the same artist) for which data may be known for both an actual wholesale and an actual retail. If this information is available in the database of the system 50, then it may be used and the retail to wholesale ratio may be calculated and a fuzzy relationship need not be used. If not, then the system 50 may search by style for a ratio. Adjustments may be made for edition size, edition type, issue date, (the more valuable, typically) and the like.

It is the nature of art prints, for example, that they issue at a certain wholesale value that may be immediately increased by a profit margin to a retail value. The longer a print has been in publication, the higher the value of the print may have become. This trend tends to continue until a maximum is reached. However, after a limited edition print has been available for some time, it tends to have the same retail value as wholesale value, the profit margin then coming from the framing, rather than from a mark-up of the print which has achieved its maximum market value.

The system 50 may determine a market wholesale and market retail value based upon the length of time that a print has been available. The system, may thus provide a suggested retail and a suggested wholesale for prints that have never been listed. Also, the actual averages and lows for individual pieces may be stored in the database as a reference. For the purposes of the estimation algorithm, indices and catalogs that have been imported into the system 50 may be used. These may be used, at least for the purposes of estimation of values, by the pricing 308 routine, although these numbers may not come from the actual user-client database.

The supplemental reports 222 and report menu 220, when accessed, may direct the system 50 to run the routines associated with each menu entry 292–324, and 260–290. The routines 260–290 and 292–324 may then produce output that may be sent to a printer 78 or fax/modem 80 connected to the system 50 to be controlled by the computer 52 or one of the computers 56, 58, 60.

The system menu 224 may include entries corresponding to processes including quit 330, housekeeping 331, security 332, defaults 333, fees and rates 334, codes 335, edit letters 336, edit reports 337, switch 1 338, switch 2 339, and switch 3 340.

The quit 330 routine may be used to exit the system 50 on the computer 52 and return to the operating system hosted by the computer 52. Housekeeping 331 may process data, accounts, transactions, letters, automatic letters, billings, and the like. The security 332 routine may provide passwords, change passwords, protect routines of the system 50 with passwords, access archival files, control deletions from the system 50, perform audits, add and delete users according to authorization, review logs, and the like. The security 332 routine may be heavily protected itself and be only available to very few individual users.

The defaults 333 routine may provide all the default data used by the system 50 to operate in the absence of other inputs. The fees and rates 334 routine may provide a user, having the proper security authorization, the ability to arrange special billing and payment schedules for clients. The codes 335 routine may enable a user to edit or add definitions to telemarketing lists, while the edit letters 336 routine may store all of the standardized letters for dealing with clients, particularly client accounts of those dealers (sellers) and brokers who have art works listed in the databases of the system 50. The edit letters 336 routine may provide standardized letters with access to any field variable in a database of the system 50. Thus, a user may provide a letter identifying specific data from a database, simply by typing in a code and a field name. The edit letters 336 routine may take advantage of links provided between the database of letters, and other databases in the system 50, in order to create mail merges and form letters, as needed. The edit reports 337 routine may function similarly to edit letters 336 routine in that it may allow the creation and editing of standardized reports, by authorized users, with mail merge and form letter capabilities. The edit reports 337 routine may store all of the standardized reports used by system 50 and which may be provided to clients or customers as requested or needed. The edit reports 337 routine may provide these standardized reports with access to any field variable in a database of the system 50. Thus, a user may provide a report identifying specific data from a database, simply by typing in a code and field name. Thus, the edit reports 337 routine may take advantage of links provided between the database of reports, and other databases within the system 50. The switch 1 338, switch 2 339, and switch 3 340 enable a user to move within the shell of an operating system to change applications to any application for which a path may be defined by a user.

Referring to FIG. 4, a database 552 may include a series of fields 553A, 553B, and 553C for containing data, each field 553A, 553B, 553C containing different data bound to data in another of the fields 553A, 553B, 553C by virtue of their relative locations as parts of a single record 554A, 554B, 554C. Similarly the database 556 contains fields 558A, 558B, 558C, and may have more if so defined, bound together in each record 560A, 560B, 560C.

A linking database 562 may be created for linking unrelated information from the databases 552, 556. Each field 553A, 553B, 553C, 558A, 558B, 558C may be identified by a register number 563A, 563B, respectively. The contents of each field 564A, 564B of a record 566A, 566B, 566C of the database 562 may contain reference numbers 563A, 563B, respectively, thus establishing a linking relationship between two records 554C and 560C, by virtue of their linkage by register number, containing no fields in common.

Indices 568, 570 may be created to establish a correspondence (link) between each database 552, 556 and the linking database 562. The indices 568, 570 are active. That is, a relationship has been set, such that moving, for example to a record 554C in the database 552, causes a corresponding move of the pointer 572A selecting a record 566C of the linking database 562. In turn, the pointer 572B shifts to indicate the corresponding record 560C in the database 556. Thus, in a system 50 constructed in accordance with the invention, a single search can identify commonly recorded information in unrelated fields of different databases, without a complete search of each database and a complete cross referencing. The invention thus provides a relatively rapid search, rather than multiple searches and cross-referencing across multiple fields in the multiple databases 552, 556.

Linking files permits the moving of a pointer in a linked file. When the pointer in the linked file is moved on a field, the pointer in the linking file for that field value may be moved likewise. Because the linking file links a field from a first file to a field in a second file, the pointer in the linking file necessarily moves from field to field among linked sets. The system 50 permits the user to move a pointer along a second linked database by merely moving the pointer in the first linked database. That is, through the linking file, the pointers are reset in the second linked file by a method transparent to a user moving along a first variable in the first linked file. Thus, a mapping between a first record in a first linked file and a second record in a second linked file may be accomplished by means of the linking file which permits the pointers to act instantaneously.

Referring to FIG. 5, databases 573–590 that may be created and related for implementing the invention in one embodiment where arrows 596 designate linkages 596 between databases 573–590 by indices. The appendix lists the abbreviated, descriptive, field titles of selected databases 580, 582, 586, and 590, containing respectively, inventory master file, artist information, client (potential seller) inventory-on-hand information, and client information. The field names (found in the appendix) from these databases, 580, 582, 586, and 590 are referenced in the flow charts of selected FIGURES. The reference titles, such as the STY-CODE reference title 599 of the STYLE.DBF 587, indicate field names of the fields corresponding to fields 564A, 564B for storing register numbers in the linking database 562.

Referring to the INV_MAS.DBF which may be a structure for the database of art pieces, an index of indices may include multiple fields of information in a single field. Thus, the information from an artist field, a work title field, a publisher field, etc. may all be included in a single string. Thus, a user may search individual indices, such as a name index or a title index, to find certain record numbers. Likewise, the user may search for other associated information. When a user has found sufficient information to completely request a search of the index fields, then all of the information from the individual database fields required to construct the string which may be searched in the index of indices is all present. The benefit of the index of indices is that a search may be nearly instantaneous as far as processor time. The difficulty may be that the index itself takes a tremendous amount of storage space. That is, to the extent that multiple works by a single artist exist, every time the artist's name appears it must be in a separate record with each individual work. Thus, much storage space may be devoted to what could be saved in a database in a listing of works by a single artist in which a single field identifies the artist's name. Therefore, the index sacrifices storage space in order to get instant retrieval of a specific work identified by the artist's name, the title of the work, and the edition type of the work.

Several indices are used, and in one database, eight indices are used. Also, multiple indices of indices may also be used. Some of the more useful indices include an index of item identification numbers, artist code numbers, publication code numbers, and so forth. By accessing any one of these index values, a user may locate all records having that field content. Each index identifies the records containing that index value in the named field.

The term index of indices may also be referred to as a standard index. Each database has at least one standard index. That standard index includes a list of fields each of which actually contains that data from several fields in the database. For example, the interest of a user may be in finding a match for a record which may be uniquely identified by several key fields. An example may be an artist's name, a title of a work, and an edition type of that work might be combined in a single field. Each field containing an entry comprising the information from the three fields from the main database, would have associated with is an item identification number. Thus, the field associated with each item ID number may be a unique record number.

Referring now to FIGS. 6–28, the flow charts use more-or-less conventional notation. The dashed block (symbol) at the beginning of a routine represents the starting point of the routine of the same name identified in a previous Figure, and in each case, the reference number of the encompassing routine may be applied to the entire routine contained in the block and described by subsequent symbols.

Figure 6:
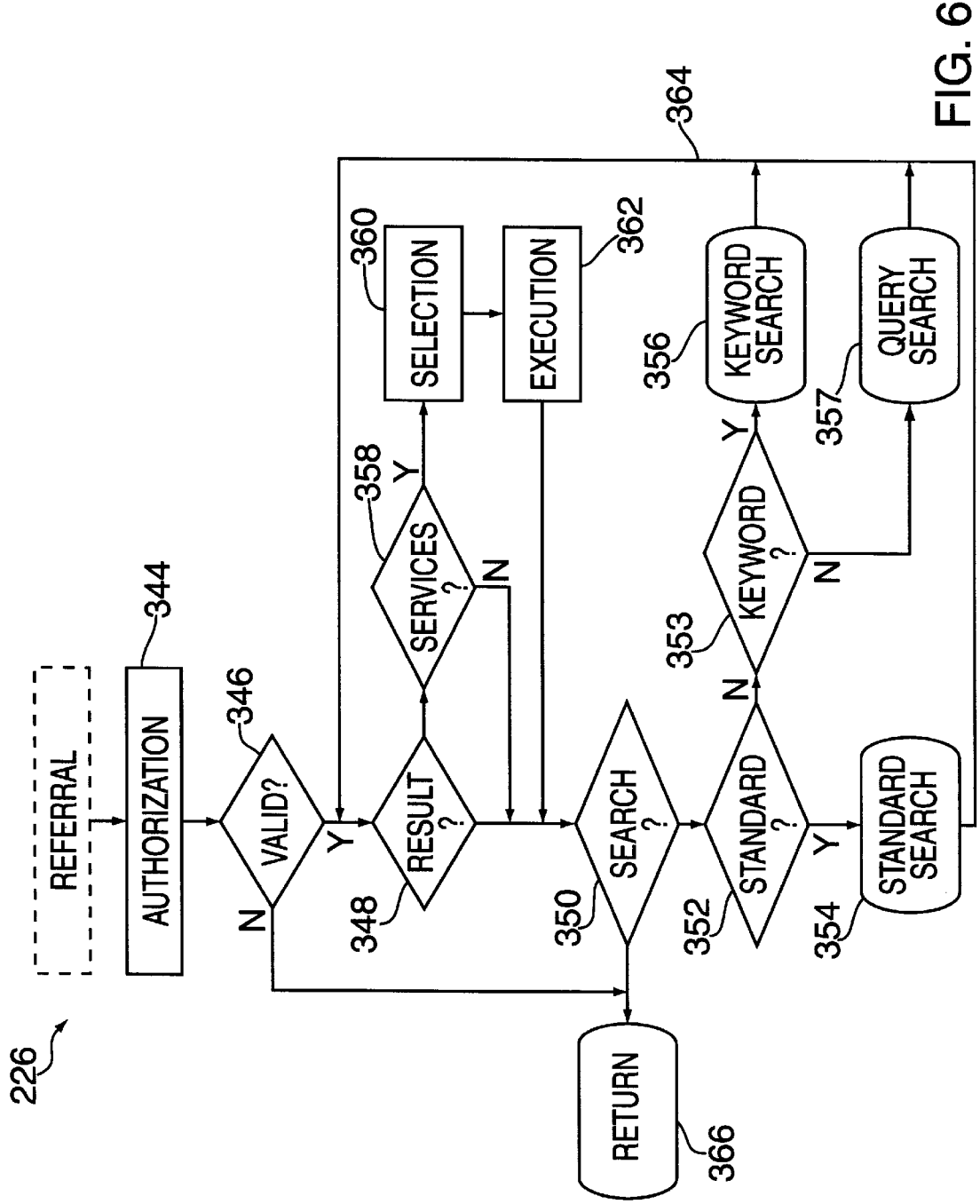
FIG. 6 is a schematic diagram of the referral process for the system of FIGS. 1–3.

The referral routine 226 shown in FIG. 6, also referred to as the referral module 226, or simply as referral 226, first requires authorization 344. The authorization 344, includes a module to receive and process authorization codes received regarding a client calling into a user operating the system 50. The valid decision 346 determines whether the authorization is proper. If the client is authorized to access the system 50, the result decision 348 determines whether a search has been completed for an art work, with the work identified. If no result exists, the search decision 350 may be presented to a user to which a positive response may advance to the standard decision 352. The standard decision 352 and key word decision 353 present the choice of: a standard search process 354 (deterministic) as described in FIGS. 8–11 and 20, which includes the deterministic search engine 404, described in FIGS. 12–19; a standard key word search 356 (linear or simplified fuzzy search) as described in FIGS. 21–32; or a query search (relational or complex fuzzy search) constructed using the query search screen 1400 and process described in FIG. 32. Upon completion, a search may return a user to the result decision 348 again. Once a search result has been obtained, the services decision 358 may present to a user the opportunity to conduct a selection process 360 for selecting one of a number of services to be provided to a client. The selected service may then be executed in the execution process 362, returning the system to a search decision 350 to determine whether other searches are to be done. Each process 354, 356, 360, and 362, may return via a loop path 364 to the result decision 348 until no further searches are to be conducted, at which point the system 50 exits by the return 366. Similarly, if an authorization 344 results in a negative decision for the valid decision 346, the system exits via the return 366 to the main menu 216.

Figure 7:
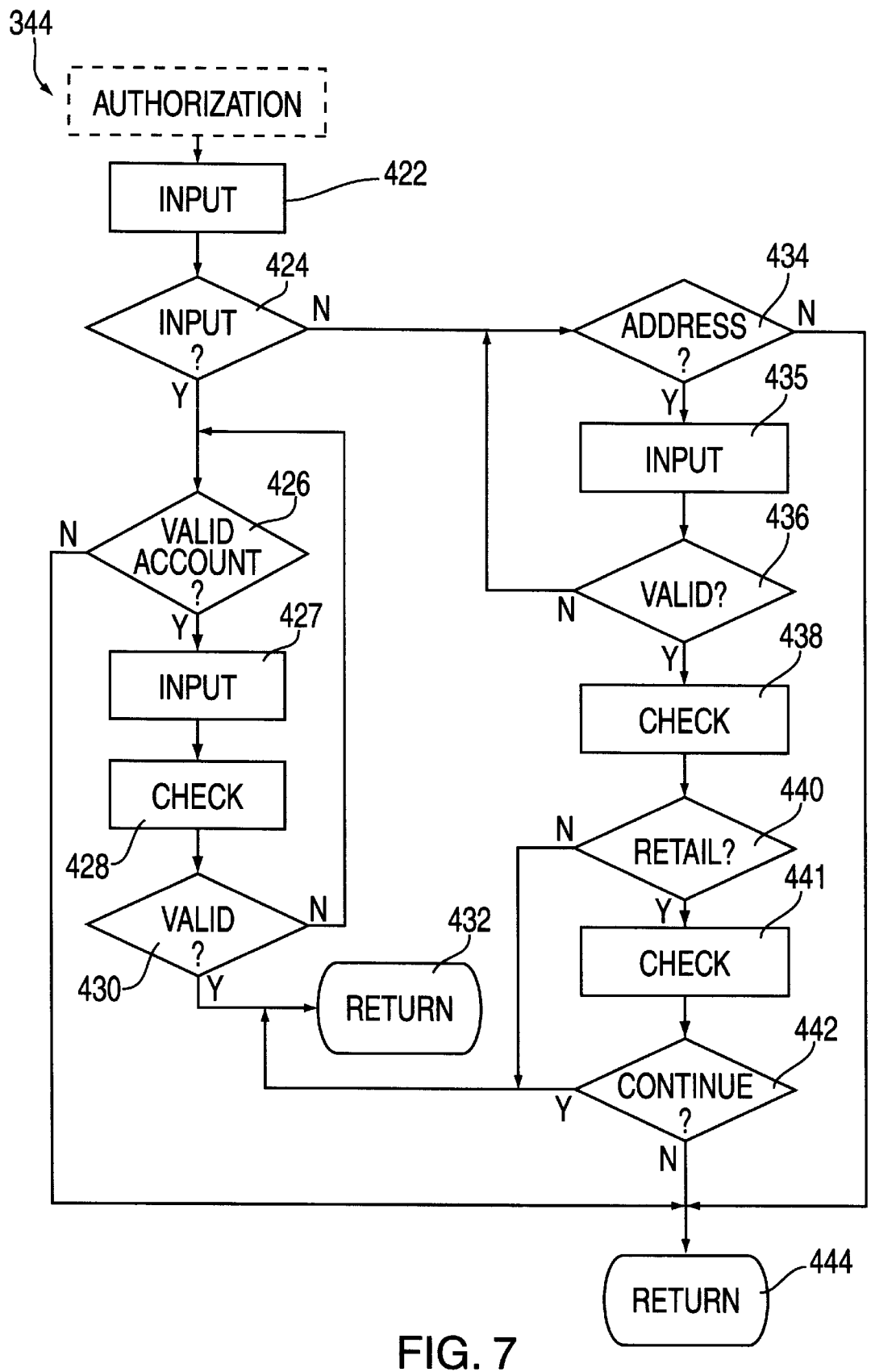
FIG. 7 is a schematic diagram of the authorization process for the system of FIGS. 1–3, and 6.

Referring now to FIG. 7, one may note a dashed line forming a box labeled "authorized" and corresponding to the authorize 344 box of FIG. 6. In general, a dashed line forming a box indicates that the entire figure being described is an expansion of the dotted line box from a previous logic flow chart.

The authorize process 344 includes an input 422 after which an authorized client yields a positive response to the input decision 424 and advances to the valid account decision 426. A valid account results in an input process 427 collecting a client account number, as well as the check process 428 checking the client account in the database. Next, a valid decision 430 yields a positive response to give a return 432 to the system 50. A negative response to the valid decision 430 returns to the valid decision 426.

Meanwhile, a negative response to the input decision 424 advances to the address decision 434 from which a positive response accepts inputs 435, and executes a valid decision 436. A negative response to the address decision 434 sends a return to the system 50 indicating invalid 444.

Meanwhile, a negative response to the valid decision 436 returns to the address decision 434, while a positive response advances to a check process 438 for checking a name, address, phone number and other possible information for matching to a wholesale dealer. Following the check process 438, a wholesale decision 440 continues 442 in response to a negative response while a dealer output 441 process may output a prompt advising a user of any inconsistency. Thereafter, the process continues 442 to return an invalid 444 response to the system 50.

Figure 8:
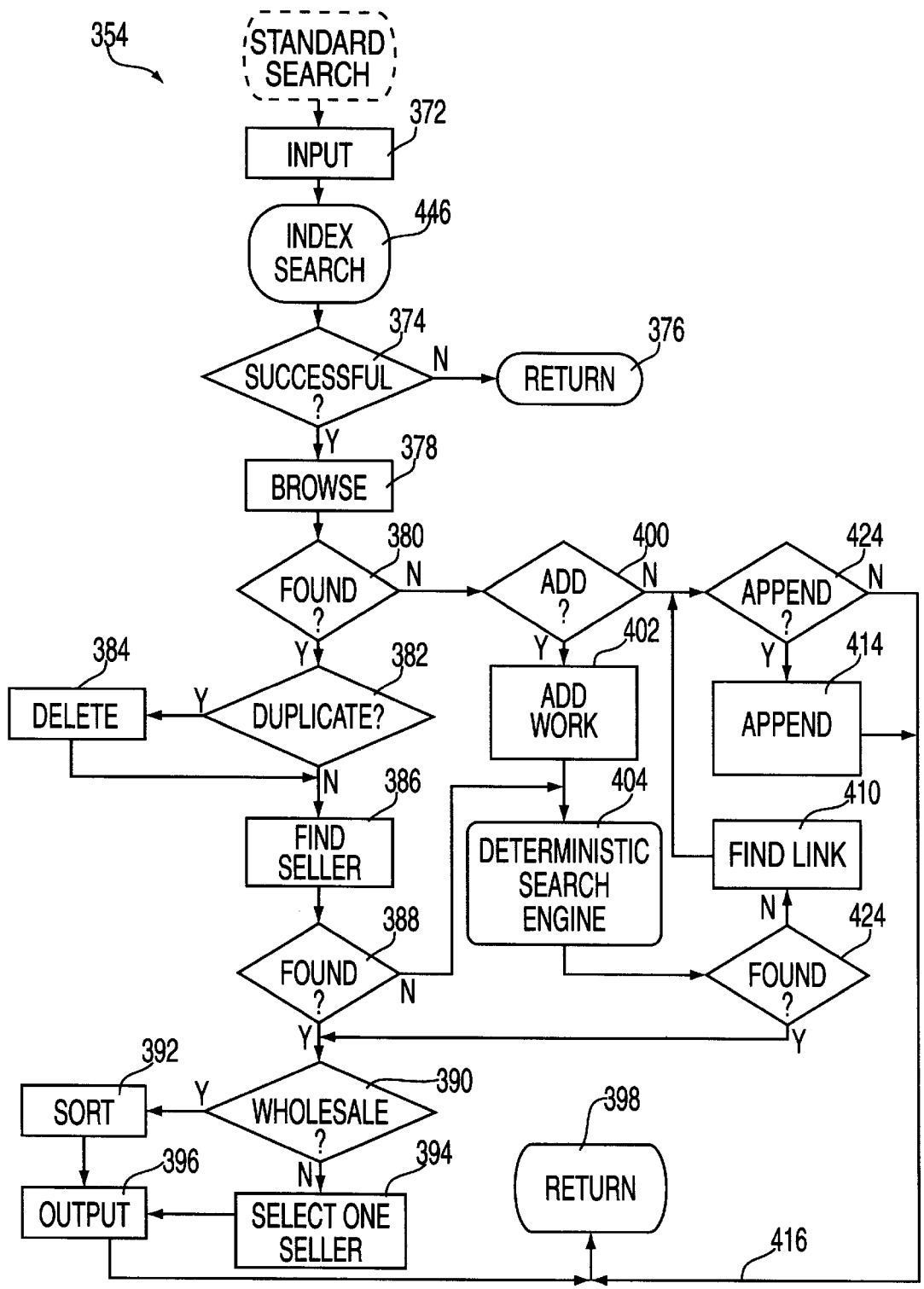
FIG. 8 is a schematic diagram of the standard search process for the system of FIGS. 1–3, and 6.
Figure 9:
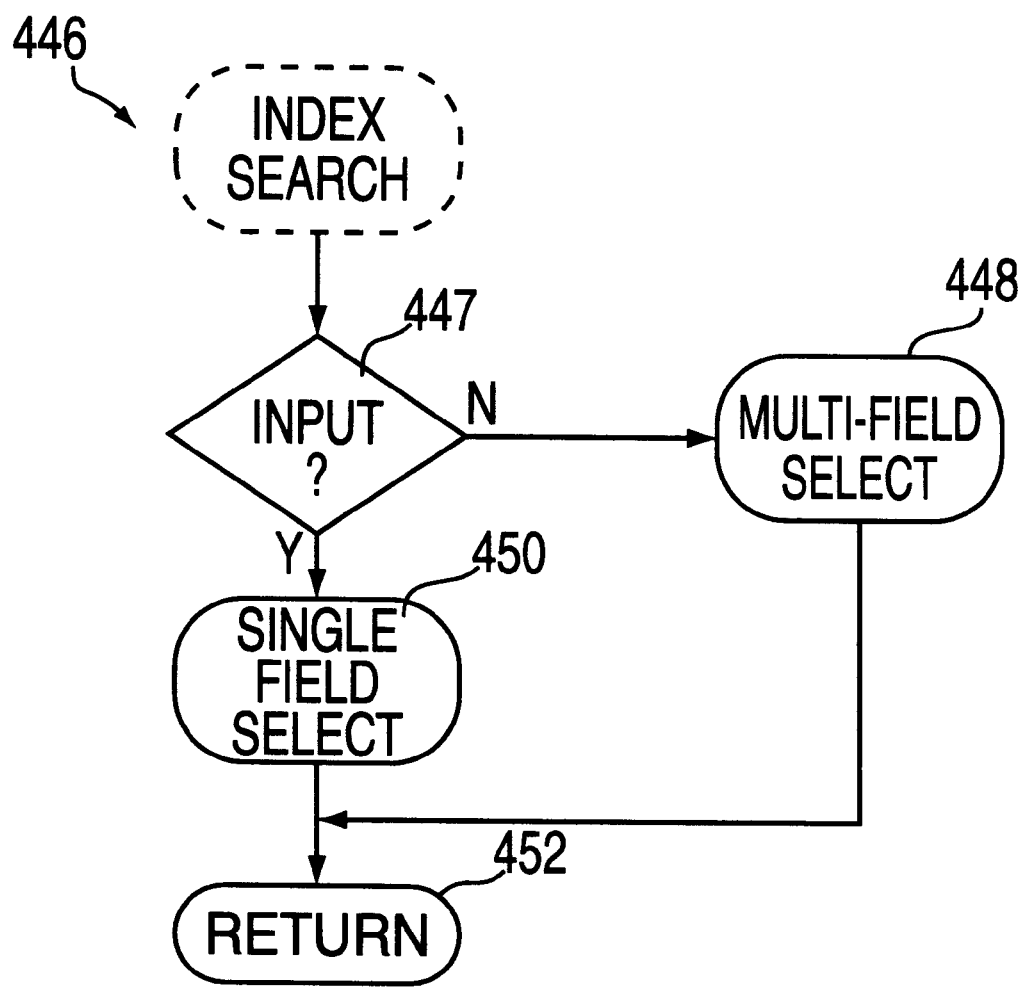
FIG. 9 is a schematic diagram of the indexed search process for the system of FIG. 8.
Figure 10:
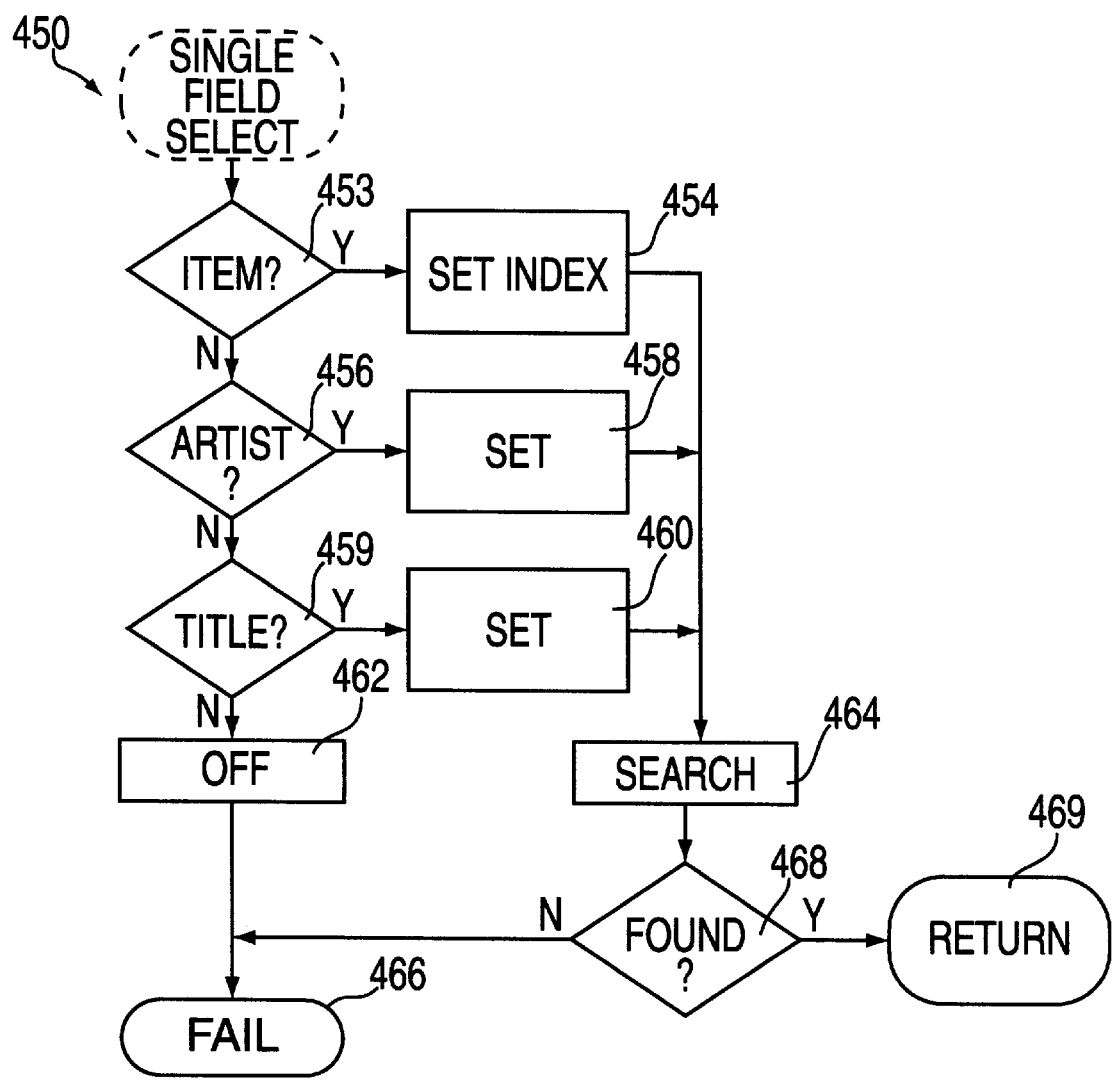
FIG. 10 is a schematic diagram of the single field select for the system of FIG. 9.

Referring to FIGS. 8, 9, and 10, the standard search routine 354, search process 354, or search module 354, provides an input 372, a process by which selected inputs are entered by a user on behalf of a client. Upon completion of the input 372 process, the index search 446 (as shown in FIG. 9) prepares inputs to be used by a deterministic search engine 404. The index search 446 consists of an input decision 447 which yields a single field select process 450 in response to a positive decision output, and a multi-field select 448 in response to a negative output. In either event, a return 452 follows.

The single field select process 450, in FIG. 10, includes several decisions 453, 456, 459. The item decision 453, obtaining a positive response, advances to a set index process 454 setting an index to an item identification. A negative response advances to the next decision 456, a positive response to which executes a set process 458 designating an index setting to an artist's name.

A negative response to the decision 456 results in a decision 459 based upon the title of a work, a positive response to which begins a set process 460 setting an index to the title of a work. Meanwhile, a negative response to the decision 459 executes an off process 462 setting the index to an off position before returning 466 a fail message. In response to the set processes 454, 458, 460 the system 50 may execute a search 464, which, if not found 468, also returns 466 a fail message. A successful search 464 results in a return 469 indicating success.

Figure 11:
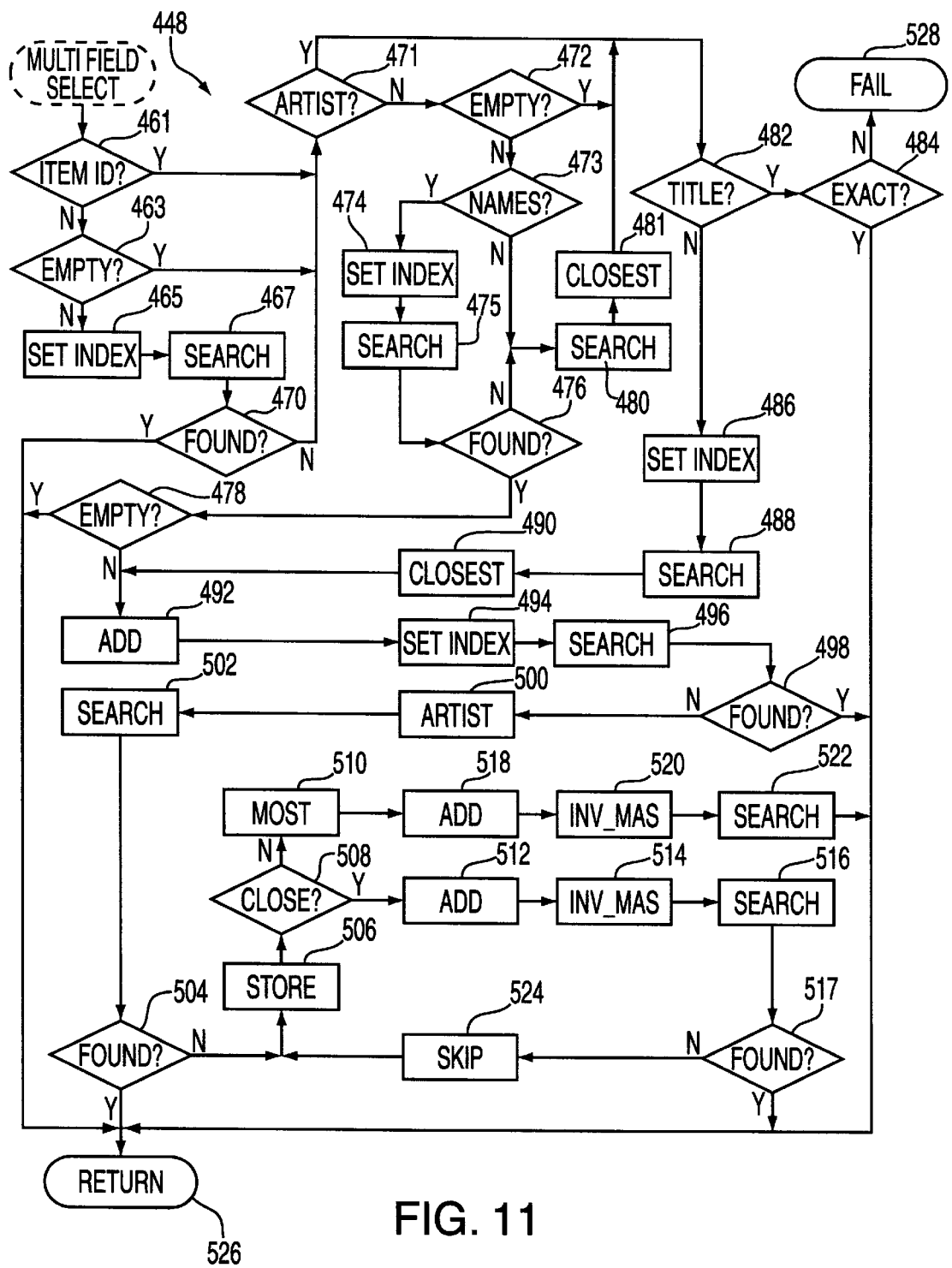
FIG. 11 is a schematic diagram of the multi-field select for the system of FIG. 9.

The multi-field select process 448, shown in FIG. 11, first attempts to identify the requested input for completing the decisions 461, 471, and 482. If inputs supplied by a user are insufficient to generate complete search strings for a compound search index, then the system may generate a search string by a search 467, 475, or 488, or all of them. After a search string is generated from the outputs of individual searches or a complete portion of inputs supplied by a user, a compound index may be searched by a search 480, 496, 516, or 522.

In the multi-field select 448 process as shown evaluates whether or not an item identification has been used as a search criteria, which if it has not, the decision 463 inquires into whether an empty identification location in the database, or inputs, has been found. Again, a negative response advances to a process 465 to set the index to the item identification, after which a search 467 seeks an exact match for the input fields. If an exact match is found, then the decision 470 advances to a return 526 indicating success. A negative response to the decision 470, as well as a positive response to the decisions 461, 463 advances the system 50 to the decision 471 inquiring as to whether a search has been conducted by artist's name. If an artist search has not been done, the decision 472 inquires as to whether the artist field is empty, which, if it is not, advances to the decision 473 as to whether both first and last names are available for the artist. A positive response advances to a process 474 to set the index to the artist's name, after which a search 475 may be conducted to find an exact match. Again, if an exact match is found, then the decision 476 advances to the decision 478 as to whether the title may be empty.

Meanwhile, if the decision 476 yields a negative result, then the process 480 searches for a near match, after which the closest match may be stored 481. Similarly, a negative response to the decision 473 may also initiate a search 480.

Meanwhile, a positive response to the decision 471 or decision 472 advances the system 50 to the decision 482 inquiring as to whether a title has been tried or may be empty, a negative response to either one of which may advance to the process 486 to set the index to the title of the work. Meanwhile, a positive response to the decision 482 advances to a decision 484 as to whether the artist's name may be exact. If the artist's name is not exact, then the process feature returns a fail 528. If the artist's name is exact, then the process returns 526, a succeed.

Meanwhile, if the decision 482 yields a negative result, then the process 486 sets the index to the title of the work, after which the process 488 searches for a near match to the request. Afterwards, a process 490 stores the closest match corresponding to the title, and the process 492 adds the artist and the title to a search string. A process 494 sets the index to some standard search, searching for the compound of the artist and the title after which the process 496 searches for a near match to the search string as currently constituted. If the search process 496 results in a find, then the found decision 498 advances to a return 526 (succeed), whereas a negative result advances to the process 500 which may use the artist database file and set the index to the artist.

The decision 478 may have a negative response as to whether or not a title may be empty. A negative response to the decision 478 advances the system 50 to the process 492 combining the artist and title in a search string.

The process 500, after setting the index to the artist name, completes a search for an exact match in the process 502, after which a positive result, identified in the decision 504 advances to a return 526 (succeed). Meanwhile a negative result to the decision 504 advances to the process 506 which may store the total number of titles located for that particular artist. If the artist name is close to the string sought, then the decision 508 may advance to the process 512 to again combine the artist and title in the search string. If the artist is not close in the decision 508, then the name of an artist with the most titles may be used by the process 510 as the selection of an artist to be combined in the process 518 with the title as a search string.

Similarly, the positive response to decision 508 advances to a process 512 corresponding to the process 518, followed by a process 514 and a process 516 corresponding to the processes 520 and 522, respectively. However, the process 516 searches for an exact match, while the process 522 searches for a near match. Again, a successful search in the process 516 gives a positive response to the decision 517 and advances to the return 526 (succeed), while a negative response returns to the process 524 in which the artist database may be used again as the system 50 skips to the next artist and repeats the process 506.

As seen in FIG. 11, the decision 508, followed by the processes 512, 514, 516, decision 517, and processes 524, 506 form a loop. The loop may only be exited by a negative response to the decision 508 or a positive response to the decision 517. Similarly, the search process 522 may advance directly to the return 526 without regard to the success of a search.

Thus, the index search 446, in general, serves as a director for a search by determining whether an input requires multi-field or single field inputs in order to search the databases available through linking databases, to rapidly locate the work sought by the user. The successful decision 374 determines whether the index search 446 has identified a specific piece sought by the user. If the user has not identified a piece, the user may opt to abort the search, thus providing a negative response to successful decision 374 advancing to return 376 which returns to the menu 216 before a search has taken place. The browse 378 process then permits a user to browse in the vicinity of a selected work located by the index search 446 process. Thus, the user may browse 378 in a master file, wherein data may be ordered according to an index selected by the index search 446 process. After the browse 378, a found decision 380 determines whether a work located during the index search 446 or browse 378 may be found in the results presented. The duplicate decision 382 determines whether the piece found was duplicated and advances to a delete process 384 if more than one entry is found to have the identical information but different item identification numbers (a unique serial number or inventory number by which every art work in the world available on the database of the system 50 may be uniquely identified). Duplicated items located by the index search 446 or browse 378 may be deleted from appropriate databases and all links between information and records, for the deleted item identification number may be re-linked to the remaining item identification number for the specified work. A negative response to the duplicated decision 382 causes execution of the find seller 386, by which a potential seller such as a gallery, publisher, individual owner, or other person in possession of the selected item identified in a database managed by the system 50 may be found. The found decision 388 determines whether a potential seller has been identified by the find seller 386 process. If a potential seller has been located in a database, the wholesale decision 390 determines the nature of the buyer and completes a sort process 392 to prioritize the potential seller according to some preference parameter appropriate to the client. For example, a client may prefer the lowest price, the geographically closest location, a particular quality, quantity or edition. If a retail client has requested a work, the select process 394 may eliminate all but the geographically closest seller.

The term client may mean an actual client who subscribes to the services provided by the system 50, or a client may mean a customer (buyer). In databases, however, a client may be used to mean simply an owner of a work listed, whether or not that work may be available for sale, listed intentionally, or simply extracted from a catalogue or other source of information regarding art works.

The output process 396 may provide output information regarding potential sellers, and may present the output in any suitable medium to be printed to a printer 78, sent by fax modem 80, or downloaded on line to a network or inter network 54. The output process 396 then advances the system 50 to the return 398, by which the system 50 may return to the next highest menu bar 216 or the main menu block 202. That is, the standard search 354 may be accessed through the referral 226 in the file menu 216 of the menu block 202.

If the found decision 380 is answered negatively, the add decision 400 may be presented to determine whether a user desires to include the identification of the unfound art work in the databases of a master file. A positive response to the add decision 400 advances the system 50 to the add process 402 by which the identification provided by the customer seeking a work may be input into the database of a master file in the system 50. Once the information concerning the designated work is in the system, the deterministic search engine 404 may operate to locate the work using the links between the information provided by the customer, and other information relating to publishers, galleries, museums, artists, editions, and related styles and media, for example, that may be used to link the information from the desired work to a possible seller of the work. After the deterministic search engine 404 has completed its search, the found decision 406 may return the system 50 to the wholesale decision 390 directed to providing the output process 396 for the benefit of the customer. However, if the deterministic search engine 404 results in a negative found decision 406, then the find link 410 may attempt to link the information provided by the add process 402 to establish a more complete record for the desired work.

The find link 410 eventually returns the system 50 to an append decision 412. The append decision 412, determines whether the desired, but unfound, work should be added to a list of "wanters" that may be published periodically for review by potential sellers.

A negative response to the append decision 412 advances via the return path 416 to the return 398. A positive response instead begins the append process 414 by which a database containing a list of "wanters" desired by buyers, but not yet located among sellers' inventories may be stored. A newsletter, whether distributed in hard copy or electronically, may then be circulated to clients subscribing to the system 50 as well as other potential sellers of art work. A "wanter" may be regarded as a virtually certain sale by a potential seller who either has the desired work in stock or knows where and how to obtain it.

Figure 12:
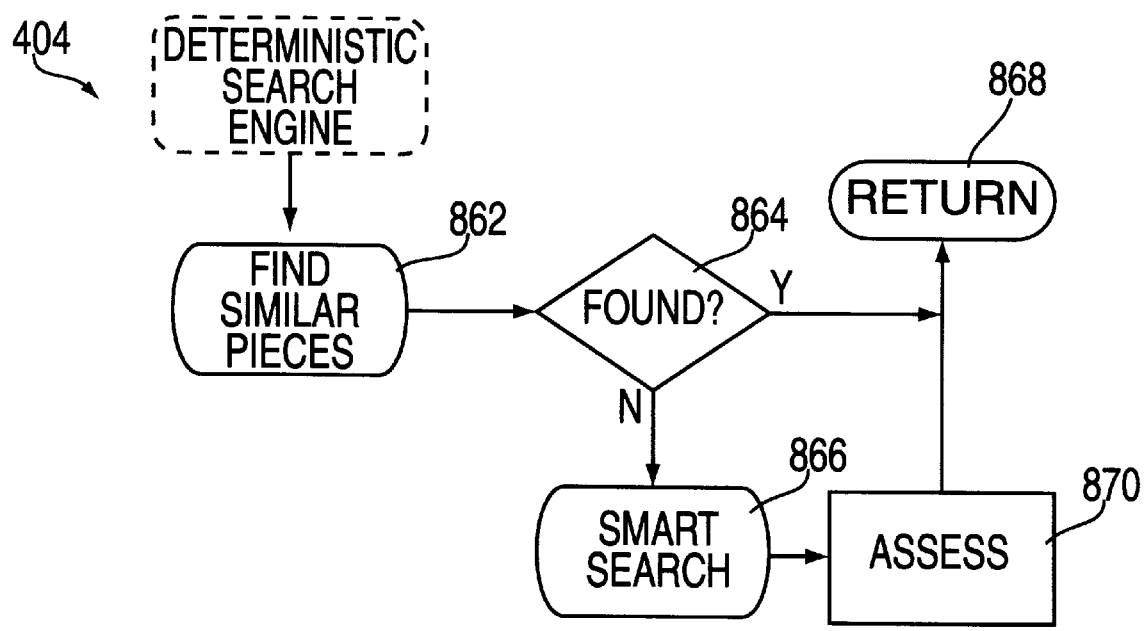
FIG. 12 is a schematic diagram of the deterministic search engine for the system of FIG. 8.

Referring now to FIG. 12, the deterministic search engine 404 includes a process 862 to find any similar pieces that might relate to the search inquiry. A decision 864 determines whether or not such similar pieces have been found, a positive response to which advances to a return 868. A negative response to the decision 864 results in a smart search process 866 being conducted. Whether or not a result is found, the process 870 assesses the output and advances to the return 868.

Figure 13:
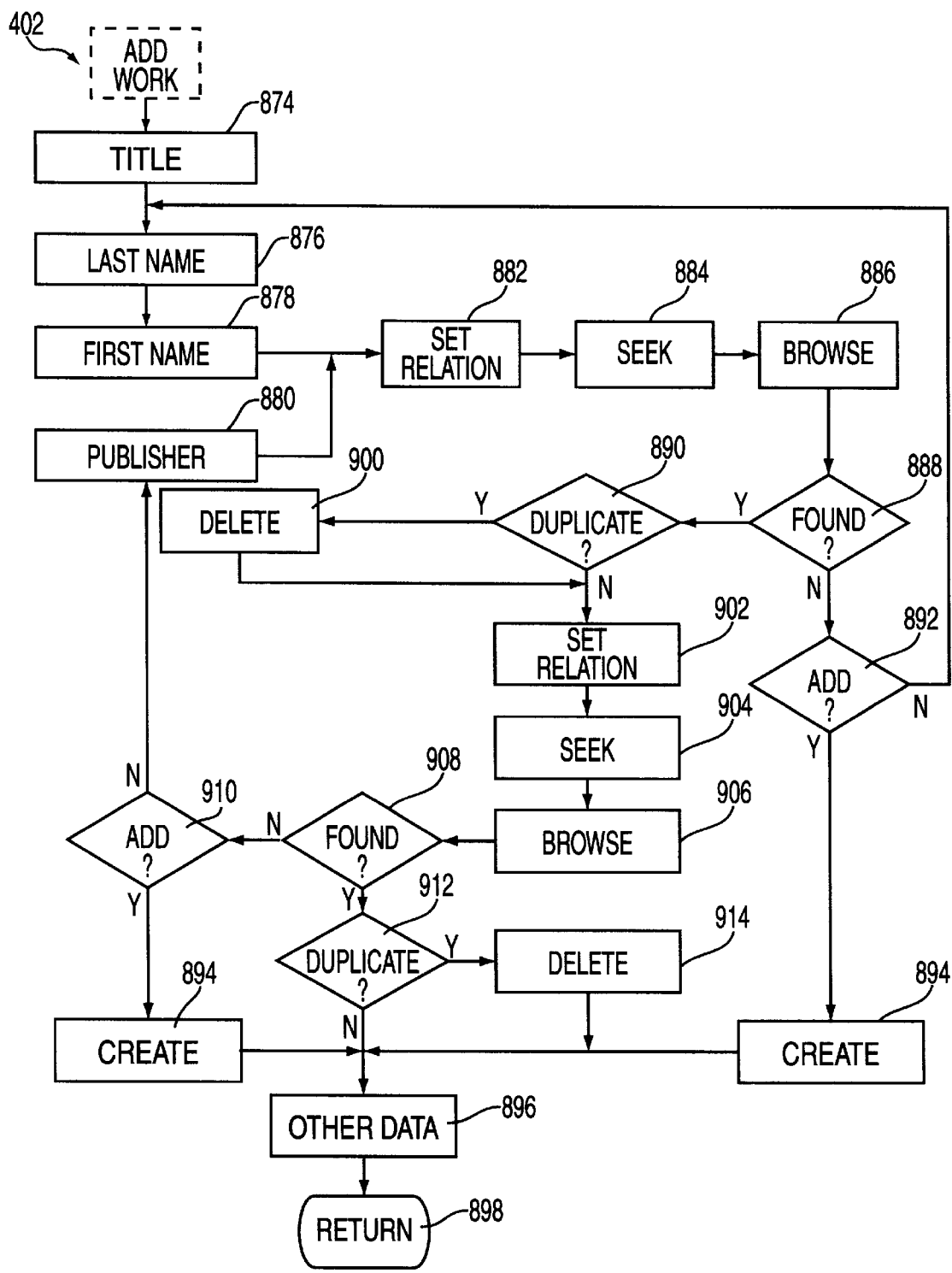
FIG. 13 is a schematic diagram of detailing the add work process for the system of FIG. 8.

Referring now to FIG. 13, the add work process 402 adds a work to the inventory master file in the databases. As seen in FIG. 13, the process 402 begins with a process 874 to accept inputs, including a title, in response to a prompt given to a user. Subsequently, the process 876 and 878 request the artist's last name and artist's first name for a work of interest. Following inputs regarding an artist, the process 882 sets a relationship from the inventory master file from the data bases, based upon an artist code within the inventory master file, to the artist code for this particular artist by name corresponding to the inputs of the processes 876 and 878.

Next, the system 50 in the process 884 seeks the nearest artist or artist name corresponding to the artist's name as input. The process 886 provides an opportunity for a user to browse the closest set of matches to the artist's name sought, the result of which may be selected by a user and advances to the decision 888. The decision 888, if a result is found, inquires in the decision 890 as to whether any duplicates have been found. If duplicates are found, then the process 900 deletes those duplicates and conducts a re-linking operation. If no duplicates are found, then the system 50 advances to the process 902. Similarly, the process 902 follows the process 900.

Meanwhile, negative response to the decision 888 advances to the decision 892 that inquires into whether or not an artist's name should be added to the available databases. A negative response to the decision 892 returns the system 50 to the process 876 requesting an input for the name of an artist (last name).

A positive output to the decision 892 advances to a process 894 for creating a new record for an artist or publisher including links to information providers as well as a new identification number for the work of interest. A subsequent process 896 requests inputs for all the other relevant data fields in the appropriate databases, after which a return 898 may be output to return to the main system 50.

The process 902 sets a relationship found between an artist code and an art publisher database entry for an artist code. The art publisher entry being related to a publisher code from the art publisher database, and consequently, a publisher name from the publisher database. Thereafter, the process 904 again searches for the nearest artist or artist's name, after which a user may be allowed to browse at the process 906 for the closest match within the listing of artists. If an artist is found, the decision 908 advances to check for duplicates in the decision 912, which, if found, may be deleted in the process 914 which also updates the appropriate linkages or linking. Thus, a negative response to the decision 912, or a completion of the process 914 may advance the system 50 to the process 896 for collecting inputs on other appropriate data fields corresponding to the artist or publisher.

Meanwhile, a negative response to the decision 908 advances to the decision 910 which determines whether to add a new publisher to the appropriate database. A positive result in the decision 910 advances to the process 894 for creating a new record for the appropriate publisher. A negative response to the decision 910 returns to the process 880 for inputting a name of a publisher. Then, the system 50 returns to the process 894 for creating a new record for the publisher in the process 894.

Figure 14:
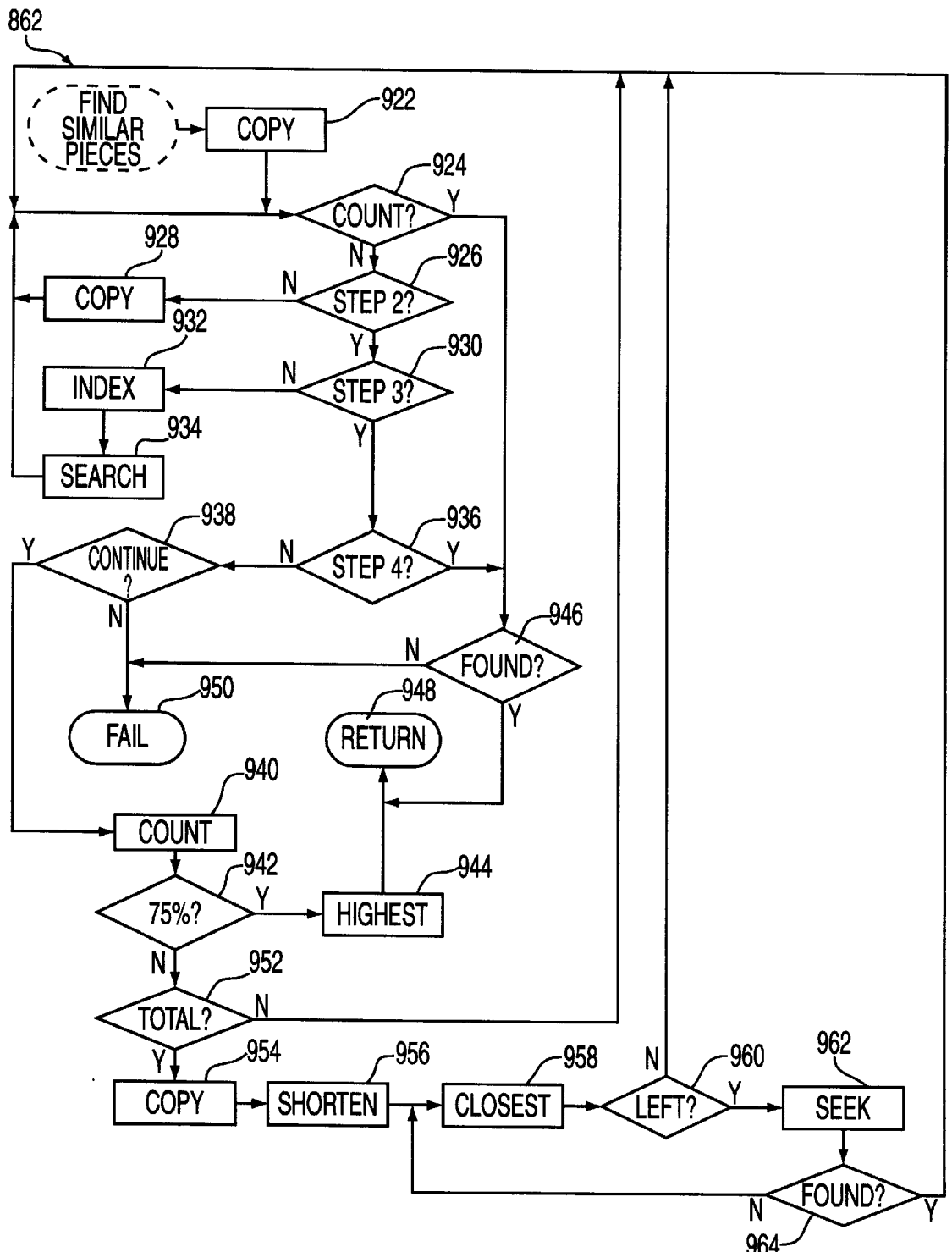
FIG. 14 is a schematic diagram of the find similar pieces routine, a finding routine for finding similar pieces of art from the system of FIG. 12.

Referring now to FIG. 14, the process 862 to find similar pieces, upon being selected by a user, or by the search engine operating under the user inputs, first uses a process 922 to copy from the inventory master file an artist name corresponding to the desired artist, corresponding to an input from a user, and sets the title to be searched at a value corresponding to the title desired by a user with other fields in a record possibly empty.

Next, a counter may be checked with the decision 924, which, if greater than 0, may advance the system 50 to return a successful output 948. If the count is not greater than 0 in the decision 924, then a decision 926 determines whether or not the second step has already been attempted. A positive response to the decision 926 advances to the decision 930 to determine whether a third has been attempted. Likewise, a positive response to the decision 930 advances to the decision 936 to determine whether or not a fourth step has been attempted. If a fourth step has been attempted already, then the decision 946 inquires as to whether a result has been found. If a result has been found, then a return success 948 results. A negative response, instead, prompts a return fail 950.

Meanwhile, a count greater than 0 at the decision 924 prompts an advance to a decision 926 for which a negative response advances to the process 928. The process 928 may copy from the inventory master files the information corresponding to the desired artist and use that information as the artist of interest during the search. After the process 928, the system advances again to the decision 924 regarding the count. Meanwhile, the positive response to the decision 926 advances to the decision 930, for which a negative response engages the process 932 for indexing on a field code and field content from the word location database file. Thereafter, the process 934 searches for the entire title input within the word location database file in a manner corresponding to the search for a key word. After the process 934, the system 50 returns again to the decision 924.

Meanwhile, the decision 936, following a positive response to the decision 930 may itself advance, in response to a negative output to the decision 936, to the decision 938. If a decision 938 is reached, a user may be presented with the opportunity to continue or to terminate the search. If the decision is to terminate, then the search engine of the system 50 returns a fail 950. A decision to continue, in response to the decision 938, advances to the process 940 to count the number of output "hits" resulting from a key word search 356.

Thereafter, the decision 942 determines whether or not the count may be greater than some number, such as 75%, for example, of the required total of matched information. If the criterion is not met, then the system advances again to the decision 952 to determine whether or not the artist total titles may be greater than some criterion, for example, such as a number 12. If instead, a positive output is received in response to the decision 942, the process 944 then selects items with the highest number of corresponding "hits."

Following the decision 952 as to whether or not an artist's total titles meet some criterion, the process 954 copies all records that match the search inquiry from the inventory master file. Next, the process 956 shortens titles by some parameter, in one embodiment, 50%, so that the string may not be as restrictive (long).

Next, the process 958 selects the closest item from the inventory master file and advances to the decision 960 as to whether the inventory master file contains other items left to try. If none are left, then the system 50 advances to the count decision 924. If other items are left to try, then the process 962 seeks a seller identification from the client inventory database. If a result is found in the process 962, then the decision 964 returns a positive result advancing again to the decision 924 for the count. Meanwhile, a negative response to the decision 964 returns to the process 958 for selecting the closest item match from the inventory master file. Thus, it can be seen from FIG. 14 that the process 862 to find similar art pieces to that originally designated by an input from a user may return a fail 950 or may return a success 948 as the output result.

Figure 15:
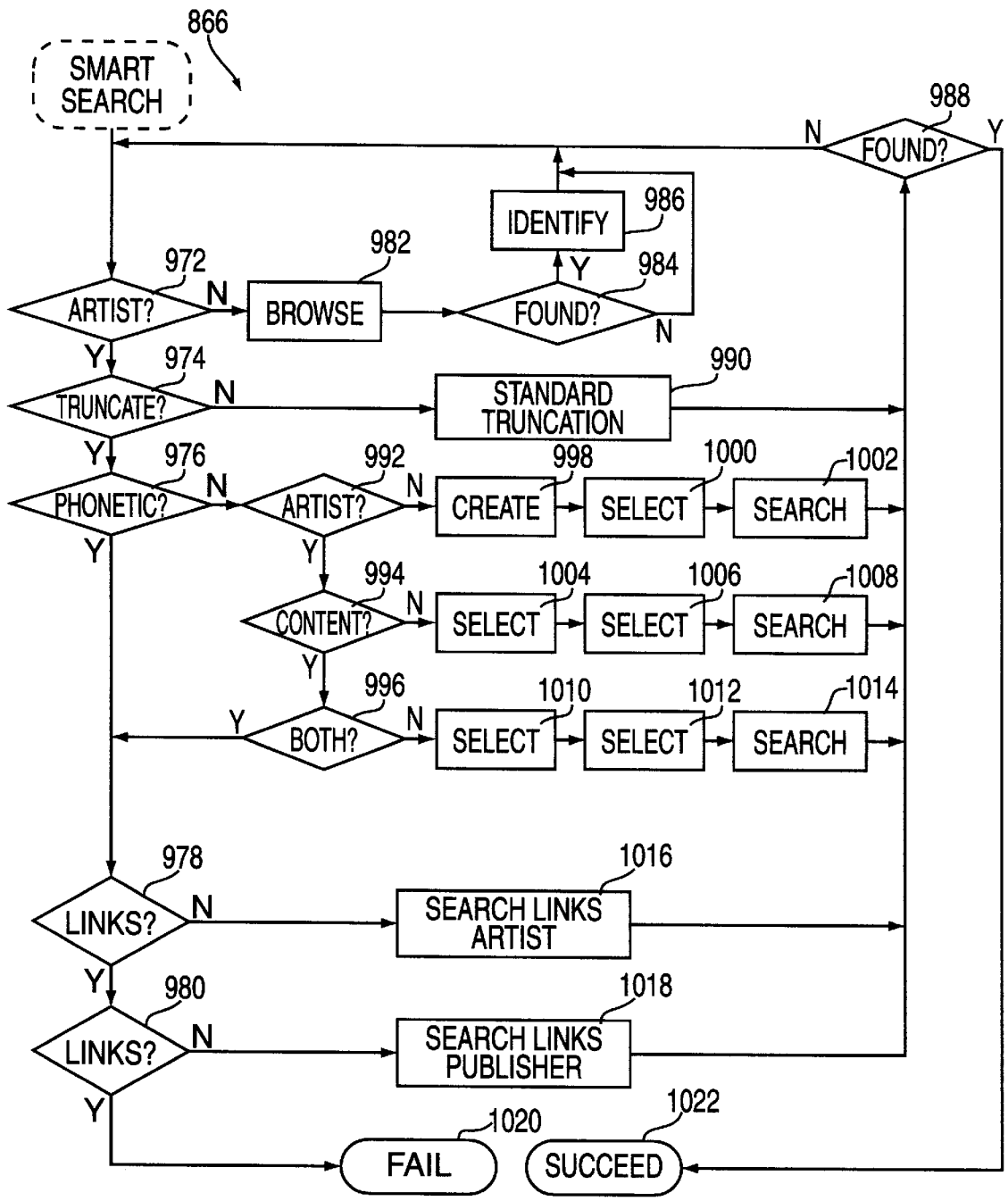
FIG. 15 is a schematic diagram of the smart search routine for the system of FIG. 12.

Referring now to FIG. 15, the smart search 866 may be something of a loop, which may be executed more than once in order to obtain a return fail 1020 or return succeed 1022 to the system 50. The smart search 866 begins with a decision 972 for determining whether an artist has been identified before. A negative response engages a process 982 permitting a user to browse over an artist database file for an artist's name, which when selected, if selected, advances to a process 986 to identify artist's as any artist contained in hits from the search. If no artist is selected in the process 982, then the decision 984 returns to the beginning of the smart search 866.

A positive response to the decision 972 advances to the decision 974 inquiring as to whether or not the truncation process has been completed. If the truncation process has not been completed, then the standard truncation process 990 may be engaged before the system 50 advances to the decision 988, determining whether or not a substitute has been found. A negative response to the decision 988 returns to the beginning of the smart search 866, while a positive response advances to return a success 1022.

A positive response to the decision 974 indicates that a truncation has been completed, so a decision 976 inquires as to whether a phonetic search has been completed. If no phonetic search has been done, one will note that a hierarchical order of searching may be implied. Thus, the phonetic search may be directed first by a decision 992 inquiring as to whether a phonetic search by artist has been tried. If not then the process 998 creates a phonetic representation of an artist's last name and advances to the process 1000. The process 1000 selects, in one embodiment, a number such as 60% of the phonetic matches to an artist's name and then advances to the process 1002 which searches by the artist and the title combined. One will note that all of the processes 1002, 1008, 1014 corresponding to phonetic searches of an artist's name, phonetic searches for content of an input field, and phonetic searching of both, advance to the decision 988 as to whether a substitute for an exact match has been found.

Returning to the decision 992, a positive response advances to the decision 994 as to whether a phonetic match by content has been tried. If not, then the process 1004 selects a phonetic string for key words from the title and the description of the work of interest. Next the process 1006 selects, in one embodiment, a number such as 60% of phonetic matches found in the title or description and searches by key word in the process 1008. Thereafter, the system 50 advances to the decision 988 again.

A positive response to the decision 994 advances to the decision 996 inquiring as to whether both content and artist have been tried for a match. If not, the process 1010 selects hits from searching by artist, after which the decision 1012 selects, in the preferred embodiment, a number such as 60% of phonetic matches found for the title or description. Next, a search by key word 1014 may be conducted, after which the system 50 advances to the decision 988 once more.

Meanwhile, a positive response to the decision 996 advances to the decision 978 inquiring as to whether an artist linkage search has been completed. If the links have not been searched, then the process 1016 search returns the probable artist name and advances to the decision 988. A positive response to the decision 978 advances to the decision 980 as to whether a publisher linkage search has been completed. If not, then the process 1018 locates the probable publisher before returning to the decision 988. A positive response to the decision 980 advances to the return fail 1020 indicating that no appropriate result has been found.

Figure 16:
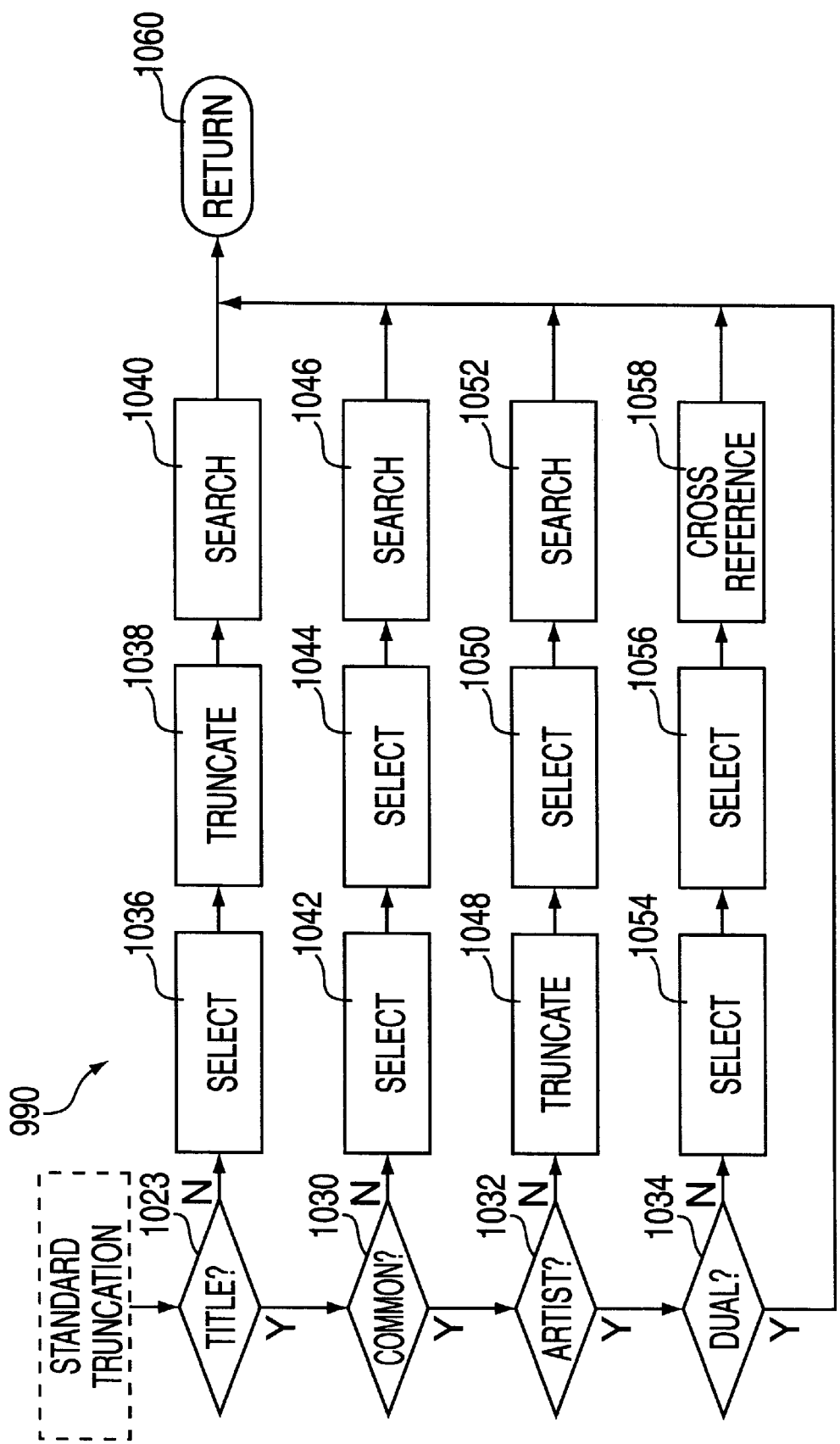
FIG. 16 is a schematic diagram of the standard truncation process for the system of FIG. 15.

Referring now to FIG. 16, the standard truncation 990 begins with the decision 1028 inquiring as to whether the title truncation process has been attempted. If the title truncation has not been attempted, then the process 1036 selects a key word search from the title. The process 1038 truncates the key word by some appropriate amount, such as by ⅔ or a corresponding percentage, after which the process 1040 searches all key words and artists. Finally, a return 1060 returns back to the point in the system 50 following the standard truncation 1036. Likewise, the end result of a positive output to the decision 1034, the process 1046, the process 1052 and the process 1058, also advances to the return 1060.

Meanwhile, the decision 1030 follows a positive response to the decision 1028. The decision 1030 inquires as to whether or not common words have been tried, which if they have not, may be selected as key words from the title in the process 1042. Thereafter, the process 1044 selects the two key words with the most "hits" from the process 1042 to be combined in the process 1046 with the artist for a search based upon the key words and artist.

A positive response to the decision 1030 advances to the decision 1032 inquiring as to whether artist truncation has been used. If truncation has not been used, then the truncation process begins with the process 1048 in which the last name of an artist may be truncated by some appropriate percentage, such as, in the preferred embodiment, 20% of the characters in a name string. Thereafter, matches may be sought in the process 1050 and a search 1052 may be conducted using the artist and title.

The decision 1034 follows a positive response to the decision 1032. The decision 1034 inquires as to whether dual truncation has been tried, which if not, may be conducted beginning with the process 1054 selecting all hits from two key word searches. Thereafter, the process 1056 selects all hits from a truncated artist search, and a process 1058 is used as cross-referencing to attempt to find a piece based on linkages of the information between various databases. Thus, the standard truncation process 990 results in a return 1060 after a cascade of searches 1040, 1046, 1052, and 1058.

Figure 17:
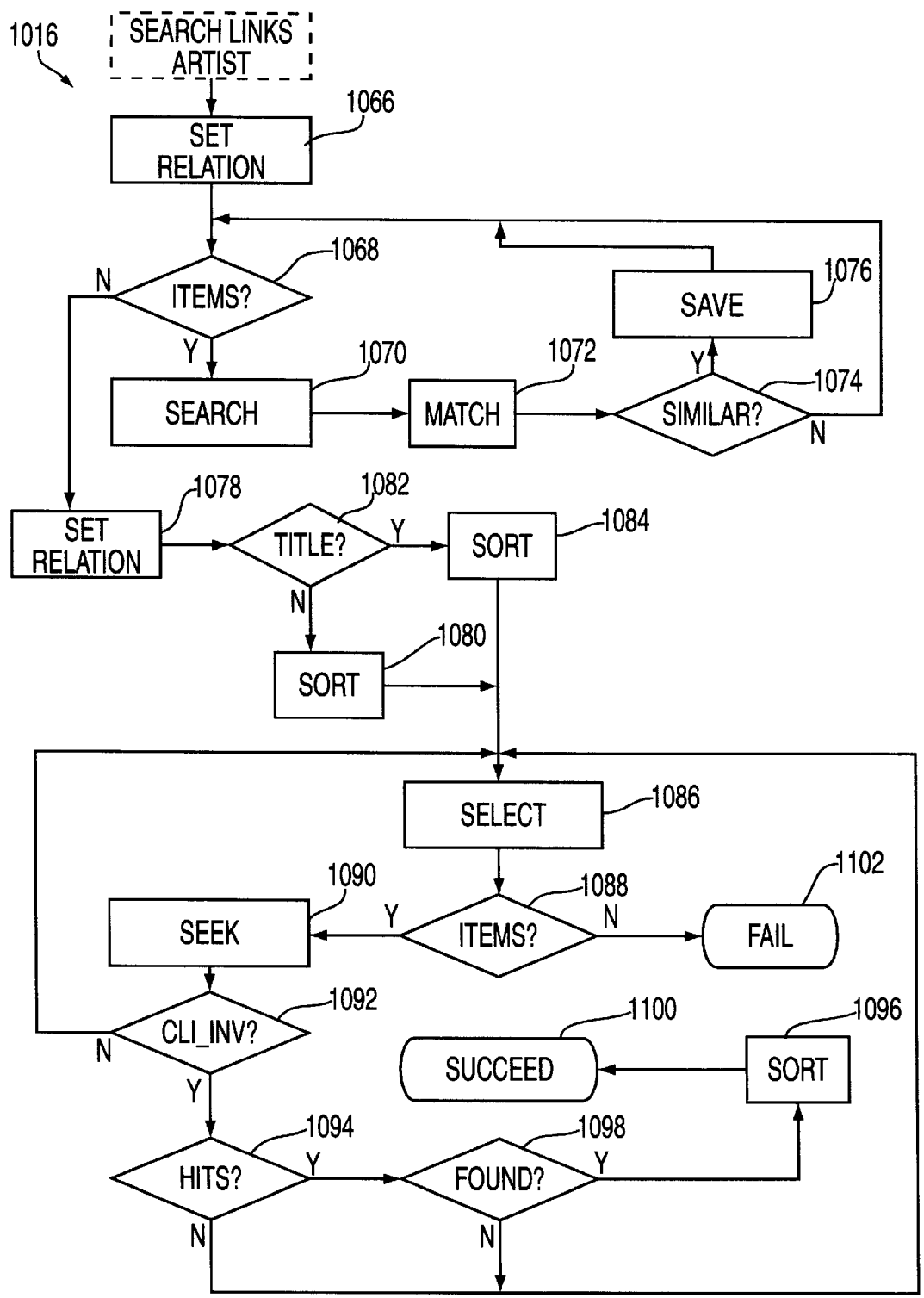
FIG. 17 is a schematic diagram of the search links artist, fuzzy searching routine for the system of FIG. 15.

Referring now to FIG. 17, the search links artist process 1016 begins with the process 1066 which sets the relation from key word hits from the item identification to the inventory master file item identification.

Thereafter, the decision 1068 determines whether any items are left, which if not, may advance the process 1016 to the process 1078.

If instead, items are left, then the process 1070 searches for a near equivalent from the inventory master or title file. That is, the title or description is used to search for the piece in question. Next, the process 1072 attempts to match the results of the process 1070 using the word location database file, moving within some range of parameters in the word location database file. Thereafter, the decision 1074 determines whether a similar artist or a near artist has been located. If none has been located, then the decision 1068 is next encountered once more. If the result of the decision 1074 is a positive response, then the process 1076 saves the artist code, after which the following step is the decision 1068 again.

Meanwhile, the process 1078, following the decision 1068 with a negative result, may set a relation from a client inventory database file account number and from an art gallery's account number to be the art galleries associated with the artist code and the inventory master file entry corresponding to the artist code for the artist found. Next, the decision 1082 determines whether or not a title was available previously. If it was not, then the process 1084 may sort the results achieved previously (when searching by artist) by the number of hits that each received and stored in a hits file.

If the response is positive to the decision 1082, then the process 1080 sorts the hits file by the number of hits found thusfar (by artist and title). Either the process 1084 or the process 1080 may next advance to the process 1086 which selects the next item to be evaluated, after which the decision 1088 determines whether any items are left. If no items are left, then the process 1016 returns a fail 1102. If there are items left, then the process 1090 seeks a new item from the inventory master file, and uses that item id., advancing to the decision 1092 as to whether this entry is not the end of a file or the end of a client inventory list. If this is not the end of the list, indicating a piece is currently available with a seller, then the decision 1094 is encountered in which the inquiry focuses on whether this entry has any hits. If hits exist, then the decision 1098 inquires as to whether the piece has been found, which, if it has, may sort the result in process 1096 according to the highest number of hits, after which a return succeed 1100 is returned to the system 50. Meanwhile, the negative result to the decision 1092 returns, corresponding to no end of file or no last entry, and selects the next item. A negative response to decision 1094 or 1098 similarly return to the select 1086 to be processed again. Thus, the process 1016 results either in a return fail 1102, or a return succeed 1100 for the system 50.

Figure 18:
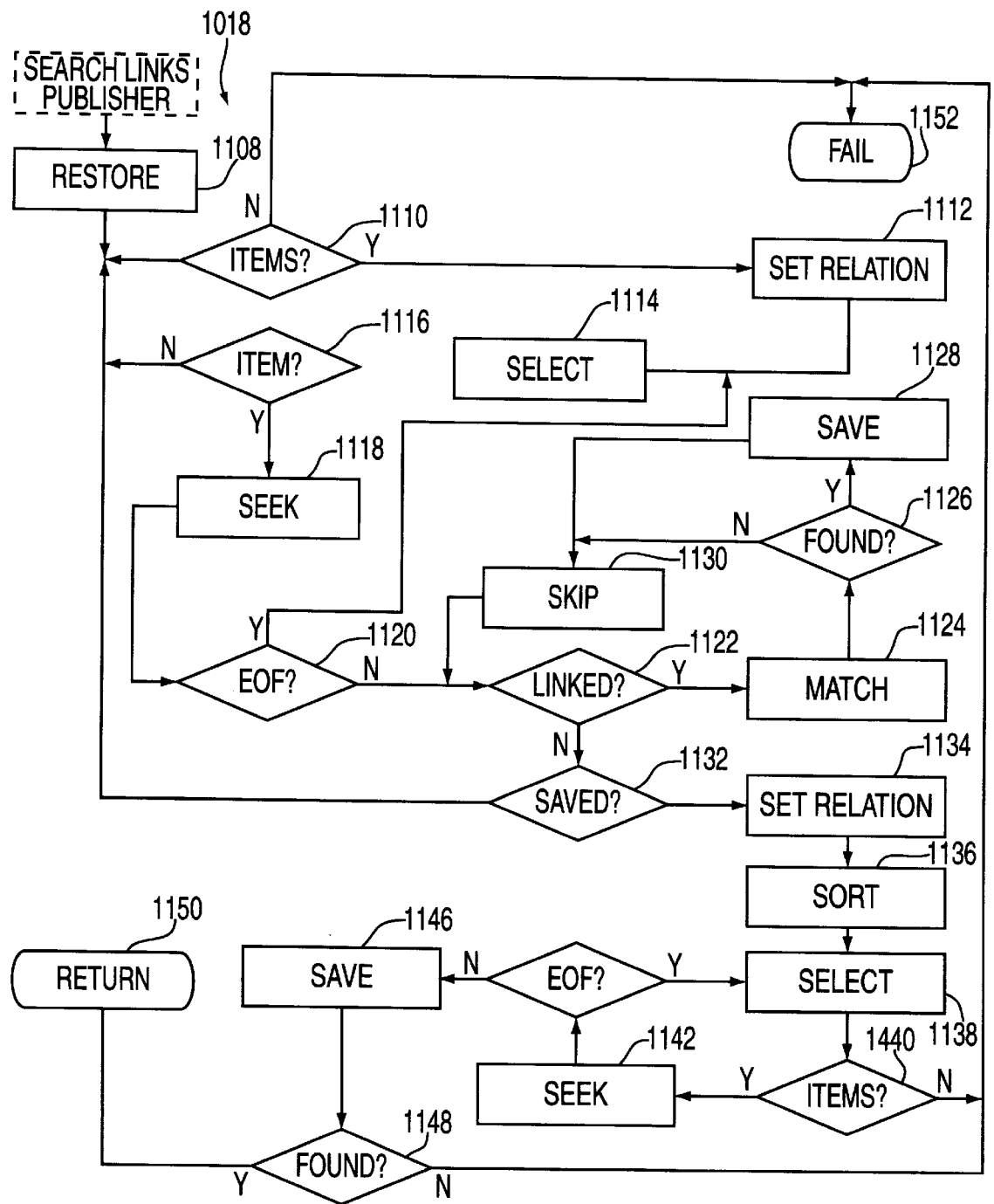
FIG. 18 is a schematic diagram of the search links publisher routine for the system of FIG. 15.

Referring now to FIG. 18, the search links publisher process 1018 begins with the process 1108 to restore the relation between the inventory master file and the hits that have been found from the most recent search. Next, the decision 1110 inquires as to whether any items are remaining. If no items remain, then a return fail 1152 is sent to the system 50.

A positive output for the decision 1110 results in a process 1112 for setting a relationship between the inventory master database file, and the publisher database file. The relationship is between the publisher code and the inventory item publisher field, identified by a publisher code. This code is related to a client account number and, consequently, to a client inventory account number. Next, the process 1114 selects the next item identification number from the list of hits. Thereafter, the decision 1116 determines whether any items remain. If no items remain, then the system 50 returns to the decision 1110 and advances therefrom. If items remain in response to the inquiry 1116, then the process 1118 seeks the designated item in the inventory master file according to the item identification number therein.

Next, the decision 1120 inquires as to whether the end of a file has been reached in the client inventory database. If so, then the system 50 returns to the process 1114, and continues to loop. Otherwise, the negative response advances to the decision 1122 for determining whether or not the result is linked. If the result is not linked, then the decision 1132 determines whether or not the number of saved entries is zero. If the number of saved entries is zero, then the system 50 returns to the decision 1110. Meanwhile, if the decision 1122 yields a positive response, the process 1124 attempts to match the results within some arbitrary item number, for example, in this embodiment, + or − three items, using the query data base file. The decision 1126 determines whether a match has been found. If it has, the item identification number is saved in the process 1128. If no match was found, the decision 1126 advances to the process 1130, which skips to the next match in the appropriate list. Meanwhile, if the decision 1132 yields a negative output, then the process 1134 sets a relationship between the artist code in the results file, and the artist code in the inventory master file. Next, the process 1136 sorts all of the hits resulting from the search according to the number of hits for the artist code in question. Next, the process 1138 selects the next item identification number in order, and the decision 1140 determines whether any items are left. If items remain, then the system 50 advances to the process 1142 which seeks the desired item according to the item identification number in the inventory master database file. Thereafter, the decision 1144 determines whether or not the end of the result file has been reached. If the end of the file has been reached, then the system 50 returns to the process 1138 indicating that no results exist with a match to the selected item. Meanwhile, if the end of the file has not been reached, the process 1146 saves the results for similar artist's names, exact last names, names which sound like the name in question, those which are near the last and the first names, or which might match to some percentage, such as a 75% match of a last name, in this embodiment. Thereafter, the system 50 advances to the decision 1148.

Meanwhile, if the decision 1140 results in a negative response, the system 50 provides a return fail 1152. Likewise, if the decision 1148, following the process 1146, does not result in a found match, then the system 50 returns a return fail 1152. However, if the loop comprising the processes 1138, 1142, and decisions 1140, 1144 results in saved results found during the process 1146, then a positive response is output from the decision 1148. Thus, a return succeed 1150 is returned by the system 50.

Figure 19:
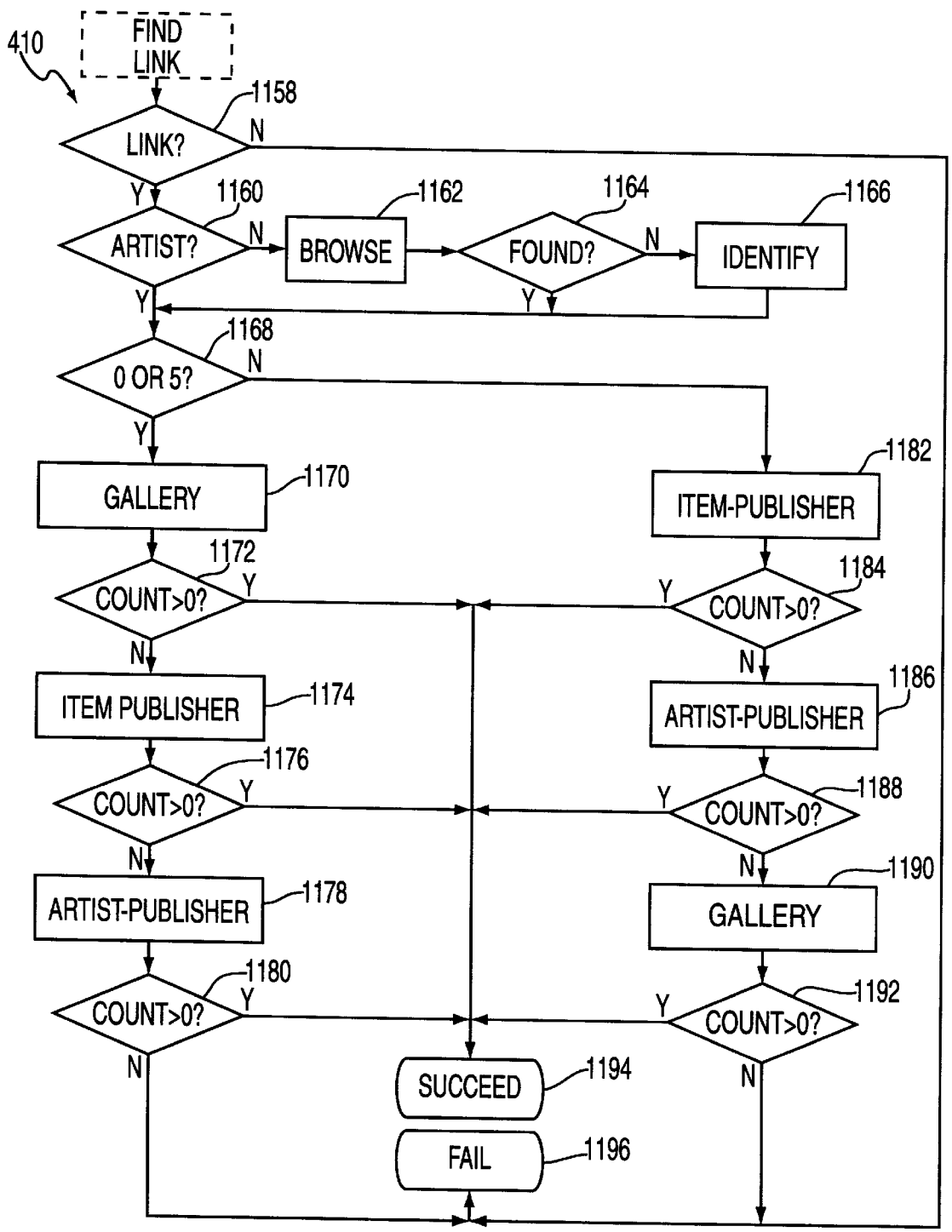
FIG. 19 is a schematic diagram of the find links routine for the system of FIG. 8.

Referring now to FIG. 19, the find links process 410 begins with a decision 1158 that determines whether or not a user desires to find link information. A negative response may advance the system to return fail 1196, indicating that a user has no wish to attempt to identify linkages. If the response is positive, then the decision 1160 determines whether the artist in question has been identified before. If the artist has not been identified before, then the process 1162 permits browsing of the artist database file for the name of the artist. Next, a decision 1164 determines whether or not an artist's name has been found. If a name has been found, then the process 410 advances to the decision 1168. If no artist has been found, then the procedure 1166 identifies the artists in question as any artist contained in the hits being processed.

Next, either from the decision 1160, the decision 1164, or the process 1166, the decision 1168 is encountered. The decision 1168 determines whether the work type is of type "O" or of type "S." If the work is of one of the proper types, then the process 1170 counts the number of active gallery links. If the number of links is greater than zero, the decision 1172 advances to a return succeed 1194.

If at any point any of the decisions 1172, 1176, 1180, 1184, 1188, or 1192 finds that a count is greater than zero, then the process 410 may return succeed 1194. Meanwhile, the process 1170 counts active gallery links, the process 1174 counts active item-publisher links, the process 1178 counts active artist-publisher links, the process 1182 counts active item-publisher links, the process 1186 counts active artist-publisher links, and the process 1190 counts active gallery links. If all the processes 1170, 1174, 1178, 1182, 1186, 1190 result in a count not greater than zero, then the process 410 returns a fail 1196. Incidentally, one will note that the process 1182 is only reached in the event of a negative response to the decision 1168.

Figure 20:
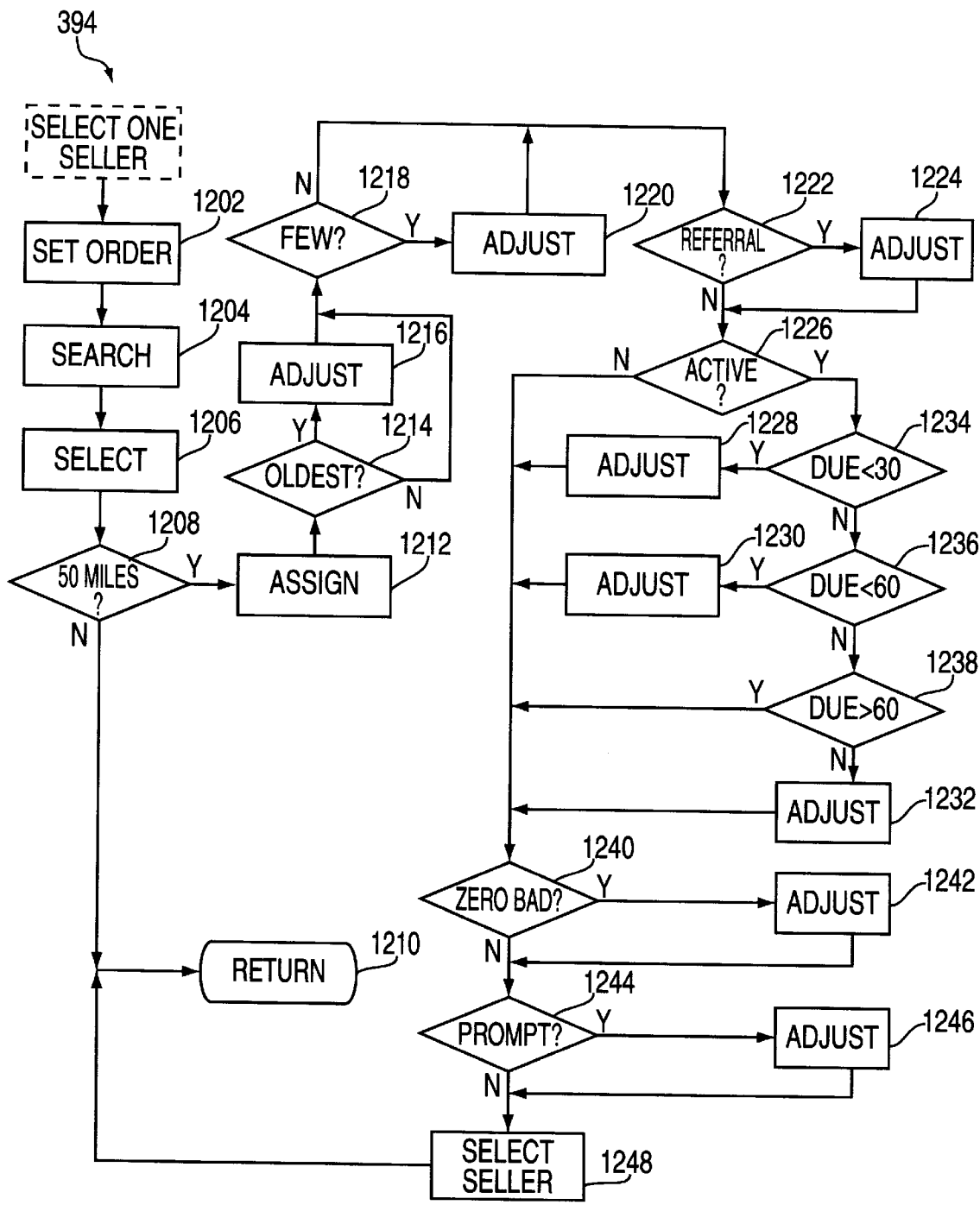
FIG. 20 is a schematic diagram of the select one seller routine for the system of FIG. 8.

Referring now to FIG. 20, the select one seller process 394 begins with a process 1202 to set the order to a zip code. Thus, the process 1204 searches by zip code, and the process 1206 selects the nearest zip code. The decision 1208 determines whether or not the nearest zip code is within a reasonable range, say 50 miles, for example, in this embodiment. If the zip code selected is not within reason, then the process 394 returns 1210 to the system 50. Meanwhile, if the zip code is within the criterion of the decision 1208, then a positive response advances the process 394 to the step 1212 where a standard priority flag is assigned for each customer. The decision 1214 then looks for the oldest listing of the art piece in question. If the found piece is not an oldest listing, the process 394 advances to the decision 1218. Meanwhile, if the listing found is the oldest, then the process 394 advances from the decision 1214 to the step 1216, at which point priority is adjusted in view of the oldest listing, such as by incrementing by some reasonable number such as two. Thereafter, the process 394 advances to the decision 1218, which determines whether the client in question has received few or no referrals according to some criterion. If the client has received few or no referrals, then the step 1220 may adjust the priority by incrementing again the priority number that was assigned.

Meanwhile, a negative response to the decision 1218 advances the process 394 to the decision 1222 for determining whether a client has received numerous referrals. If a client has received numerous referrals, then the step 1224 adjusts the priority of the client to account for the excessive referrals, such as by decreasing the priority number. Meanwhile, all of the processes 1220, 1124, and the decision 1222 then are followed by the decision 1226 for determining whether or not a client has an active account.

Once again, if a client account is not active, then the decision 1226 advances the process 394 to a series of decisions 1234, 1236, and 1238. In sequence, the delinquency of account is determined according to some series of criteria, such as 30 day, 60 day, and greater than 60 day overdue periods. If at any decision, 1234, 1236, 1238, a positive response results, then the priority is adjusted according to some predetermined criteria in the steps 1228, 1230, 1232, respectively. Thereafter, the process 394 advances to the decision 1240.

The decision 1240 determines whether no "bad" inventory items exist. If the bad inventory items are zero, then a priority adjustment may be made by way of increasing the priority number in the step 1242. A negative response to the decision 1240 may result in a decision 1244 that inquires as to whether a client is prompt in updating inventory. That is, bad inventory items mentioned in connection with the decision 1240 are items that are identified, and then found to be improperly remaining within the catalog or inventory list provided by a client. Meanwhile, early updating, referred to in connection with the decision 1244, indicates that a client is prompt in maintaining a list of the client inventory within the system 50.

Thus, if the client is an early updating client, then the decision 1244 advances the process 394 to the step 1246 adjusting the priority again, such as by adding to the priority number. Next, the system 50, or the process 394, selects a seller (client) by a random number from 1 to the total number of priority flags in the step 1248. Thus, sellers with a higher numerical value priority flag have a higher chance of receiving a referral. Thereafter, the process 394 advances to the return 1210.

Figure 21:
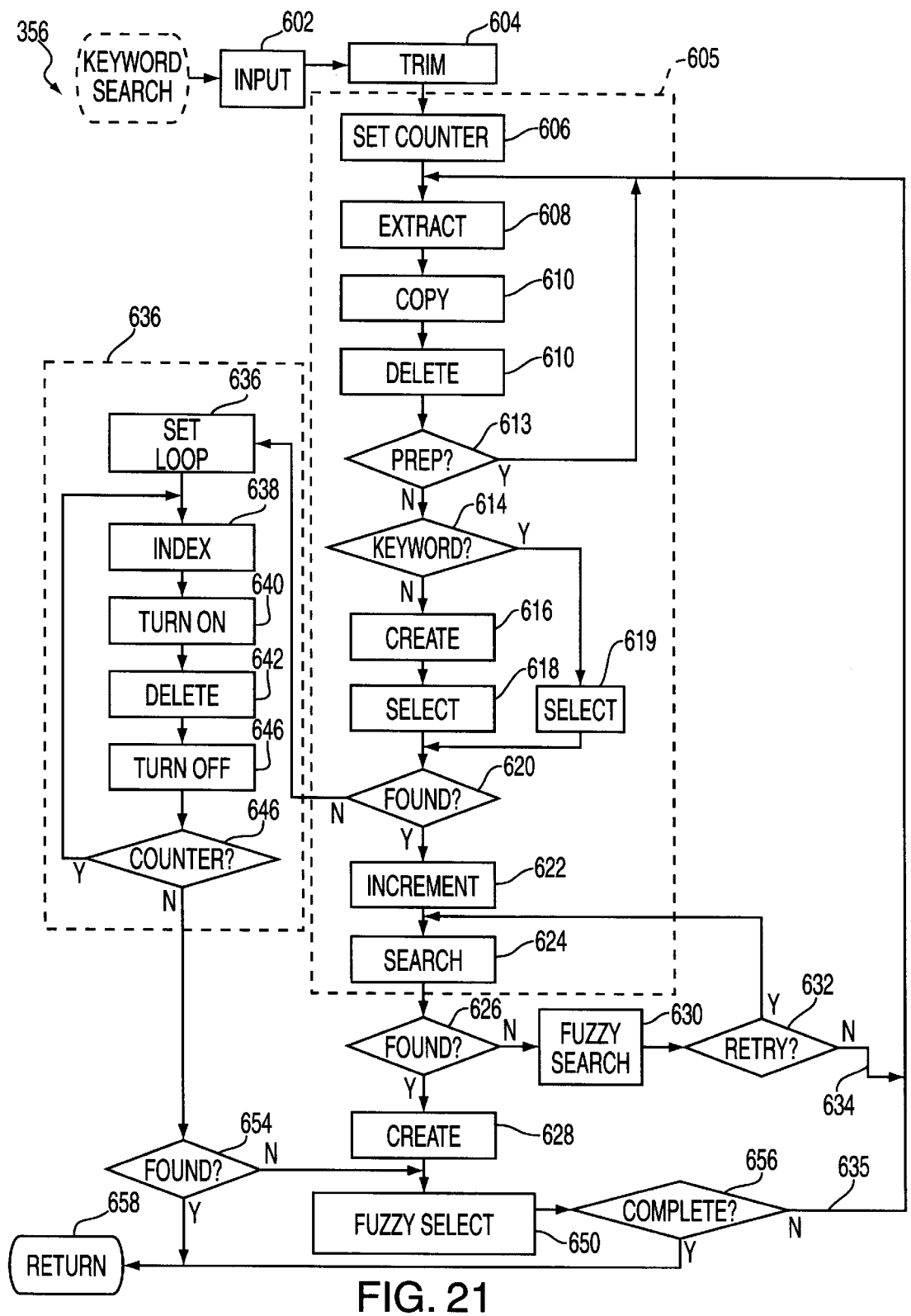
FIG. 21 is a schematic diagram of the key word search for the system of FIG. 6.

Referring to FIG. 21, the key word search 356, the search 356, may operate by selecting the last filled field within the inputs. The inputs contain multiple strings and multiple words in whose strings multiple fields from multiple databases may be contained. For example, key word, artist, title, description, style, medium type, color, and so forth may all be contained as inputs. Thus, the extract 608 routine selects the last filled field, then, after conducting a search, returns and extracts another word, the last word, from that string, and progresses toward the beginning of that string, then returns after searching and again takes the last word from the previous string until all entries from that search (input) variable have been used. The extract 608 routine then selects the next previous input variable and begins with the last string and the last word on that string and progresses to the beginning of those variables until no entries are left for that variable. Thus, eventually, the first word for the first variable (input) may be reached. When no words, strings, or entries for input variables remain, the search has been completed.

Each entry in the word location database file has a code associated with the word entries. Therefore, when a match is found between the value of an input variable and a word in the word location database, the code in the word location database may identify whether or not the word was extracted originally from a field type which corresponds to the input variable type. For example, an artist's name may be input, and a match may be found in the word location database for that same word, then the system checks to determine from the code associated with that word to determine whether or not that word came from an artist field in the original database record.

The word location database may be indexed by code associated with each entry. The codes associated with each entry in the word location database may have more than one character, in one embodiment of the invention. The (ASCII) character or characters may be indexed according to the ASCII value of the code. Thus, "a" would be before "b" "b" would come before "c," etc.

The codes may also indicate database of origin. For example, in one embodiment of the invention, four basic databases are used, and thus code numbers from 1 through 4 indicate the database. Similarly, the most significant information includes the artist, the origin of a work, and an alias or other name by which an artist might commonly be known. Thus, the next three code numbers in order, 7, 8, and 9, may be assigned to those three fields.

An individual number 1, for example, may indicate an artist field in a specific database. 2 may indicate an artist field in a different database, 3 may indicate a source of a work from a specific database, and 4 may indicate a source of a work from another database. Thus, an individual, single character may be used to indicate both field and variable. This type of single character indexing may prevent the need for compound databases with multiple looping searches and cross-referencing logic. Thus, a search may be accomplished very rapidly by creating a one-dimensional array of codes rather than a 2 or 3 dimensional array for the various permutations and combinations.

If a search is done using only the key word input variable (field), then the word location database may be searched according to the content. Thus, all entries of a word may be found regardless of what field and what database the word may originally have appeared in.

The word location database entry may be a string comprising a code character followed by a space followed by the value (word) of the entry in the database. Because the codes are all single characters, or may be a single value (for example, a two-character value such as 10, 12, 45, etc.) they create a one-dimensional array. Therefore, each entry in the word location database may be more rapidly searched than other search engines which use two-dimensional arrays, multiple-fields, or the like.

In addition to the field code and the entry value in the word location database, each record in the word location database includes an item ID number. The item ID number may be thought of as the unique identifier for every work in the system. Thus, the binding between the code (field code) and the value of the variable (word) exists due to the fact that the two are grouped in a single string separated by a space as if they were two words. Corresponding then to each of these search entries is the item ID number corresponding to the work from which the word and the field code originated.

For each match found, the item identification number may be saved. As a search progresses from the very last field entry in the inputs, several item identification numbers may be located, progressing from the color up through the medium type to the style and eventually to the artist or key word. Each of the item identification numbers may be placed in a file of "hits." Because the searching may be conducted upon an indexed database, the search looks only for exact matches and then transfers a corresponding item identification number for any hit found. Thus, only exact matches are located, no processing occurs, and no numerical calculation occurs, merely a transfer of a value of an item identification number from one register to another register.

This search engine has several advantages. Speed is one. Common search engines, which search through multiple arrays, may take 2 minutes to locate a word and identify the field and the database from which the word was extracted. Such search engines must cross-reference and search multiple fields and then look for some indexing number to show that several key words have all occurred from the same record. By contrast, the engine made according to the invention does not require a match of a series of words assembled in a string in a given order. This search engine by virtue of the coding and indexing can identify a word as a proper word from a proper field. Also, an engine made in accordance with the invention intentionally does not order words within a specified search string. Thus, "a dog with a boy," "a dog and a boy," "a boy and a dog," or "a boy playing with a dog," might be located because the words "boy" and "dog" both appear within a title field or a description field corresponding to a particular work. Thus, an engine made in accordance with the invention is not only extremely rapid, but can locate an identification number for a piece of art that contains either a content or title or subject matter which may be identified by any word or combination of words in any order.

Part of the speed is derived from the fact that all databases do not have to be searched and a single database need not be searched before another database. Rather, the search may be indexed so that all references to all words which might be desired to be checked may be reviewed in a single search in a single database.

It is important to note that the "hit pool" which is generated by the search, is cumulative. That is, other search engines which do not use cumulative searching, must use multiple databases, creating lists from each database, and then cross-referencing each database to find out whether or not records match so that a multiple hit may be found for a single record of a particular item. Thus, the cumulative searching of the invention provides for immediate cross-referencing because all record numbers may be saved. All item identification numbers may also be saved, and the item identification number may be linked in a single index database to a record number for a work.

Referring to the process as shown in FIG. 21, the search as described above may be accomplished by using the key word search 356 process in conjunction with the word location database.

The key word search 356, as shown in FIG. 21, may begin with an input 602 process by which input fields may be received into the system 50. For example, a key word may be selected by which to search a field of a database containing information about a work of art. Fields may be stored in a single, massive, indexed database such as a word location database file configured as a complex database having multiple fields from other databases combined in a single field, certain characters of which then can be immediately recognized as identifying sources in the original databases. Fields may be kept separate by use of a field code containing a single letter designating which field a particular word originated from, including the location from which the record was taken. Each word may be coded so that a binding exists between a code number, letter, or combination of alphanumeric symbols associated with each word entry. Each word entry may be only given one appearance for one field of one database, regardless of how many times it actually might appear in any one field. Alternatively, a key word may not require a field code as it may be information from any field. A word location database may contain numerous records, each of which has both a word embedded therein, an item identification number, and one copy of each word. Thus single, massive file of binding data between words to be searched and codes can be used to locate the item number (item ID), the database of origin, the field within the database, and may have additional extractable information.

The input process 602, may be followed by a trim 604 process by which extraneous information, punctuation, double spaces and the like may be removed from the actual string of text and symbols input by a user. Following the trim 604 process, a field in a word location database may contain only significant words separated by single spaces and each occurring only once in the field. The set counter 606 process may be used to establish a looping procedure 605 for index selection. That is, the extract 608 process may operate to find the last word in a record. Thus, the last word in the last field may be selected from the input fields and further processed. That is, the copy 610 may extract a copy of the last word of the last field of the input field after which key word search 356 may attempt, during the delete 612 process, to remove the word so that it may not be used again. The preposition decision 613 may determine whether a removed word is a preposition, article, conjunctive, or other extraneous word. A positive response will return to extract 608 process to extract an additional word, thereby ignoring the extraneous word. A negative response to preposition decision 613 will advance to key word decision 614. The key word decision 614 determines whether or not the word selected may be from the key word input field. A negative output to the key word decision 614 may invoke the create 616 routine or process by which a search word may be created. Thereafter, a select 618 process selects which standard index may be used for the search. That is, different databases have different fields which may have their data extracted in turn as part of the input fields. Also, various indices exist for speeding up the processes of searching and for cross referencing related fields in different databases. If the result of the key word decision 614 is positive, the select 619 process may select the key word index in which to search.

The found decision 620 follows the extract 608 process. If a word was not found (extracted) the words in the input fields may be depleted. A positive output to the found decision 620 advances to the increment 622 process by which the counter which was set 606 is incremented. The search 624 process then searches the selected index, before advancing to the found decision 626 for evaluating whether or not a hit or record corresponding to the desired art work has been found in the database of the system 50.

A positive result to the found 626 advances to the create 628 process which creates a file, field, or other output identifying the item identification number unique to each work found by the search 624. A negative result from the found decision 626 advances the system 50 to a fuzzy 630 that may relax the requirements on the match needed to locate a work.

The retry decision 632 may provide for a return to the search 624 routine, following a positive result from the decision 632, or may simply return via the return path 634 to the extract 608 routine.

A negative response to the found decision 620 may advance the system to a set 636 routine for setting a loop counter for the loop 648, distinct from the counter of the set 606 routine. After a set 636, an index 638 process may set an unique index to search for an extracted word in a pool of hits generated by the 624 process. Unique indicates that an index only references the first occurrence of a unique hit. Only the first occurrence will appear when referenced. Thus, a hit that appeared several times as a result of the extract 608 routine, may be indexed only on its first occurrence.

A turn on 640 process turns indexing on for all those designated first occurrences in the result file. A delete 642 process then deletes all the indexed records which are turned on during the turn on 640. The turn off 644 may then turn the indexing off to be indexed again at a later time. After the turn off 644, a counter decision 646 determines whether the loop counter is less than one less than the counter set in the set counter 606 process.

If the result is positive from the counter decision 646, the return path 635 returns control to the index 638 process. A negative response to the counter decision 646 advances the procedure to the fuzzy select 650 process through the found decision 654. That is, the fuzzy select 650 may be completed if no match was found, after which a completed decision 656 may be encountered. The completed decision 656 determines whether a smart search 674 (See FIG. 22) has been completed. If the response to the completed decision 656 is negative, then the system 50 returns to the trim 604 process. If instead the smart search 674 has been completed, the system 50 advances to the return 658 from the completed decision 656. Similarly, a positive response to the found decision 654 advances to the return 658, which returns to the return path 634 or loop path 634.

Figure 21A:
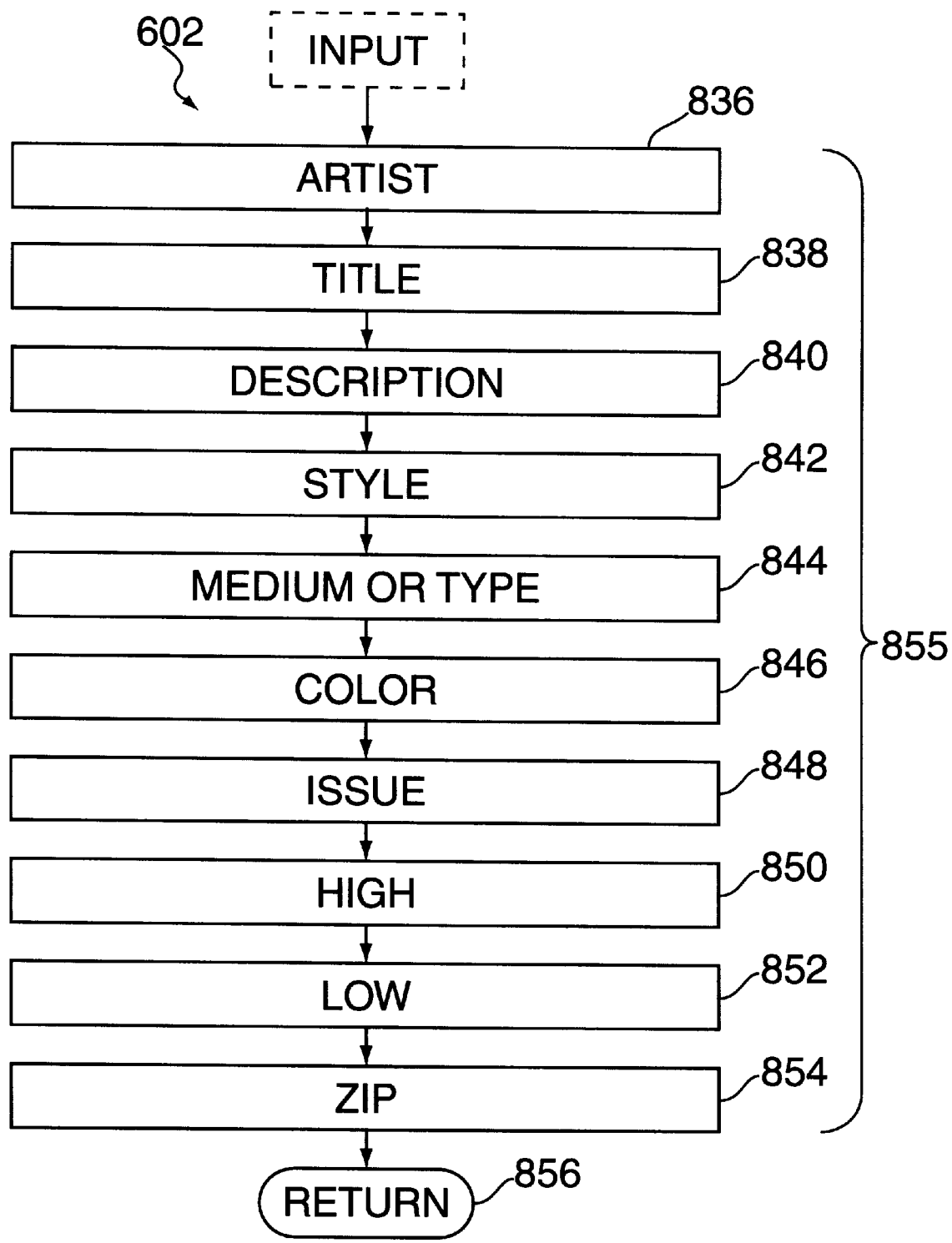
FIG. 21A is a schematic diagram of the input routine for the system of FIG. 21.

Referencing FIG. 21A (input process 602), the artist 836, title 838, and description 840 relating to a work of art may be saved as inputs in the input process 602. Similarly, a style 842 and medium or type 844 of a work may also be stored along with a color 846 designated. The issue 848 designates the date and year a work was produced by an artist. However, the issue 848, high 850, low 852 and zip 854 may not be particularly useful in searching, therefore, they may be used only after a key word search 356 has been completed and some need exists to further limit an otherwise overwhelmingly large list of art works output by the system 50. The high 850 may indicate the highest price paid within a period of time for the work in question, while the low 852 may indicate the lowest price paid in the same or similar time period. The zip 854 may indicate a zip code of a seller or potential seller having an art work listed by the system 50. Thus, a buyer may be referred to a seller who may be nearest to the buyer for purchasing a work. After the process is completed the input 602 advances to the return 856, to return to the keyword search 356.

The various input fields for the key word search 356 may be searched with Boolean operators. However, options are limited. That is, all fields in the input must be linked by logical "ands" or by logical "ors." Similarly, optional or alternative values in each field must be addressed by the same logical operator; that is, all "ands" or all "ors." Moreover, the logical operator must be the same across fields as within fields for a given search. A user may avoid this limitation by selecting query 357.

Figure 22:
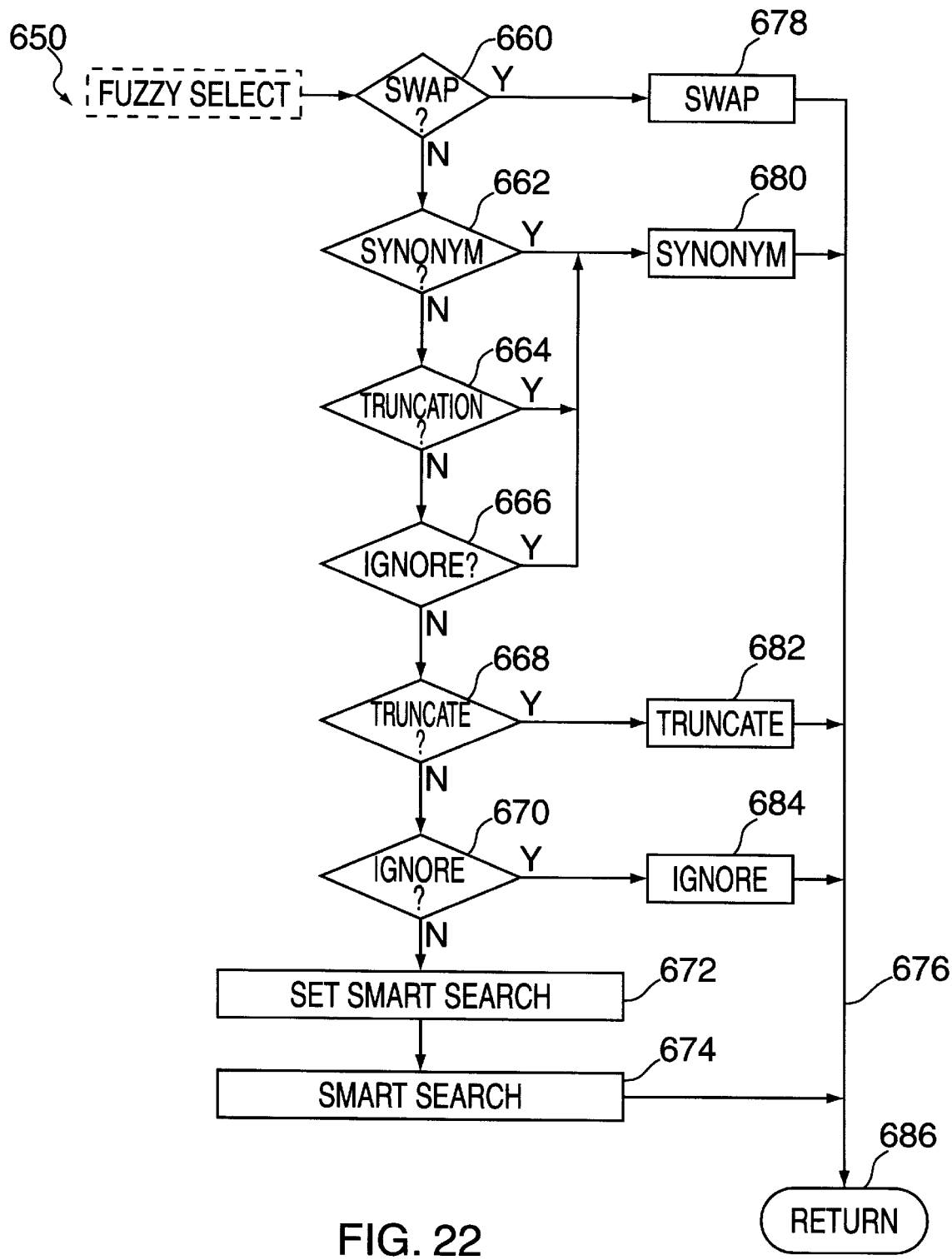
FIG. 22 is a schematic diagram of the fuzzy word select routine for the system of FIG. 21.

Referring to FIG. 22, the fuzzy select 650 may include a swap decision 660. That is, one field in a database may contain words of significance that are not found in another field. For example, a title 838 may include words that could have a significance in a description 840. Similarly a description 840 may have words that are not included in a title 838 but would be significant when searched by title. Thus, in certain circumstances, a search engine may be able to find otherwise unfound art works in the databases of the system 50 by swapping two fields. Thus, the swap decision 660 determines whether or not such a swap has been completed for a given search 356. A positive response to the swap decision 660 advances to a synonym decision 662. The synonym decision 662 determines whether or not a synonym for a word sought has been substituted during the searching process. A positive response to this synonym decision 662 advances to a truncation decision 664. The truncation decision 664 determines whether or not a word being sought by a search 356 has been truncated as the last action when a search progressed through the fuzzy select 650 within the key word search loop. If truncation was last tried, the system will attempt to find a synonym for the newly truncated word. Similarly, the ignore decision 666 determines whether ignore was last used to broaden a search. If this is the case, a synonym will also be tried before further "ignoring" occurs. The truncate decision 668 differs from the truncate decision 664. The truncate decision 664 determines whether or not truncation was the last previous process occurring in the fuzzy select 650. By contrast, the truncate decision 668 determines whether or not the truncate process 682 has been completed at all. A positive response to the truncate decision 668 advances to the ignore decision 670. The ignore decision 670 differs from the ignore decision 666 in that the ignore decision 666 determines whether or not the ignore process was the last process occurring in the fuzzy select 650. By contrast, the ignore decision 670 determines whether or not an ignore process 684 has been completed at all. A positive response to the ignore decision 670 advances to the set smart search 672.

The set smart search 672 may include a process for establishing the parameters that may be conducted by a smart search 674 following. The smart search 674 relies on additional logic besides exact matches to try to find a work matching the input fields input into the system 50 by the user. The smart search 674 returns to the return 686 via the return path 676, upon completion. Once smart search has been completed, the completed decision 656 will always return positive.

A negative response to the swap decision 660 advances to the swap 678. The swap 678 selects and swaps the contents of different input fields with each other, before advancing to the return path 676 and return 686. Similarly, a negative response from the synonym decision 662, a positive response from the truncate decision 664 or a positive response from the ignore decision 666 advance to the synonym 680.

The synonym 680 process searches a thesaurus of art-related terminology that may be used interchangeably, and selects a highest-priority (best) synonym for the word that did not result in a found art work in the database. The synonym 680 then substitutes the best synonym before advancing to the path 676 and return 686. The synonym 680 may advance each time that it is called (accessed, run, invoked) using each synonym until all synonyms have been used, or a hit has been registered; that is, a work has been found.

A negative response to the truncate decision 668 advances to the truncate 682 process that begins selective truncation of the word being searched. The truncate 682 removes the last letter of a word in an input field being used to find a match and tries again to find a match, returning to the path 676 and return 686. Each time the truncate 682 is accessed or invoked, another letter may be truncated until some minimum word length remains. Upon arriving at a minimum word length, a word is no longer truncated, but must be discarded or otherwise not used to advance the search 356.

A negative response to the ignore decision 670 advances to the ignore 684 process. The ignore 684 process removes the subject word from the input field in question from consideration as a matching requirement. Thus, a degree of freedom has been added to the search, not requiring that the ignored term match any longer with the entry in the database field corresponding to the input field in question. That is, every required field 836, 838, 840, 842, 844, 846 that must be matched with a work sought by the system 50 may tremendously narrow the potential results. Thus, a search 356 may be broadened by ignoring the fields 855 selectively, in favor of only certain selected input fields. The ignore 684 then advances to the path 676 and return 686.

Figure 23:
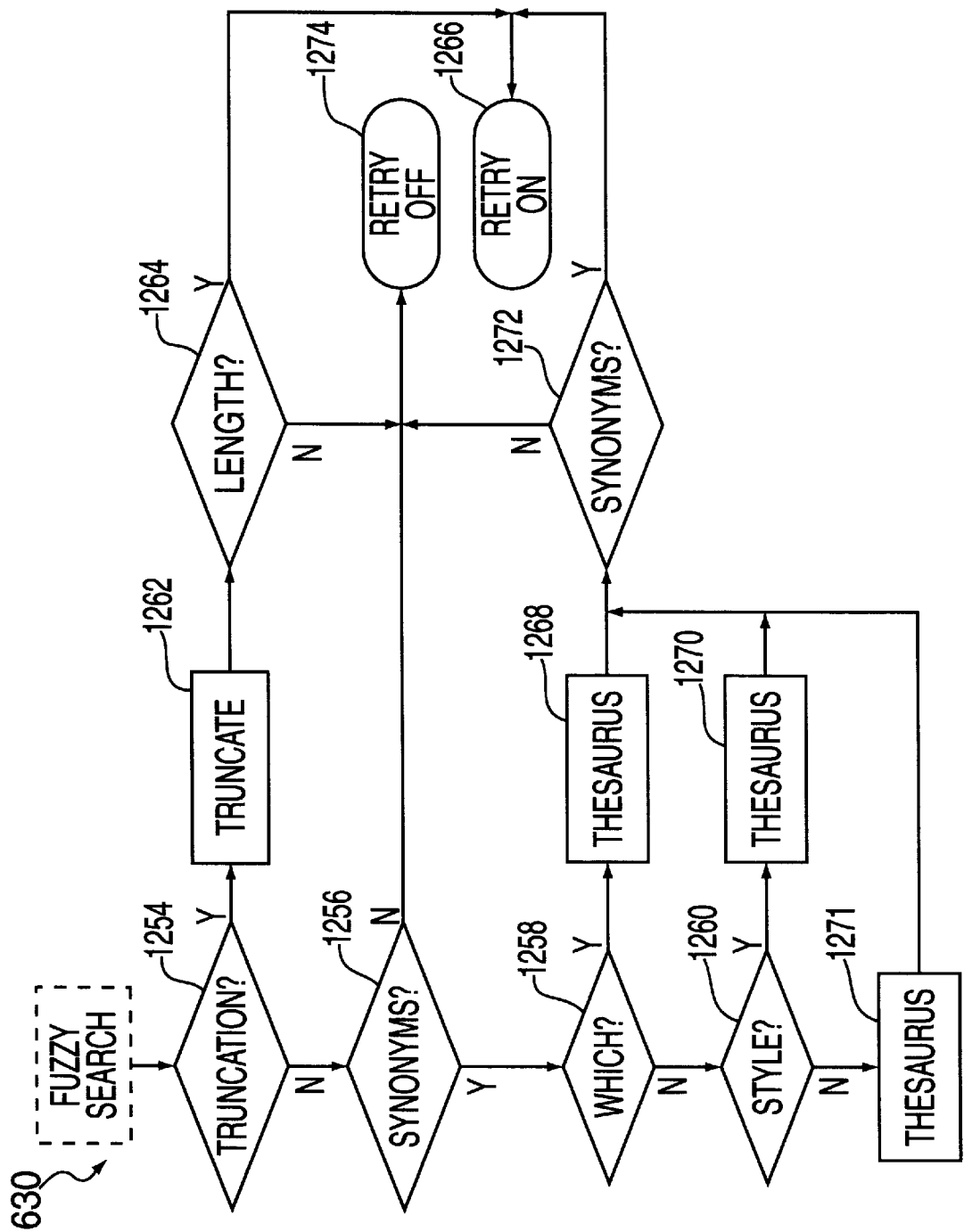
FIG. 23 is a schematic diagram of the fuzzy search for the system of FIG. 21.

Referring now to FIG. 23, the fuzzy search 630 may begin by entering a decision 1254 inquiring as to whether a fuzzy search for truncation has been requested. If such a search has not been requested, then the decision 1256 determines whether or not a fuzzy search for synonyms has been requested. If the result of the decision 1256 is an affirmative response, then the decision 1258 inquires into whether the title and description of a work is the input variable.

Meanwhile, if a fuzzy search for truncation was requested, then the decision 1254 advances the process 630 to the step 1262 which truncates one character from the search word in question. If the length is less than some criterion after the step 1262, then the decision 1264 advances to the return retry off 1274 which advises the process 630 that the word can no longer be truncated as a pre-determined minimum length has been reached. If the length of the search word is determined to be greater than the selected criterion, then the decision 1264 advances the process 630 to the return retry on 1266, which turns the retry flag on, to continue retries.

If no fuzzy synonym search has been requested, then the decision 1266 advances the process 630 to a return retry off 1274. Similarly, the decision 1258, achieving a positive response, invokes the step 1268 for checking a thesaurus for a synonym associated with a title or a description as an input. This procedure loops until the decision 1272 finds no synonyms left, after which the return retry off 1274 is returned by the process 630. Meanwhile, as long as synonyms are left, the decision 1272 returns a retry on flag 1266. In a similar manner, where style is the input, the decision 1260 advances the process 630 to the step 1270 for checking a style with a thesaurus containing stylistic synonyms. Again, this procedure loops until no synonyms are left in response to the inquiry 1272. A negative response to the style decision 1260 results in procedure 630 advancing to the check generic thesaurus 1271, checking the input against a standard thesaurus and return to decision 1272 which will loop until all synonyms are exhausted.

Figure 24:
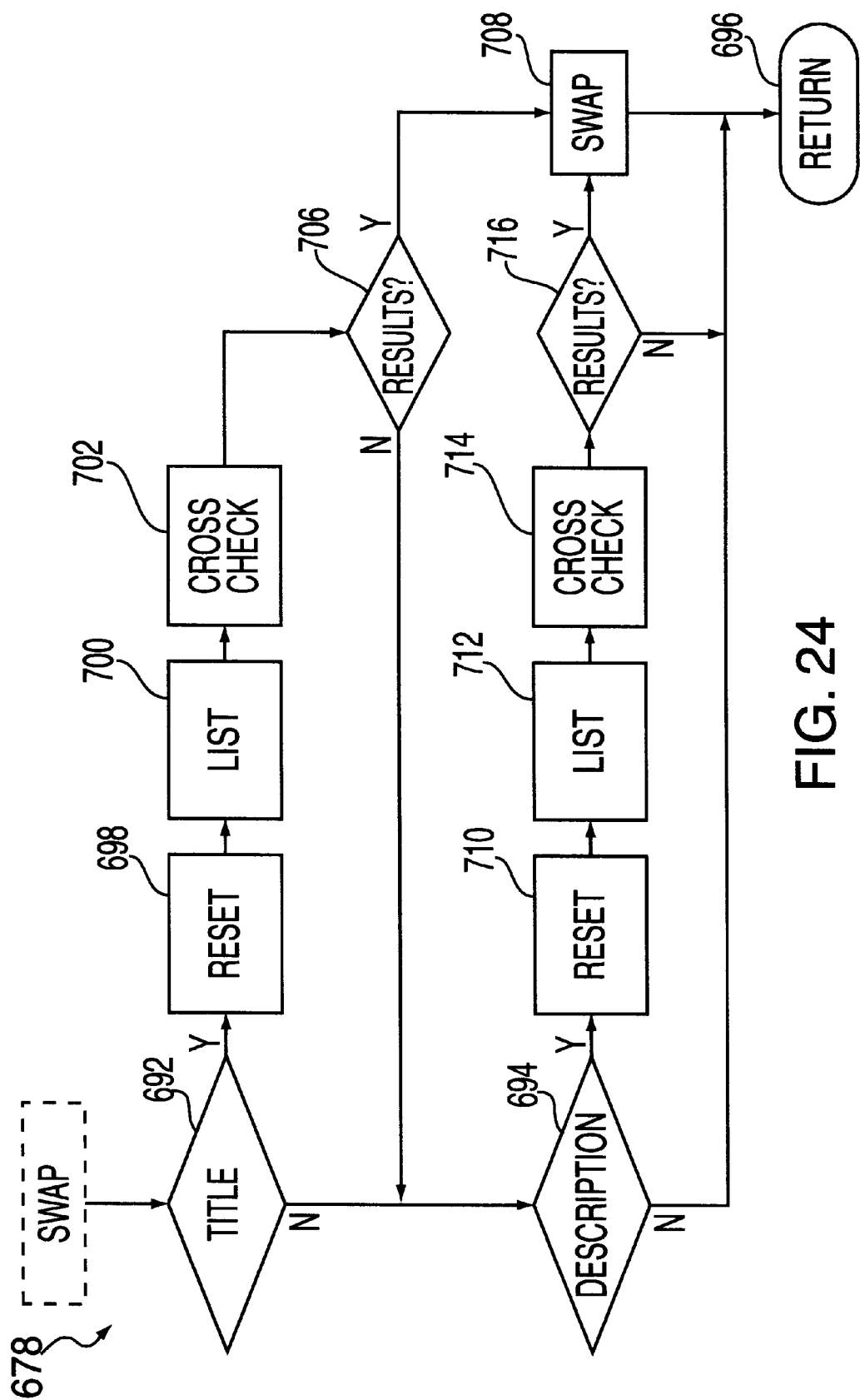
FIG. 24 is a schematic diagram of the swap routine for the system of FIG. 22.

Referring now to FIG. 24, a swap process 678 may begin with a title decision 692, a negative response to which may advance to a description decision 694. A title decision 696 corresponds to a determination whether the title 838 of the input fields may be an input being used to find a match. Similarly, the description decision 694 is a determination as to whether a description 840 may be included as an input by a user in trying to find a match with a work of art. Negative responses to both decisions 692, 694 advance to a return 696, and thus the path 676 and return 686.

A positive response to the title decision 692 advances to a reset 698 which may reset the counter set in the set counter 606 process to one lower than its current value. This will show the "hit pool" or results of the current key word search as they existed before this particular failed search was attempted, thereby restoring hits to be used when determining whether a swap will be successful. Next, a list 700 may create a short list of results that identify art works having a match with remaining input fields without the title 838 included. The list 700 process, upon completion, advances to the cross check 702. The cross check 702 uses an indexed search to rapidly check whether or not cross references exist between the short list generated by the list 700 process and the current hit pool. A successful cross check indicates that swapping will result in a hit. The cross check 702 may occur very rapidly by use of databases containing sophisticated indexing between the contents of fields of different databases.

A results decision 706 determines whether or not any matches (results) remain. That is, if no hits, (identification codes), are remaining then a swap 708 process will actually swap the description and the title. If a negative result may be obtained from the results decision 706, the swap process 678 may return to the description decision 694.

A positive output to the description decision 694 advances to the reset 710. The reset 710 resets the counter to a value one lower than its current value, just as the reset 698 does. Thereafter, a list 712 process may be invoked to create a short list of results (matches, hits, found art works identified) of those hits that would be hits without the description. Thus, the list 712 produces the unique item identification numbers of works, which can be used through an index to find the record containing all related information on that work; a result of dropping the requirement that the description 840 be matched with the works listed by the list 712.

The list 712 may be followed by a cross check 714 operating similarly to the cross check 702 through an index to provide an input to the results decision 716. The results decision 716 determines whether or not any works remain from the broadened scope of the list 712 that does not require the matching of descriptions 840 between a set of input fields of a requested search and the corresponding input fields in the database of actual works identified by the system 50.

A negative result from the results decision 716 advances to the return 696, while a positive result advances to the swap 708 swapping description and title to obtain the benefits described above.

Figure 25:
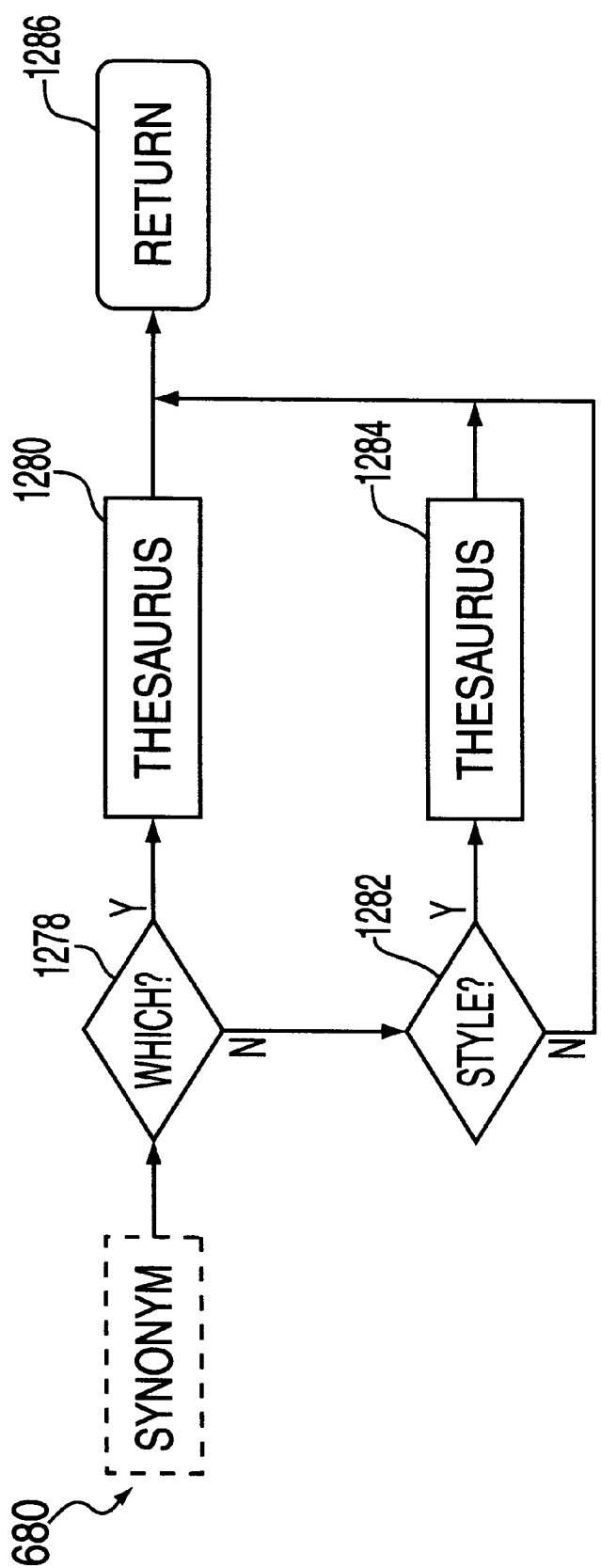
FIG. 25 is a schematic diagram of the synonym selection process for the system of FIG. 22.

Referring now to FIG. 25, the synonym process 680 may begin with a decision 1278 inquiring into whether the title or description is an input. If so, the step 1280 checks a thesaurus for a synonym and returns 1286. If the title or description is not an input, then the decision 1282 determines whether style is the input in question. If style is the input, then the step 1284 checks a style thesaurus for an appropriate synonym before advancing to the return synonym completed 1286. If style is not the input, then the decision 1282 returns to the step 1286. Likewise, the step 1280 advances the process 680 to the step 1286.

Figure 26:
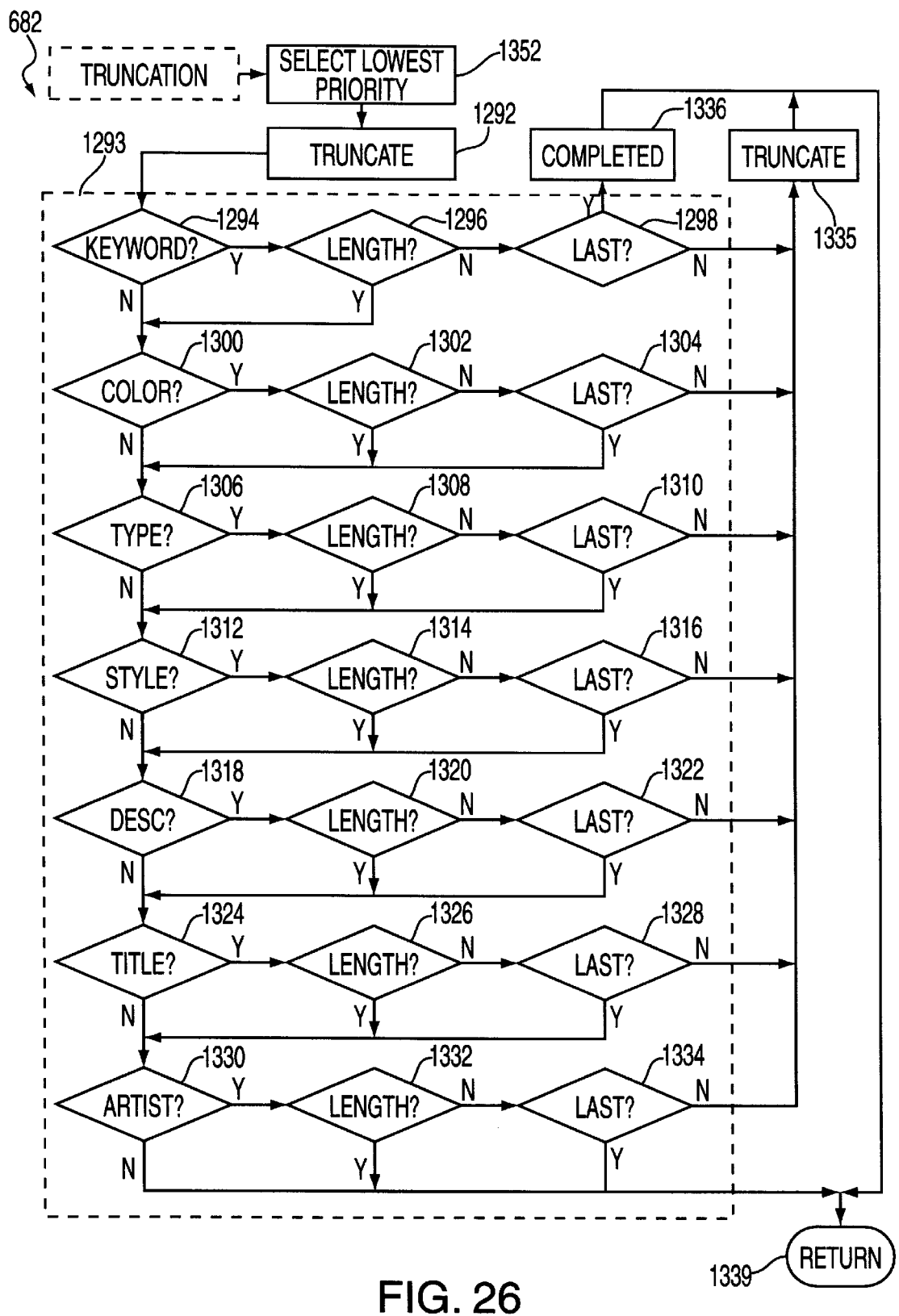
FIG. 26 is a schematic diagram of the truncation process for the system of FIG. 22.

Referring now to FIG. 26, one may note that the truncate process 682 may begin with select lowest priority 1352, and then truncating 1292 the search term by one character. The case statement 1293 determines, based on several criteria, whether to discard 1338 the search term, or to determine if the truncation is completed 1336. Either step 1336, 1338 may advance the process 682 to the return step 1339 returning any word remaining. Meanwhile, as may be seen from the logic flow of the case statement 1293, the decision 1294 determines whether or not a key word has been selected. The decision 1300 determines whether a color has been selected, 1306 determines whether a type of work has been selected, 1312 determines whether style has been selected as the criteria of interest, 1318 determines whether description is the selected criteria, 1324 determines whether the title is the selected criteria, and 1330 determines whether artist is selected. Correspondingly, the decisions 1298, 1304, 1310, 1316, 1322, 1328 and 1334 determine whether the last key word, color, type, style, description, title, or artist, respectively, is the last in the list being evaluated. Meanwhile, each of the decisions 1296, 1302, 1308, 1314, 1320, 1326 and 1332, respectively, may be set at some appropriate level of truncation to determine whether or not to proceed.

After exiting any of the decisions 1332 and 1334 with a positive output, the process 682 advances to the return 1339 which returns any amount of the word remaining after the truncation processes. Likewise, a negative response to the decision 1330 may advance the process 682 to the return 1339. Meanwhile, a negative response to any of the decisions 1298, 1304, 1310, 1316, 1322, 1328 and 1334 results in a discard process or step 1338 after which the process 682 may advance to the return 1339.

Figure 27:
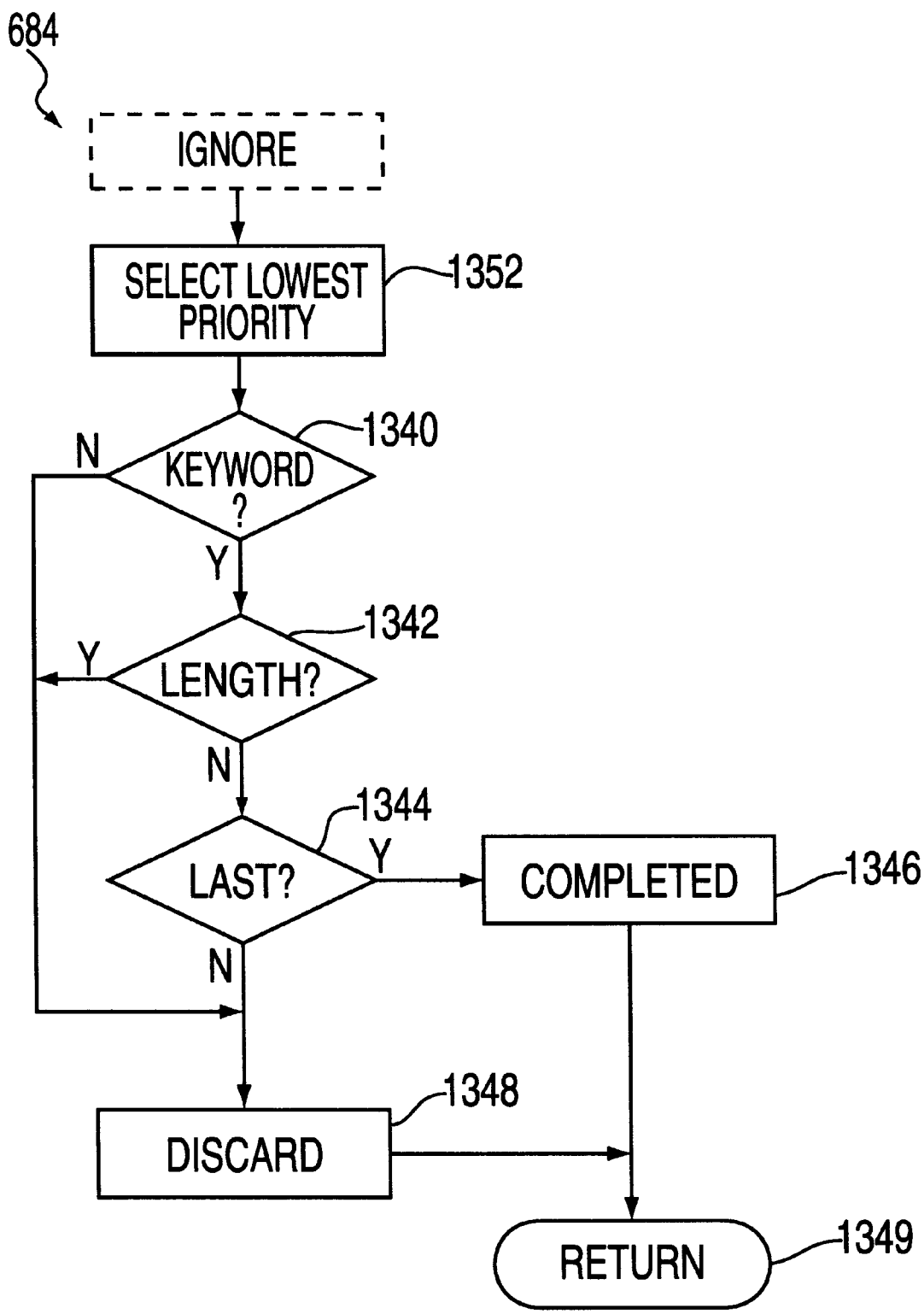
FIG. 27 is a schematic diagram of the ignoring process for the system of FIG. 28.

Referring now to FIG. 27, the ignore process 684 may begin with a select lowest priority step 1352 in which a criterion for priority is selected by a user, either directly or automatically in certain embodiments. Next, a decision 1340 determines whether or not a key word is the selected criteria input as the basis of a search. If a key word is selected, then the decision 1342 determines whether or not the length of the word is greater than some criterion, such as 50%, in this embodiment, of the original length of the word. If the word is no longer sufficiently lengthy, then the decision 1344 determines whether or not the key word in question is the last key word. If the last key word has been reached, then the step 1346 indicates to the process 684 that all possible "ignoring" has been completed. Meanwhile, if the key word is not the criterion selected in the decision 1340, then the process 684 advances to the discard step 1348. Similarly, if the length of the subject word is indeed greater than the criterion established in the decision 1342, then the process 684 also advances to the discard step 1348. Finally, if the key word in question is not the last key word in the list of available key words being evaluated, then the decision 1344 returns a negative result advancing the process 684 to the step 1348 discarding the word. After completion of the completed step 1346 or discard step 1348, the process advances to return 1349 returning control to the system 50.

Figure 28:
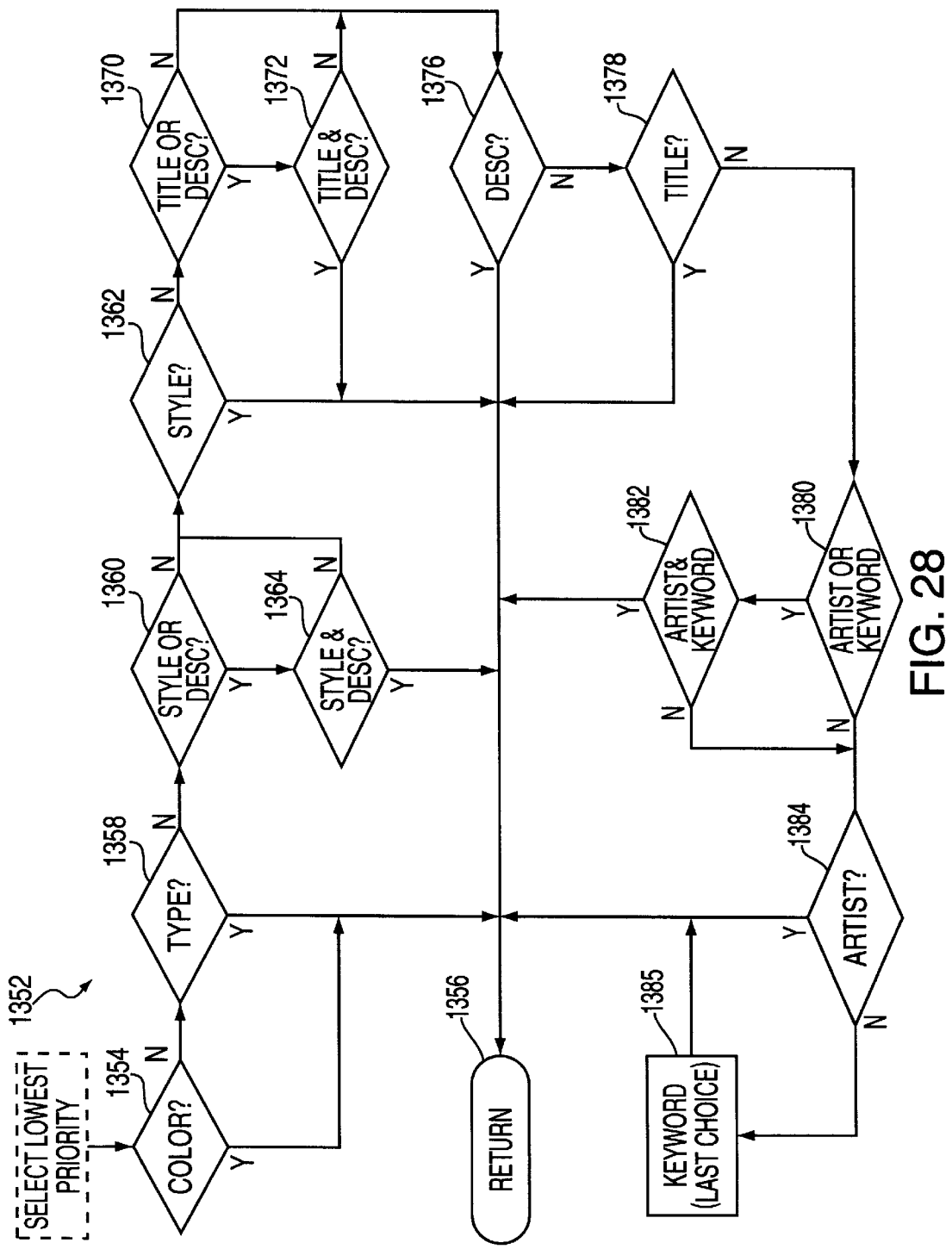
FIG. 28 is a schematic diagram of the select lowest priority information for the system of FIGS. 25 and 26.

Referring now to FIG. 28, the select lowest priority process 1352 may begin with a decision 1354 for determining whether a color is available for truncation. If so, then the return step 1356 may return the shortest word from the input field being evaluated. If instead, the color is not available, the decision 1358 may determine whether or not a type is available for truncation, which, if it is, may advance the process 1352 to the return step 1356. If type is not available, then the decision 1358 advances the process 1352 to the decision 1360 determining whether or not style or description is available for truncation. If one or the other is available, then the decision 1364 is reached to determine whether or not both style and description are available. If both are available, then the step 1356 is reached and returns the shortest word in either input field, style or description. If, on the contrary, decision 1360 or decision 1364 reaches a negative output, the subsequent step is the decision 1362 for determining whether style is available to truncate. If it is not, then the process 1352 advances to the decision 1370 for determining whether title or description is available to truncate. If the style is available to truncate, then the step returns the shortest word from the input field in question.

Meanwhile, if style is not available for truncation at the decision 1362, then the decision 1370 determines whether title or description is available, after which, like the decision 1364, the decision 1372 determines whether both title and description are available. If both are available, then the step 1356 returns the shortest word from either input field.

Meanwhile, if either of the decisions 1370, 1372 results in a negative output, the decision 1376 determines whether description is available for truncation, which, if it is may advance the process 1352 to the step 1356 returning the shortest word from the input field in question.

If step 1376 returns a negative response, the process advances to decision 1378 which determines whether title is available to truncate. If title is available to truncate, the process is advanced to the return 1356 returning the shortest word available in the title field.

If the title is not available to truncate, then the decision 1378 advances the process 1352 to the decision 1380. The decision 1380 determines whether an artist or a key word is available to truncate. A positive response advances the process 1352 to the decision 1382 determining whether or not both artist and key word are available to truncate. A positive response to the decision 1382 advances the process 1352 to the step 1376 returning the shortest word in either input field, artist, or key word.

Meanwhile, a negative response to either of the decisions 1380, 1382 advances the process 1352 to the decision 1384 inquiring as to whether artist is available to truncate. A positive response advances system to return 1356 returning the shortest artist word available to the system 50. Otherwise, a negative response to decision 1384 advances to the keyword 1385 and then to the return 1356. If the artist's name is available for truncation, then the next step is step 1356 returning the shortest word from that input field to the process 1352 for use by the system 50. A negative response to the decision 1384 advances the process 1352 to the step 1356 returning the shortest word from the key word field in question, rather than the artist field.

Figure 29:
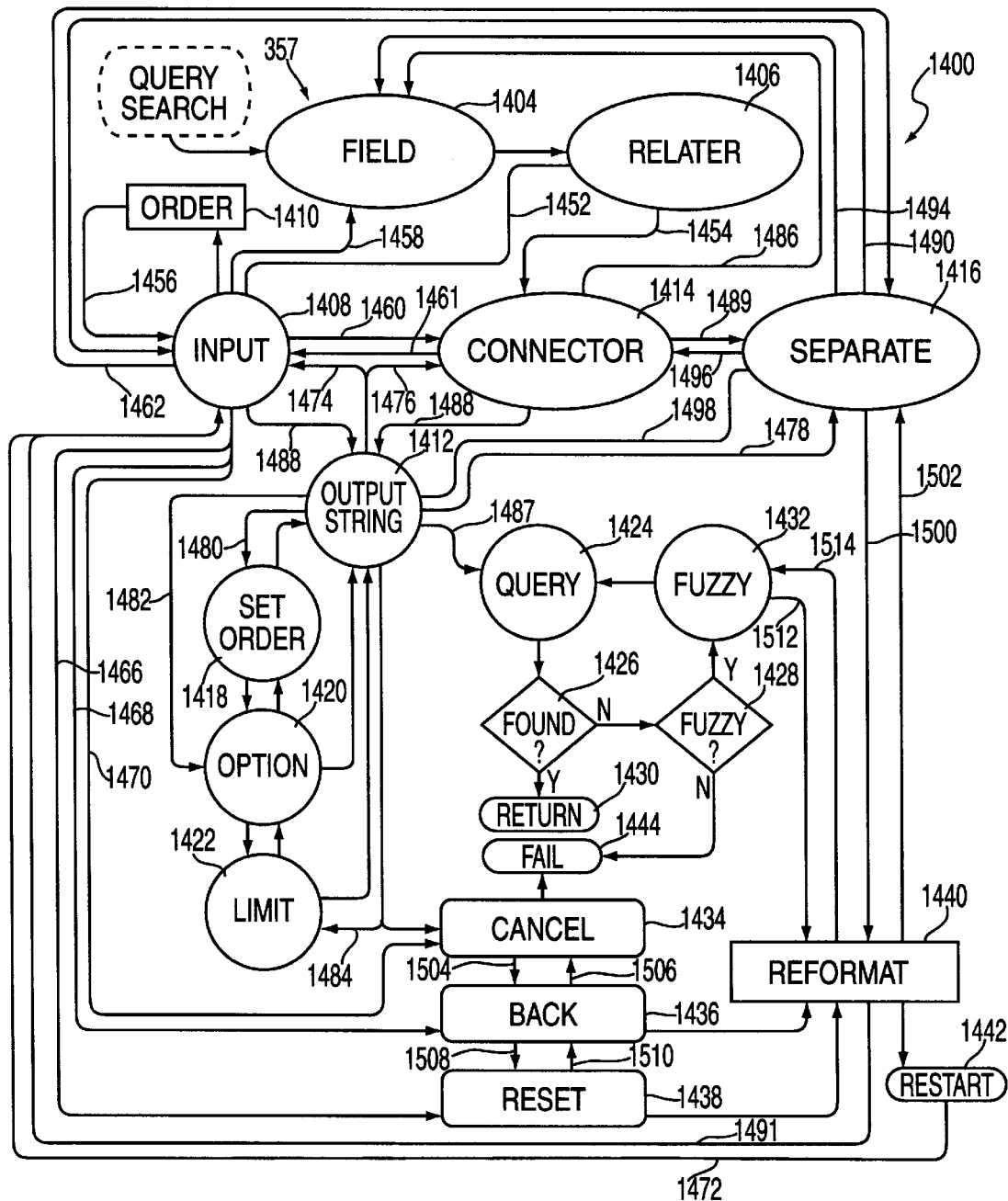
FIG. 29 is a schematic diagram of the query search process for the system of FIG. 6.

Referring now to FIG. 29, an input process 1400 may be represented on a screen of a monitor to a user. The process 1400 may include several programming objects 1404–1442 or functional objects 1404–1442. Each functional object 1404–1442 may correspond to a subroutine, a program, a process, or the like in an object-oriented environment. That is, objects in computer programming have characteristics readily input and used in operations. Those who are skilled in the art are familiar with use of objects and assignment of characteristics of objects. In an apparatus and method in accordance with the invention, each of the objects 1404–1442 may include numerous steps, processes, and inherent characteristics assigned by a programmer upon creation of an object, and provided by a user in each specific application or use of the input process 1400.

Corresponding to each of the objects 1404–1442 may be an icon, button, menu entry, or other graphical user interface device for interaction with a user. Thus, a user may click, select, open, or otherwise engage an object. For example, a user may click on a button presented on a monitor to open or operate the query search object 357 to start the process 1400. (Note—357 is a "button"/object and not a process. The process which executes upon selection of 357 is the input process 1400.) Upon engaging or operating the query search 357 from FIG. 6, a user may be presented with a field 1404 selection object. The field 1404 selection object allows a user to select which field or fields are to be used in a query.

In one embodiment, the field selection object 1404 may be represented as a pop-up menu on a screen presented to a user. Pop-up menus have the advantage that they may be represented to have various lengths, may change contents, and may change positions on a screen. In one embodiment, the field selection 1404 may initially present a menu of options for a user. For example, artist, title of a work, description of a work, style of a work, medium in which a work is rendered, color, underlying support material (canvas, cardboard, masonite), or key word may all be shown. The key word selection may provide a search of all other fields available in the field selection object 1404. Thus, a key word may be compared with an artist's name, a title, a description, or any other parameter.

Upon selection of an entry from a pop-up menu in the field selection 1404, the name of a field may be passed to the relater object 1406. In general, relaters may include Boolean operators, logical operators, fuzzy logic operators and the like. However, in one embodiment of an apparatus and method in accordance with the invention, relaters available to a user in the relater object 1406 may initially be limited to an equality or an exact equality. That is, an equality may indicate that the contents of a selected field exist in a field searched. Absolute equality may indicate that an exact match, having no more letters or symbols and no fewer letters or symbols has been found. One advantage of initially providing only for an equality and an absolute equality may be that a search initially benefits from some limitation. That is, processing time is substantially reduced if the breadth of a search may be bounded promptly.

The relater object allows a user to select a relater such as an equality or absolute equality to be used in a query. Certain relaters other than equalities and absolute equalities may also be used. If a field selected for searching includes a key word, a title, or a description of a work, nine operators may be available for a search. As mentioned, these nine operators may not be available initially, but only after a flag has been set by the input 1408 object in conjunction with the connector 1414 object to indicate that a search has been bounded. If a key word, title, or description is included in the field selection provided by the field selection object 1404, then the following relaters are available: = (is or equals), == (exactly equals), ! (logical not), means (is synonymous with), opposite (is an antonym of), like (is a morphological match for), unlike (is a morphological opposite of), SNDSLK (sounds like or is a phonetic match for), and INC (includes, anywhere within the string).

If the field of interest from the field selection object 1404 includes artist, then some possible relaters may include: = (is), first name (an artist's given name), last name (an artist's surname), like (a morphologically similar word), unlike (a morphologically dissimilar word), SNDSLK (a phonetically similar word), or related. Related indicates that some abstract functional relationship has been created that records a relationship between two artists. Not related may be used to indicate that a relationship exists, but is not used. For example, an abstract relationship between artists is created through a hierarchy of similarities that is established between particular artworks, publishers, museums, galleries, artists, and the like. Relationships may be established between certain pieces according to an expert's opinion. Relationships may be based upon numerous factors determined by an expert in art that may be used to compare artworks or artists. Thus, a relational link may be established for the specific purpose of searching for related artists according to the expert opinion. For example, publishers may carry works of several artists. Such a relationship may imply that such works or such artist are related for a logical reason. It is not needed to establish what the relationship is. The fact that these works appear in the same gallery or in the same publisher's portfolio may indicate that a relationship is perceived. This relationship may be recorded. Styles, origins of artists, periods of artists, and the like, activities, subjects, or media may be used to relate artists or works to one another. Two artists may show no relationship directly. Instead, numerous works of each artist may show several relationships with numerous works of the other artist. Therefore, it may be logical to assume that some relationship exists between the artists. Thus, a relationship between artists may be implied by other common factors found in classifying their works.

A user or programmer may determine some criterion for relationships. For example, a number of relationships, a combined total of all relationships, or the like, may be used to determine whether some threshold percentage, or number of relationships exist. If the threshold is met, then a relationship may be established as a digital decision. That is, a relationship is deemed to exist.

If the field selection object 1404 results in selection of a publisher, another set of relaters may be used. For example, a user may use the symbol "=." This symbol may be used to mean that a user must select a publisher's name from a list of publishers provided. Alternatively, an "also published by" option may be provided. This option may allow a user to input the name of another artist. The process 1400 may then locate all publishers who publish the named artist. Thus, not knowing the name of a publisher may be cured by knowing another artist also published by the same unknown publisher. Thus, a list of publishers from whom to select is provided. Publishers may be listed by number and searched by number. That is, since no use would be served by searching for a publisher not contained in the system 50, and to avoid missing a name due to misspelling, all publishers may be searched by an indexing number. Thus, a forced selection may be made to assure that a user does not request an invalid publisher, or find no result.

If style is a field provided by the field selection object 1404, then a specialized set of relaters may be provided in addition to the following: =, ==, !, related to, and not related, as discussed above. These specialized relaters are referred to as "expert sets". These sets may indicate that a user wishes to use the system to provide some series of appropriate inputs based upon an "expert's" knowledge of a specific subject. Similarly "expert sets" are available for the fields "medium" (indicating the medium in which a work is created), "edition type" (such as a limited edition, open edition, premier edition, conservation edition and the like), "support" (the material underlying the medium, such as masonite, canvas, etc.), and "color" (predominant color or schematic color).

The expert sets may be regarded as specialized relaters. These specialized relaters do not require input strings. Similarly, publishers do not require an input string. That is, since these types of relaters may be programmed inherently within the process 1400, each may have a number, or be pre-input. These types of relaters may include, for example, for "style"; contemporary, traditional, American, European, ethnic, and other types created by an expert in the field. Thus, although various styles may exist, if a match is found for one of these types of styles, all styles within this style type may be included in a search string. As a practical matter, a multi-tasking operating system may conduct multiple searches across all styles that fall within a type of style, simultaneously. Alternatively, other pseudo-multi-tasking operating systems may also branch to conduct such searches as rapidly as possible, rather than sequentially. As an example, surrealist, fauvist, dadaist, modernist, and the like, might all be included within the "contemporary" type of style. Similarly, western, wildlife, landscape, historical, still-life, military, and the like might be included in a "traditional" type of style. Thus, selecting the contemporary "expert set" will allow the system to identify all contemporary works without requiring the user to have a knowledge of contemporary art styles.

Media expert sets may include, for example, painted, drawn, printed, sculpted, and assembled. Such categories might include various individual media. For example, a painted type of medium might include acrylic paints, oil paints, watercolors, or the like. Similarly, the sculpted type of medium might include clay, bisque, granite, bronze, or the like.

An edition type expert set might include the categories of: original graphic, limited edition, open edition, remarque, or proof.

Color expert sets may be a specific color, a shade, or some other dichotomous criterion. For example, dark, light, hot, cold, bright, dull, and the like may be used as designations for categories of color.

Support expert sets may include, for example, fabric or cloth-like, wood-like, stone-like, metal-like, clay-like, or plastic-like support. In one embodiment of the process 1400, a search query object 1424 might search for a certain criterion within a support field. If no result is found, the search might be continued with a similar criterion in media. Similarly, medium may have the same classifications as support.

A work type expert set may include several classifications, likewise. Work types might include, for example, original painting, original graphic, print, sculpture, cel (animation art), reproduction, stamp print, film or movie industry art, or non-art. By non-art, an expert set might include and provide knowledge of certain representations, images, media, and the like that have come to have value, although not originally intended as art. For example, certain signage, advertising art, posters depicting celebrities, etc. may come to be items of commercial value to collectors.

When exiting a relater object, initially, a path 1454 may not be available. That is, several paths 1452–1510 may provide transfer of data between objects 1404–1442. As a practical programming matter, a path may be selected through a case statement, a decision, or may be a default taken absent input or regardless of input or output. Thus, the relater 1406 may be exited through either path 1452, 1454. Information contained in a field selection 1404, combined with a relater 1406, may be passed to an input object 1408, creating a search string. After a search is underway, and has been adequately limited, advanced relaters may be available, as mentioned above, from the relater object 1406. Advanced relaters may not require an input from the input object 1408. Thus a search may exit the relater object 1406 by the path 1454 to provide the connector object 1414.

Upon exiting the relater object 1406 to the input object 1408, the process 1400 may provide direct input from a keyboard by a user. Alternatively, in certain embodiments, the relater object 1406 may provide certain inputs directly.

An input object 1408 may take a field selection from the object 1404, such as "artist," add to it the relater from the relater object 1406, such as "equal," followed by a string of letters corresponding to an artist's name. The input 1408 may then output this completed relation including a field name, a relater, and an input to an order object 1410 for ordering. The order object 1410 may be embodied in a recursive routine for determining the proper logical hierarchy for searching, and for providing the fastest execution hierarchy for searching. The order object 1410 may include a process, step, procedure, thread, or the like that recursively is called. By recursively calling itself, such a routine may evaluate numerous strings and segments of strings provided by the input object 1408. The order object 1410 may thereby determine what it is working with and then properly order all the string segments or strings with which it is working.

Upon completion of ordering a string, an order object 1410 may pass a newly ordered string along the path 1456 to the input string for forwarding directly over the path 1464 to the output string object 1412. In one presently preferred embodiment, the input string may be passed as a matrix or an array. Elements in the array may correspond to fields in a database or to registers or memory locations in a memory device.

In one embodiment, enablement of a fuzzy logic flag or fuzzy flag, permits a user to exit the input string object 1408 along the path 1462 to the separate object 1416. The user may also select a path 1458 or path 1460, returning to the field selection object 1404 or connector object 1414, respectively. Advancing to the field selection object 1404 adds additional search strings including field selection, relater and input strings, as previously described.

In one embodiment, a user may advance along the path 1460 to the connector object 1414. A user may then be presented with an opportunity to use a connector selected from "and," "or," or "less." In logically understanding an "and," a VENN diagram is often used. In a VENN diagram, an "and" is represented as the intersection of two sets. An "or" is represented as the union of two sets. A "less" connector may be represented by the union of two sets less the intersection of the same two sets. Thus, "less" may be used to indicate "or" less the "and.

In the preferred embodiment, an input 1408 may set a flag. The flag may correspond to a search time returned by the output string object 1412, indicating that search times are sufficiently short that fuzzy logic may be used in additional searching. As a practical matter, a flag or fuzzy flag indicating the availability of fuzzy logic searching may not be enabled immediately. That is, until any additional searching is connected by another "and" operator, the previous searching relaters are not limiting or bounded. That is, an "or" connector may broaden a search rather than narrowing it. Thus, until a connector object 1414 adds an additional "and"

to the input of the object 1408, the fuzzy logic may not be enabled by the fuzzy flag.

Once a fuzzy flag is set and a further-limiting connector is selected (e.g. "and"), the process 1400 may advance via the path 1461 to the input object 1408, the path 1486 to the field selection object 1404, the path 1489 to the separate object 1416, or the path 1488 to the output string object 1412. If the user is satisfied with the status of a search string and the relaters therein, no additional connectors are required from the connector object 1414. Thus, a search string or array may be passed to the output string object 1412 and then directly to the query object 1424 via the path 1487.

An output string object 1412 may evaluate the matrix provided by the input object 1408. That is, an estimation of search time may be provided by the output string object 1412. The object 1412 may also present to a user, through a graphical user interface, a representation of the matrix of inputs. In addition, the object 1412 may provide an editable copy for correction by a user. In one embodiment, upon outputting the time estimation, the object 1412 may return along the path 1474 to the input object 1408. Similarly control may be returned to the connector 1414 object along path 1476, if the output 1412 object was initially accessed via the path 1488. A user may then be presented with the option to return to the field selection object 1404 along the path 1458, advance to a separate object 1416 along the path 1462, return to add an additional connector in the connector object 1414 along the path 1460, or to select, such as from a button bar, another option. Some of the options provided by a button bar may include a cancellation through a cancel object 1434, a back object 1436 for returning to a previous point in the string preparation process, or a reset object 1438 returning the entire process 1400 to the query search 357, clearing all memory registers.

A user may select between the objects 1418, 1420, 1422, at will, passing back and forth along the paths 1504, 1506, 1508, 1510.

A separate object 1416 may provide several options to a user. One principal function of a separate object 1416 may be to provide hierarchy other than a Boolean mathematical hierarchy inherent in relational symbology. For example, parentheses may be provided as open parentheses or as automatically closed parentheses. That is, a user may have the option to place opening and closing parentheses at will. Parentheses indicate information to be treated as a unit. In one embodiment, automatically closing parentheses may, upon selection, automatically close all open parentheses at the location of a cursor. Alternatively, a user may individually close parentheses at different locations from one another. Thus, a user may rely on a computer to do a count of parentheses and proper closure.

Another symbol provided by the separate object 1416 may include brackets visibly distinguishable from parentheses indicating priority. That is, a user may select a rectangular bracket, for example, to indicate that operations within such a bracket are to be executed first, before any other operations. Such brackets may also be input as open brackets or as automatically closed brackets. User-selectable priorities for execution may be particularly useful when using "or" logical connectors.

The process 1400 may exit the separate object 1416 by several paths 1490, 1494, 1496, 1498. In one presently preferred embodiment of an apparatus and method in accordance with the invention, the process 1400 may be required to take the path 1498 to the output string object 1412, thus adding the logical separator selected to the output string.

Thereupon, the process 1400 returns by the path 1478 to the separate object 1416. Alternatively, if all separators are closed, the output string object 1412 may advance the process 1400 directly to the query 1424 along the path 1487.

A return to the field selection object 1404, input object 1408, or connector object 1414 may result in the processes as previously described. However, a return from the connector object 1414 to the input object 1408 by the path 1461 may allow addition of multiple strings. That is, for example, input strings may be stacked. So long as the field selection and relater are not changed, addition of more input strings in the input object 1408 may automatically engage the last field selection and relater used.

Alternatively, a user may pass from 1416 through the output string 1412 to select the restart object 1442 via the reset object 1438 and reformat object 1440. The process 1400 may then exit the object 1442 by the path 1492, restarting the entire process 1400. Thus, selection of the object 1442 may be thought of as a return of the process 1400 to the object 357.

Alternatively, a user may select the back object 1436 or the cancel object 1434. The cancel 1434, back 1436 and reset 1438 objects may operate equivalently to the method described above in association with the input object 1408 exited by the paths 1466, 1468, 1470.

A user may be presented with a menu-type button-bar 1418, 1420, 1422 after exiting the output string object 1412. Any time that a completed output string is available, a user may elect to add certain options to a search before beginning the search process with the query 1424. A user may select from a menu selection, such as by clicking or selecting a button, the path 1480 to the set order 1418 object, the path 1482 to the option object 1420, or the path 1484 to the limit object 1422.

The set order object 1418 may display a list of operations as they would be executed by the process 1400. Such operations may be represented in a list. The list may include entries showing each operation in its order. A user may then be provided the option to drag or move a graphical object corresponding to each entry into a different location in such list of entries. Thus, a user may rearrange, due to insights not accommodated by the computer, an order of operations. The graphical user interface associated with the process 1400 may be programmed to rearrange the presentation on the computer monitor. Thus, a user may be presented with the logical search "equation" exactly as it may be executed by the computer, as edited or modified by the user.

The advance options object 1420 may be accessed by a button. In the currently preferred embodiment, the option object 1420 may present 5 options. These options may be recognizable by the query 1424. One option may include retaining the order of words in a string. Thus, the order in which words are input may be given significance recognized by the search process 1400. Alternatively, the order may be ignored such that the association of various words in a string may be searched in all possible combinations. In one currently preferred embodiment, order of terms may be ignored. Another advanced option is to retain prepositions. That is, in general, prepositions may be ignored as having no significance. In this, second, option, prepositions may be deemed significant.

In general, a search may be conducted faster if an implied "and" is placed between each pair of words in a string. However, a user may desire to search for each possible word in the string. For example, "a boy with a dog" may be selected as a description of a work. Logically, prepositions may be removed. Thereafter, searches would be made for works containing both a boy and a dog. Alternatively, this third option may provide a user with the choice to search for paintings containing either a boy or a dog. Thus, a logical "or" is provided to replace the implied logical "and."

A fourth option may include the opportunity to use the "less" operator. As described above, the less operator is the union of two sets less their intersection. A "less" may be used to replace a logical and implied "and" between every pair of words, with a logical "less." One may note that the "less" operator necessarily has utility only where more than one word exists in a string. For example, a user may input a broad description of what is desired to be found, followed by a listing of names, features or subjects that are desired not to be included. Thereafter, a logical "less" may be used, thus cutting out all of the undesired pieces from the desired category of desirable pieces.

A fifth option may limit a search to entire words. That is, certain aspects of searching may include truncated words. Thus, suffixes and prefixes in words may be stripped away, leaving only roots for some limited combination or letters. In certain circumstances, such truncation may unduly broaden a search. Thus, a user may elect to require that only entire words be used in a search comparison. In general, a user may be permitted to select multiple options within the object 1420. All options may then be used in a search.

A limit object 1422 may include numerous options for limiting a search. The limiters from the limiter object 1422 are used after a search has actually been completed. Thus, the limiters may be used to limit what is presented to a user, but without changing the nature of the search itself.

Some of the limiters that may be used may include a name of a city, state, or province. A postal code or zip code may also be used. A designation (flag) may indicate that an image is associated with an item sought. This may be useful when a user desires to see a piece, which may be transmitted over an electronic network or inter network 54. Alternatively, a piece may be identified by textual description without an attached image being available. A retail price, a market price, or issue price may be used to limit the results of a search. These numbers may not be useful in searching, that is, selecting a price of any kind is usually unlikely to indicate useful information about a work until other criteria have been used. Nevertheless, a customer may often be interested in the best price available after the work has been located and, therefore, such interests may be used to limit a result to only those pieces which may be applicable to a user's immediate needs. Additional limiters may include an edition size, an issue date, a work type, an artist's birth date, whether or not an artist is living or deceased, a city, state, or country of origin for an artist, or the like. In certain circumstances, image size may be very important. Also, a trend of market value may be used.

In certain circumstance, new information such as a city or a state may be specific. However, in other instances, a range of zip codes or postal codes may be desirable. Thus, a geographical area may be indicated by a range of zip codes rather than a specific zip code.

Likewise, a range may be applicable for a retail price, a market price, an issue price, or the like. Similarly, an edition size may be input as a range of maximum and minimum sizes of interest. Additionally, an issue date, a date of birth, and a trend may be limited by range. For example, a desired trend may be upward and may be designated as a percentage of base value. Likewise, an image size may be designated by a range. Moreover, an image range may be described in three degrees of freedom (width, height and length). That is, a sculpture may have both a footprint of area occupied on a floor, as well as a height. A painting or other graphical image may be presented in two dimensions.

A reformat 1440 object may be accessed from the back 1436 object, or the reset 1438 object, the separate 1416 object, or the fuzzy 1432 object. In the case of the back object 1436, the memory allocated to the array of a search input needs to be reformatted to remove the last relationship established. In the case of the reset object 1438, the array of memory needs to be cleared. In the case of the separate 1416 object or fuzzy 1432 object, the array may need to be rearranged due to additional separators added by the separate 1416 object or due to the reformatting made by the fuzzy 1432 object to further broaden the search. The reformat object 1440 may accomplish any of these, depending upon how it is accessed.

If the back object 1436 engages the reformat object 1440, then the process 1400 advances to the input 1408. If the input object 1416 is not available, due to the current input sequence, the combination of objects 1404, 1406, 1408, 1414, 1416 may default to the field selection 1404. That is, if insufficient information is contained in a search string, then the process 1400 must build a sufficient strength to operate the query 1424. Until a search string is sufficiently determined to operate the query 1424, the process 1400 is effectively starting at the start 357 as described above.

If the reformat object 1440 is accessed from the reset 1438, the process 1400 must be restarted. Thus, the process 1400 advances from the object 1440 to the object 1442 when entry into the object 1440 was initiated from the reset object 1438. One may note that the restart 1442 is also equivalent to the query search 357. If the reformat 1440 object is accessed from the separate 1416 object via the path 1500 or from the fuzzy 1432 object via the path 1512, the procedure may return directly to the process from which it was called via the paths 1502, 1504, respectively.

The query 1424, shown in FIG. 29 (also referred to in FIGS. 22–28), might operate similarly to the key word search 356 of FIG. 21. However, certain options may be exercised. For example, referring to FIG. 21, the decision 626 and steps 628, 650 might be repeated numerous times. However, some portions of the key word search 356 may not be necessary. For example, the copy step 610, the delete step 612, the select step 618, and select step 619 might be made superfluous. Since inputs may be saved in a matrix format, a string need not be decomposed. Rather, elements of a string may be arrayed for individual access by the query 1424. Again, no cross-referencing need be required.

Cross-referencing is a common technique used to determine a smaller sub-set from a larger set. An intersection of multiple sets may be used as an output. For example, a large data base may be searched for a specific input in one field. The same data base may be searched again for another criterion in another field. Thereafter, all records which provided hits for each search may constitute an intersection of the two searches. Nevertheless, every record of such a database must be searched for each criterion (input in field). By contrast, in one currently preferred embodiment, a query 1424 may copy from a database all records providing hits in response to a specific search criterion (input string, or input string array element). This subset of the original database may be written to a location in memory. Any subsequent search may be conducted on this smaller subset. With each search, the subset may be reduced. Likewise, as a safety feature, duplicate copies may be saved at any level of search in the event that an "or" is required. That is, once a search has been narrowed, all non-selected elements may be erased. In the event that an "or" may be used in a search, a duplicate copy of the searched subset may need to be saved through one step of searching.

Upon evaluating the continually-shrinking file or set of records, the set of all records meeting all search criteria may be saved from an array to a separate database. This separate database may reflect the entire search result.

If, at any step of searching, the query 1424 finds no hits, an output communicating the same may be provided. However, the query object 1424 may still have the last complete set of search results before the search that provided no hits. Thus, the process 1400 may advance from the query object 1424 to the decision 1426. If a file or result exists, a return 1430 may return a true response, and identify the saved result. If, in response to any particular search, the decision 1426 results in a negative result, then a user may be presented with the decision 1428. The decision 1428 permits the user to select a fuzzy object 1432. A user may, instead, advance to a return 1444 that may return a fail. If a user selects a fuzzy search 1432 in response to the decision 1428, then the processes described in association with the fuzzy search 630 of FIG. 21 may be executed. That is, the fuzzy object 1432 may include any or all of the fuzzy logic associated with the fuzzy search 630 of FIGS. 21 and 23.

The fuzzy search 630 is expanded in FIGS. 22–32. FIG. 22 actually deals with the fuzzy select 650 of FIG. 21. In general, however, the selection 650 and execution 630 of a fuzzy search may be embodied within the fuzzy search object 1432 of FIG. 29.

Figure 30:
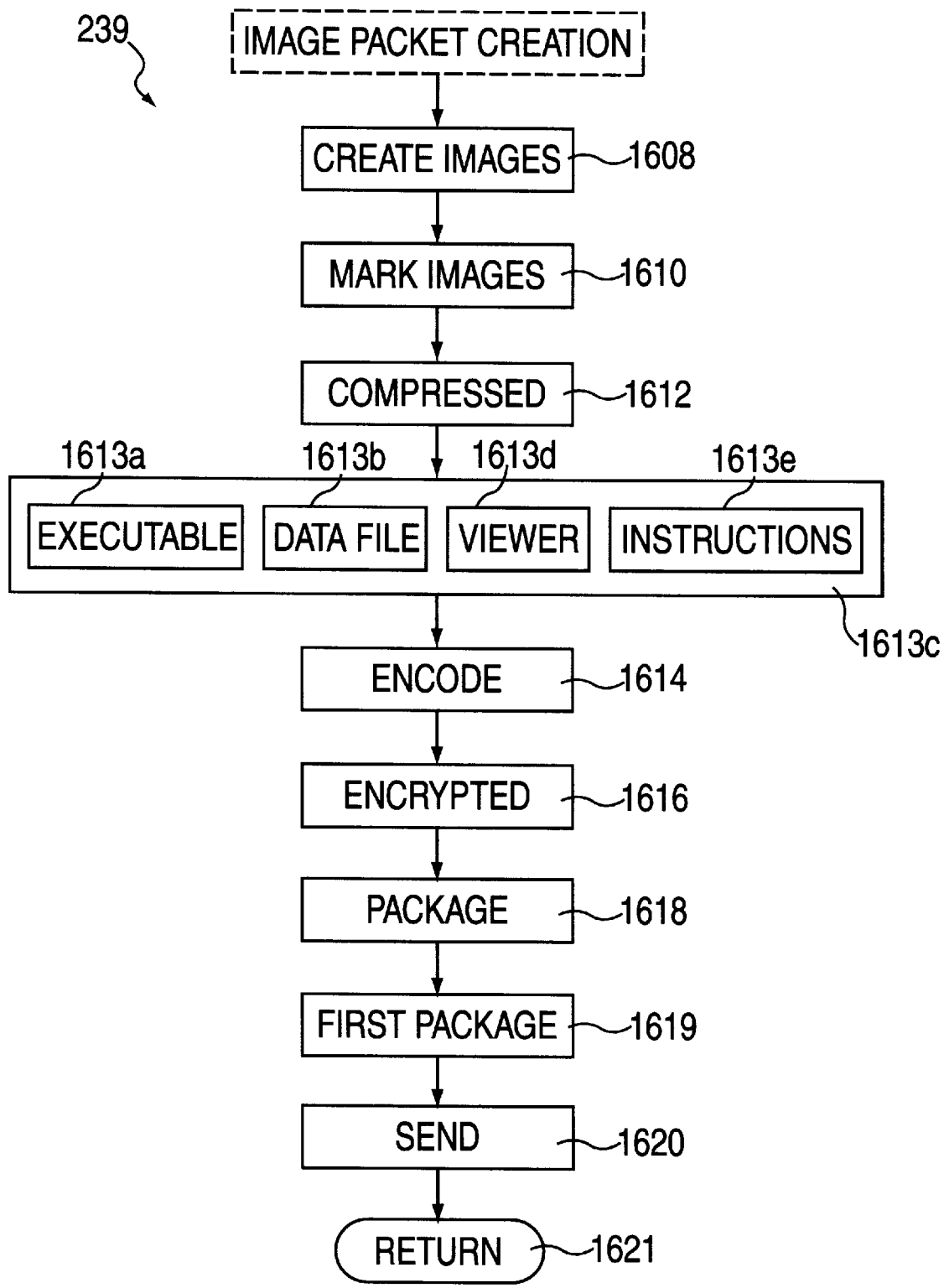
FIG. 30 is a schematic diagram of the image packet creation process for the system of FIG. 2.
Figure 31:
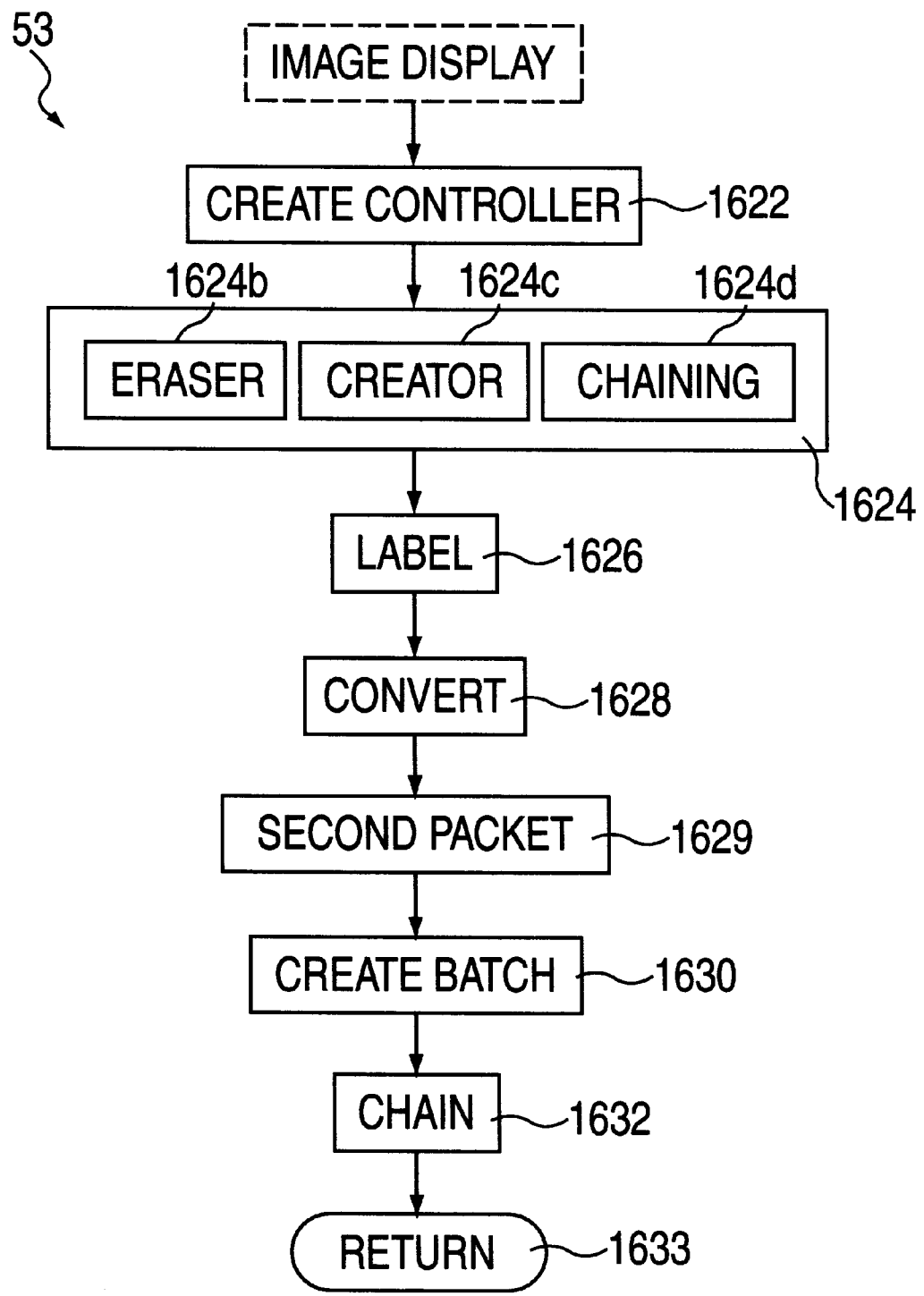
FIG. 31 is a schematic diagram of the image display process for the system of FIG. 3.

Referring now to FIGS. 30 and 31, the image packet module may comprise two processes 239 and 53. The image packet creation process 239 and the image display 53 may be used together by the system 50 to transfer image files that may not be duplicated or used in an unauthorized fashion, to the user system 60, to a client computer 56, to a customer computer 58, or through the network or inter network 54 to an image display device 53. The create image file 1608 step may involve creation of a displayable image. The file may be made using only characters that can be mapped on a one-to-one basis between ASCII characters and binary data representing pixels on an image display device 53. Thus, a mapping routine may read or write the file readily without finding uninterpretable characters in either character scheme, binary or ASCII.

The mark images 1610 process alters the image created by the step 1608 so that the image is only good for sample viewing. For example, a label such as "sample only" or the like may be written directly on the image, removing all other color and image representations in the space taken by the words of the marking. Thus, the image may not be used for other than the viewing purposes intended.

The compress 1612 process compresses all executable programs along with the data files for all images to be read. The compressed information is stored in a Self-Extracting Archive (SEA). The SEA may be run after appropriate decompression. The SEA contains all of the necessary executable instructions as well as the data for re-creating the images formed by the create image file step 1608.

The encode 1614 step produces a file called an archive file that converts all binary characters to an ASCII equivalent. The encrypt 1616 step takes all ASCII data from the step 1614 and encrypts it. For example, certain characters may be substituted for other characters, words may be written in reverse, and multiple manipulations of the order or content of words may be changed to prevent unauthorized decoding and decryption of files.

The package 1618 process creates a first packet 1619. The first packet 1619 is a file written in ASCII characters. The first packet 1619 contains the data and the executable program commands for presenting an image to a user on a computer display. The send 1620 process may use any suitable means to transfer the first packet 1619 to a client.

The first packet 1619 may include an executable 1613A contained in the instructions executable by a processor, and a data file 1613B containing the information from the image. Together, the executable 1613A and the data file 1613B form an archive file 1613C. The archive file 1613C may be compressed, encoded, encrypted, and packaged in the first packet 1619 as a single file, or may be manipulated as individual files before combining in the archive file 1613C.

The image display 53 may include several steps also. For example, a create 1622 process may create a controller program for manipulating and reading the first packet 1619. The controller program 1624A may be a command file such as a DOS batch file. The controller program 1624A may contain all the information necessary for decrypting, decoding, and decompressing the archive file 1613C, and the first packet 1619. In addition, the controller 1624A may include all data and executables required to display the image associated with the image data file 1613B. Information required to launch and operate the executable 1613A which permits a client to view the image corresponding to the data files 1613B may also be included in the controller 1624A. The controller 1624A may also include an eraser program 1624B for promptly erasing all executables upon execution in a client's computer.

After creating 1622 a controller, the controller is labeled 1626. Labeling may effectively be used to give misinformation. That is, inasmuch as certain commands exist in any operating system, and inasmuch as the operating system may look first in a file of the controller 1624A for a named executable, the controller 1624A may be labeled to have a name identical to a command having another meaning. Thus, the controller 1624A may be created as a hidden file, the name of which is deceptive, giving no clue as to the importance or capability of the controller 1624A.

A convert 1628 process may convert the controller 1624A to an ASCII string interpretable by DOS or other operating systems having assemblers and disassemblers. For example, the DEBUG function in DOS is an assembler and disassembler capable of interpreting ASCII strings.

The create batch 1630 step may be used to create a command batch file that may itself create and execute the controller 1624A as needed. In operation, a create batch 1630 step may write a creator 1624C. The creator 1624C may be a file that calls an assembler and disassembler, and feeds to the assembler/disassembler the ASCII string representing the converted controller program 1624A. The create batch 1630 process creates a file in binary code that is itself a command file. The command file may create and execute the controller 1624A.

After creation 1630 of the creator 1624C batch file, a chain 1632 step may be performed. In this context, chaining is used to indicate executing an executable which contains commands to, in turn, launch another executable. For example, the chain 1632 step may add a line to the batch file of the second packet 1629 either within the creator 1624C or as an additional line or executable such as the chaining executable 1624D. Thus, the chaining executable 1624D, in general, may be an executable suitable for chaining to an eraser 1624B. Likewise, the chaining executable 1624D may actually be located within the creator 1624C. Similarly, the controller 1624A may or may not be written explicitly within the second packet 1629. That is, the creator 1624C may simply be programmed to write a controller 1624A and execute it.

In operation, the creator 1624C may use an assembler/disassembler to regenerate the executable 1613A from the first packet 1619. Similarly, the creator 1624C may know all of the passwords, etc. necessary to decrypt, decompress, and decode the contents of the first packet 1619. Thus, the creator 1624C may unpack the first packet 1619 and run the executable 1613A using the data found in the data file 1613B.

The data file 1613B may include a viewer 1613D. The viewer 1613D may be an engine such as an executable for displaying GIF (graphical imaging format), TIFF (tagged image file format), or the like. The executable 1613A may also include viewer instructions 1613E readable by a user. In addition, the chaining executable 1624D, such as an eraser in the example, may also be included in the executable 1613A, or may instead be placed in the creator 1624C or simply placed in the second packet 1629 to run at the appropriate time after completion of the executable's 1613A other commands. The image files are stored as the data files 1613B.

Thus, the operation may be completed in one of several modes. However, one suitable mode in one embodiment of an apparatus made in accordance with the invention, may include running a creator 1624C by a user. The creator 1624C then writes a controller 1624A containing a list of commands to be executed by a processor. A controller 1624A then unpacks the first packet 1619 creating several individual files 1613A, 1613B from the first packet 1619. The controller 1624A may then launch the executable 1613A which may present to a user images corresponding to the data files 1613B. After display of the images, a chaining step 1624D may erase all files created. After the image display 53 has been completed control is return to the system by the return 1633.

Figure 32:
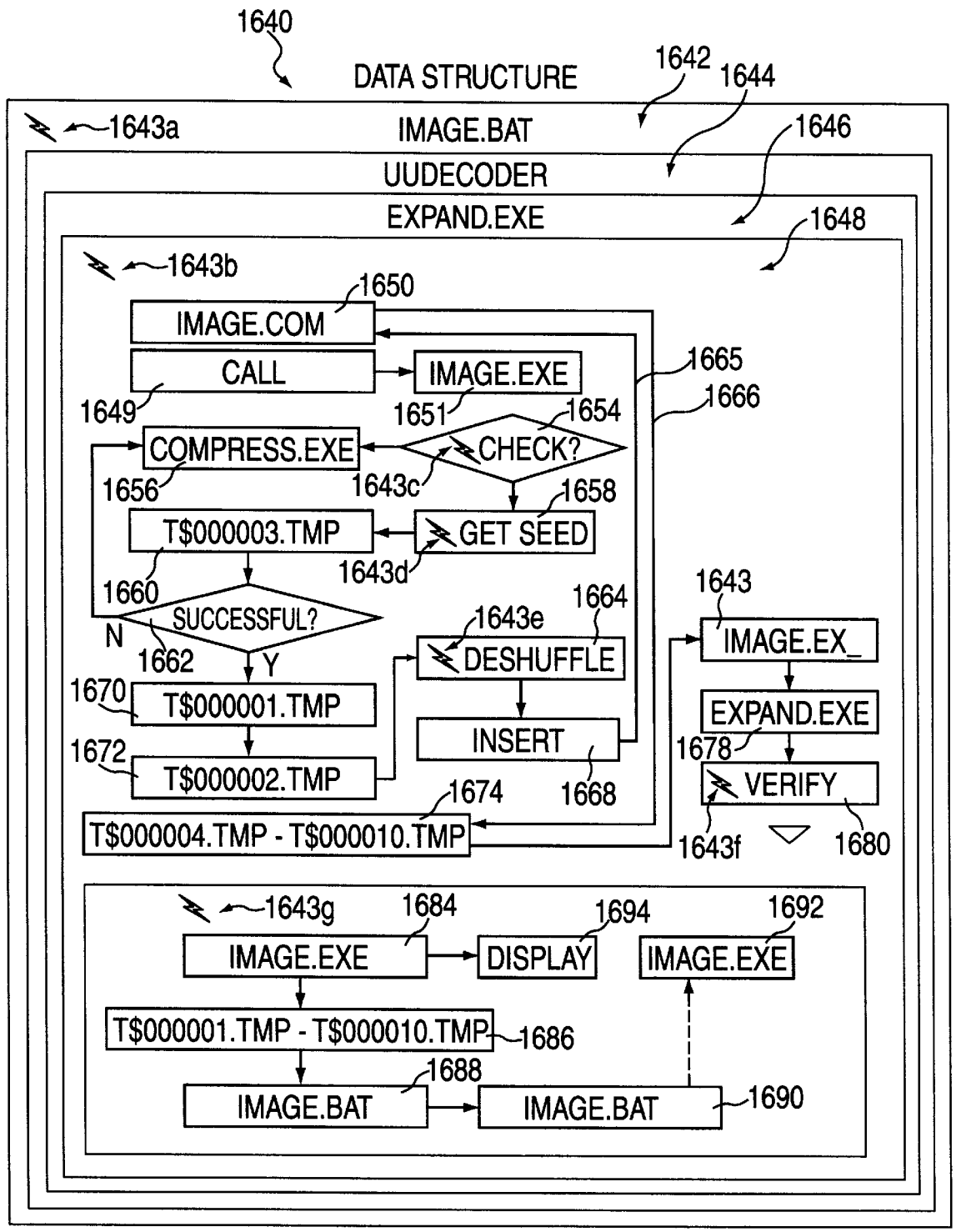
FIG. 32 is a schematic diagram of the image packet structure for the system of FIG. 3.

Referring now to FIG. 32, the data structure 1640 of an image may be forwarded to a client in any standard packet addressing format known in the art. In one embodiment, the data structure 1640 may have headers or trailers, as appropriate, to accomplish addressing functions as required by a network or inter network 54. In one embodiment, currently preferred, the substantive content of the IMAGE.BAT 1642 and the IMAGE.EX$_{13}$ 1643 may be comprised completely of seven-bit standard ASCII format files. ASCII files are also referred to as plain text files, as opposed to binary files. The data structure 1640 comprises, or may comprise in one embodiment, all of the elements 1642–1694. The IMAGE.BAT 1642 and the IMAGE.EX__ 1643 are actual files in one embodiment. All other processes and files may be stored only temporarily in memory or to some intermediate storage medium. Only the files 1642, 1643 need be sent to a client. The file 1643 may actually be embedded within the file 1642.

The remaining files and structures of the data structure 1640 may be thought of as a portion of memory in a computer. This portion may be filled and re-filled with different data during the process of creating and transmitting an image.

In one embodiment, the file 1642 may be a batch file. For example, the file 1642 may be a DOS batch file. In one embodiment, a file 1642 may access a DOS "DEBUG" command to create an assembly language code. This assembly language code may be used to construct an assembly language level program, such as the UUDECODER 1644. The file 1642, after creating the program 1644, then calls the program 1644 and executes the code therein.

The file 1642 may contain substantial data, written in ASCII, for example. Upon calling of the program 1644, the program 1644 may decode the remaining portion of the IMAGE.BAT file 1642. In this decoding process, the decoder program 1644 converts the remainder of the file 1642 from ASCII to binary format.

The output of the UUDECODER 1644 may be another file EXPAND.EXE 1646. The binary file 1646 created by the UUDECODER 1644 may be a self-extracting archive (SEA). Data compression may also be used for reducing all files contained in a self-extracting archive.

In general, a self-extracting archive (SEA) may be thought of as a file containing one or more compressed files of any type. Executing a SEA runs a module within the SEA, a portion of code or the like, that restores the compressed file or files to their uncompressed condition. Thus, the self-extracting archive contains both executable code and files which may be restored to become data or further executable files. Thus, in general, a SEA may be thought of as an executable file that contains within itself other files and the means to decompress those files.

As described above, the self-extracting archive 1646, file 1646, or EXPAND.EXE 1646 may be contained within the file 1644. Nevertheless, the self-extracting archive 1646 is called from within the file 1642.

A level of security is provided by the naming of the file 1646. The EXPAND.EXE command exists within DOS. However, the file 1642 will first search for a file, and then for a DOS command, if a file is not found. Thus, the EXPAND.EXE 1646 is executed by typing "EXPAND" from the DOS prompt seemingly invoking the DOS command "EXPAND". The EXPAND.EXE (SEA) may be created such that a password in the form of the file name "IMAGE.EX__" must be included after "EXPAND" to properly execute. Thus, by typing "Expand IMAGE.EX__" a user or program may appear to be calling the DOS command "EXPAND" to expand the IMAGE.EX__ file. The expected result being the file IMAGE.EXE. However, in fact, the user will actually be executing a SEA with a password to expand many files including a file labeled IMAGE.EXE which may be indistinguishable from an actual IMAGE.EXE file created by using the DOS "EXPAND" command. The EXPAND.EXE 1646 may also be hidden so that it will not appear in any directory. By using the hidden characteristic, the EXPAND.EXE 1646 will appear to be the DOS command, and not another executable file. Thus, it is not evident that a substitute for the DOS command by the same name has been made.

When a self-extracting archive is executed, it may create multiple files. For example, the SEA 1646, or file 1646, upon execution may form the files 1650, 1651, 1656, 1660, 1670, 1672, and 1674. All of the files created by the EXPAND.EXE 1646 may also be hidden with the exception of the IMAGE.EXE 1651 file.

Security may be provided at each appropriate level of calling or of self-extraction. For example, the symbols 1643a–1643g indicate engagement of certain security procedures. For example, at all levels, all batch files, command files, and executable files may be provided with the appropriate security procedures to determine if the security system's integrity has been breached. In one embodiment, the security procedure 1643*a*–1643*g* are invoked as shown upon entry into the appropriate file.

The CALL 1649 may be located within the batch file 1642. Once the CALL 1649 has been executed, control of the processor is transferred to the file 1651. The file 1651 may contain a security check 1654. The file 1651, in one embodiment, may be configured as IMAGE.EXE, as illustrated. Since the DOS "EXPAND" command would normally convert a file suffix, such as ".EX_" to ".EXE,", "EXPAND" appears to have operated exactly as expected. In reality, the file 1643, here IMAGE.EX_ has simply been converted to a hidden file. Thus, the IMAGE.EXE 1651 appears to be the file 1643, but is not. Only the file 1651 remains non-hidden. All other files created by the file 1646 are hidden files.

Since the file 1651 is now in control of the processor, the security check 1654 may look for a memory register set by file 1642 as an automatic artifact of the UUDECODER 1644. One should note that file names used here are arbitrary, and many times are used as misinformation. Thus, in general, any file 1642, 1644, 1646 may assume any desired name. In this embodiment, names have been used as a security measure to render reverse-engineering extremely difficult.

A negative response to the security check 1654 decision, will advance the process 1642 to the file 1656. The file 1656 may be, as shown in the example, a COMPRESS.EXE 1656. This executable may be used to restore certain files to their original condition, and to erase any artifacts of the procedures of the file 1642. Thus, the file 1656 may restore the process 1642 to its original state, destroying any information that might have been unpacked or created to this point in the procedures of the file 1642.

One may note that in many steps or processes of the file 1642, a security check may be engaged. A failure to pass a security check may result in a return of the process of file 1642 directly to the process 1656. Thus, the process 1656 or file 1656 may be invoked from almost any location within the data structure 1640 or the process 1642.

A positive response to the security check 1654 results in the engagement of the GET SEED process 1658. In one embodiment, a random position may be selected in the executable code of the file 1651. This location may be passed as a secret flag or other indicator. The GET SEED 1658 process may locate the key for decryption of a shuffling or text-encryption algorithms.

The self-extracting archive 1646, upon execution, may create a series of files 1660, 1670, 1672, 1674. Upon execution of the GET SEED 1658, decryption of an initial file 1660 may be attempted. If decryption fails, then the file 1642 returns to the file 1656. That is, the GET SEED 1658 attempts to read the file 1660 with the appropriate code key. Thus, the successful decision 1662 may return to the file 1656 immediately if the file 1660 cannot be read. On the other hand, if the file 1660 can be read, then the files 1660, 1670, 1672 may be read and executed in order.

The file 1670 may be a non-interruption application programming interface. Thus, any method of escape, break, or the like, would return a null signal to the microprocessor.

The process 1672 or file 1672 may be used to check all the upper memory blocks of a memory device and remove all TSRs (terminate and stay resident programs). The process 1664, illustrated here as text shuffling 1664, may access a module for providing a key to decrypt or to un-shuffle certain ASCII text in file 1674. Thus, the process 1664 or file 1664 may be certain instructions for providing a password key identifying a proper de-shuffling or un-shuffling sequence for subsequent files 1674, 1643. The actual sequence or instructions to construct the sequence may be read from the file 1650 via the path 1665 and returning via the path 1666, provided that the proper information has been provided within the file 1660. Thus, numerous keys are passed about among files. Without the appropriate key at the appropriate time, the system passes control back to the file 1656. The insert process 1668 executes only if the procedure 1643*e* has identified the sequence from the process 1664 as being the correct one. This may be done, for example, by determining whether or not the de-shuffling sequence of the process 1664 will provide a recognizable text string. Thus, the process 1643*e* may be thought of as a security process followed by a decision, or simply a security decision. Absent a positive result from any of the steps 1643*a*–1643*g*, or process 1643*a*–1643*g*, control of the file 1642 returns to the process 1656, a portion of the procedures of the file 1642.

The insert process 1668 may be a program for creating a decodable file. Thus, given the key or sequence provided by the process 1664, the process 1668 may create a decodable file to be used by the decoder 1644.

The procedures of the file 1644 may be used to transform the file created by the process 1668 into a file contained within the file 1678. That is, the process 1668 may actually create the file 1678. The process 1668 may actually read the files 1674 and the files 1643, creating from their joint contents, a file 1678. The file 1678 may be coded as a binary file. The file 1678 may be a self-extracting archive as explained earlier.

The process 1680, illustrated here as the verify 1680 may be used to determine whether or not all expected files have been created within the file 1678. If the file 1678 is as expected, then the verify 1680 may execute the self-extracting archive 1682. A barrier to verify in the process 1680 or to enter the process 1680 due to the security check 1643*f*, may result in the file 1642 or procedure 1642 returning to the process 1656, as explained above. Successful execution by the process 1680 will also erase all temporary files and procedures created by the file 1648 or procedure 1648 from all memory locations. This may include erasure from hard drives as well. When erasing from hard drives or magnetic media the process may include various "wiping" routines which destroy not only file addressing but also remove all ferromagnetic traces from magnetic surfaces within storage devices. The contents 1682 of the file 1678 may be executed after completion of the verify 1680.

As a practical matter within a DOS environment, a file may not be erased while resident in memory without causing an abnormal program termination. Because control initially transferred from the file 1642 to the file 1651 by virtue of the call 1649, the verify 1680 erases every file except for the file 1678. Execution of the file 1678 creates the files 1684, 1686, and 1688. Control is promptly transferred to the file 1684.

The file 1684, in the example labeled IMAGE.EXE 1684 may include a multi-media image presentation. For example, in one embodiment, a finished image packet may be presented as a binary module for displaying numerous images on a monitor or image display of a client. This presentation may also include video, sound, text, or hyper media. Upon execution, the file 1684 accesses the file 1686 (binary images) and the file 1688 (textual information). Upon termination of execution of the file 1684, the file 1684 appends itself onto a file 1688 and names the file IMAGE.BAT thereby replacing the files 1642 and 1688. Thus, the file 1690, labeled IMAGE.BAT 1690, has overwritten the files 1642 and 1688 and is composed of the textual information as well as binary program instructions. Thus, the file 1690 replaces the files 1642 and 1688 completely. The file 1684 thereupon calls the file 1690 and executes the file 1690. The recursive call of the file 1690 contains an instruction to erase all files generated by the process 1640 or data structure 1640. Prior to erasing all files, the file 1690 creates the file 1692. After creation of file 1692, the file 1690 executes the erasure of all other files. In one embodiment, the last instruction in the file 1690 may be an illegal instruction to destroy itself, causing an abnormal program termination.

It may be noted that the display 1694 may be generated by the file 1684. However, it may also be noted that upon changing a screen on a display or otherwise altering the image presented by the display 1694, the image is permanently lost. That is, the underlying graphics file 1686 has been destroyed, even while the image is represented on a display 1694.

The file 1690, by having the same label as the file 1642, appears to be the same file as the original file 1642. The file 1692 appears to be a legitimate result or outcome file of the process 1646, had the DOS "EXPAND" command been invoked. Thus, on its face, the file 1692, as well as the original file 1642, appear to do none of the steps 1646–1690.

To one observing the code of the file 1642, it appears that an image batch file (file 1642) is run and creates a UUDECODER 1644. This is to be expected whenever ASCII files are converted to binary files. The UUDECODER 1644 then appears to execute the DOS "EXPAND" command rather than the actual false "EXPAND" command, file 1646.

In DOS, an "EXPAND" command would be expected to generate a file labeled IMAGE.EXE from a starting file IMAGE.EX_. Thus, the presence of the file 1643, with a label such as IMAGE.EX_, would logically be interpreted to be the image data file. The IMAGE.EXE file 1692 would be expected to be the logical name of the executable form from the data file 1643.

Indeed, the last line of the file 1642 appears to invoke the IMAGE.EXE executable as expected. However, the IMAGE.EXE is not a DOS IMAGE.EXE file, but rather the control module IMAGE.EXE 1651.

Thus, after the file 1642 has been run, all files expected appear to be present. However, no image data actually exists in any remaining file. No information that can be recovered will produce an image. Moreover, all code keys are gone, so the procedure by which the files were created, keyed, and decoded has been destroyed.

Hence the image packet procedures for building image packets to be transferred as shown in FIG. 30, for displaying image packets as shown in FIG. 31, and the structure by which the image packet is created as shown in FIG. 32, provide a means to safely and securely transfer data from the system 50 through the use of a network or inter network 54 to the image display 53 which may be located on a client computer 56, the customer computer 58, the user computer 60 or any other computer system with a capability of receiving standard ASCII text files, such as by standard E-mail.

From the above discussion, it will be appreciated that the present invention provides a method and apparatus for creating, storing, identifying, transferring, managing, searching and retrieving information for non-deterministic, subjective works, such as art, music, film, dance, theater, or other fields generally recognized as requiring a human judge who is trained as an "expert" in the field in question to make a reasonable subjective as well as an objective decision. Thus, the invention embodies a method by which characteristics such as relationship between, similarity to, location, value, worth, interest, owners, and potential buyers and sellers can be evaluated through a deterministic (objective) as well as a fuzzy logic (subjective) expert system.

Moreover, the present invention provides for a means by which the information retrieved by using such a system can be transmitted to any user who is connected to a local area network, wide area network, network of local area or wide area networks, or publicly accessible inter networks in a secure fashion.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

APPENDIX: DATABASE STRUCTURE

Structure for database: CLIENT.DBF
Number of data records: 30285

| Field | Field Name | Type | Width | Dec | Index |
|---|---|---|---|---|---|
| 1 | ACCT_NO | Numeric | 9 | | Asc |
| 2 | CLI_CAT | Character | 1 | | |
| 3 | PRIO_FLAG | Character | 1 | | |
| 4 | STATUS | Character | 1 | | |
| 5 | GALLERY | Character | 30 | | Asc |
| 6 | CONTACT | Character | 30 | | Asc |
| 7 | OWNER | Character | 30 | | |
| 8 | HOURS | Character | 30 | | |
| 9 | ADDR_1 | Character | 30 | | |
| 10 | ADDR_2 | Character | 30 | | |
| 11 | CITY | Character | 19 | | |
| 12 | STATE | Character | 2 | | |
| 13 | ZIP | Character | 7 | | Asc |
| 14 | PHON_1 | Character | 21 | | Asc |
| 15 | PHON_2 | Character | 21 | | |
| 16 | FAX | Character | 13 | | |
| 17 | COUNTRY | Character | 25 | | |
| 18 | CNTRY_COD | Character | 1 | | |
| 19 | NOTES | Memo | 10 | | |

-continued

| | | | | | |
|---|---|---|---|---|---|
| 20 | CARD_NO | Character | 29 | | |
| 21 | NOTE_1 | Character | 30 | | |
| 22 | NOTE_2 | Character | 30 | | |
| 23 | NOTE_3 | Character | 30 | | |
| 24 | NOTE_FLAG | Character | 1 | | |
| 25 | BAL | Numeric | 7 | 2 | |
| 26 | TOT_BAL | Numeric | 7 | 2 | |
| 27 | CUR | Numeric | 7 | 2 | |
| 28 | OV_30 | Numeric | 7 | 2 | |
| 29 | OV_60 | Numeric | 7 | 2 | |
| 30 | OV_90 | Numeric | 7 | 2 | |
| 31 | OV_120 | Numeric | 7 | 2 | |
| 32 | ACTI_DATE | Date | 8 | | |
| 33 | OPEN_DATE | Date | 8 | | |
| 34 | FIRST_CALL | Date | 8 | | |
| 35 | FIRST_LIST | Date | 8 | | |
| 36 | FIRST_REF | Date | 8 | | |
| 37 | FIRST_PAY | Date | 8 | | |
| 38 | CUR_DUE | Date | 8 | | |
| 39 | DUE_DATE | Date | 8 | | |
| 40 | NEXT_LATE | Date | 8 | | |
| 41 | LAST_CALL | Date | 8 | | |
| 42 | UPD_DATE | Date | 8 | | |
| 43 | LREF_DATE | Date | 8 | | |
| 44 | LPAY_DATE | Date | 8 | | |
| 45 | RENEW_DAT | Date | 8 | | |
| 46 | CONTR_EXP | Date | 8 | | |
| 47 | STA_DATE | Date | 8 | | |
| 48 | LETTER_DAT | Date | 8 | | |
| 49 | CNTC_DATE | Date | 8 | | |
| 50 | LAST_INVC | Numeric | 6 | | |
| 51 | REFS_TOT | Numeric | 5 | | |
| 52 | REFS_MON | Numeric | 5 | | |
| 53 | LPAY_AMT | Numeric | 7 | 2 | |
| 54 | ITEM_TOT | Numeric | 6 | | |
| 55 | DISKT_FLAG | Character | 1 | | |
| 56 | PYMNTS | Numeric | 2 | | |
| 57 | AVG_REFER | Numeric | 9 | 2 | |
| 58 | DISK_TYPE | Character | 1 | | |
| 59 | LETTER_IND | Character | 1 | | Asc |
| 60 | AUTO_RENEW | Character | 1 | | |
| 61 | SOLD | Numeric | 5 | | |
| 62 | SOLD_AVG | Numeric | 8 | 2 | |
| 63 | USED_SCFL | Numeric | 5 | | |
| 64 | USED_UNSC | Numeric | 5 | | |
| 65 | RENEW_CT | Numeric | 3 | | |
| 66 | HAVE_DISK | Character | 1 | | |
| 67 | EXP_NUM | Numeric | 5 | | Asc |
| 68 | SOLD_BY | Character | 1 | | |
| 69 | COMM_FEE | Numeric | 5 | 2 | |
| 70 | CC_FEE | Numeric | 5 | 2 | |
| 71 | TIME_ZONE | Numeric | 4 | 1 | |
| 72 | TELE_CHCK | Character | 1 | | Desc |
| 73 | TELE_DATE | Date | 8 | | |
| 74 | TELE_TIME | Character | 5 | | Asc |
| 75 | VERIF | Character | 1 | | |
| | ** Total ** | | 731 | | |

Database Structure: F:\ARTPROG\CLIENT.DBF  Alias: CLIENT
Structural CDX file: F:\ARTPROG\CLIENT.CDX
    Index tag:      ACCT_NO    Key: ACCT_NO
    Index tag:      GALLERY    Key: GALLERY
    Index tag:      ZIP    Key: ZIP
    Index tag:      CONTACT    Key: CONTACT
    Index tag:      EXP_NUM    Key: EX_NUM
    Index tag:      PHON_1    Key: PHON_1
    Index tag:      TELE_TIME    Key: ALLTRIM(DTOC(TELE_DATE))+":
"+ALLTRIM(TELE_TIME)
    Index tag:      TELE_CHCK    Key:
ALLTRIM(TELE_CHCK)+"/"+ALLTRIM(STR(24+TIME_ZONE))+"/"+ALLTRIM(GA
LLERY) (Descending)
    Index tag:      LETTER_IND    Key: LETTER_IND
    Index tag:      ADDRESS    Key: ALLTRIM(ADDR_1)+", "+ALLTRIM(ADDR_2)
    Memo file:      F:\ARTPROG\CLIENT.FPT
Lock(s): <none>
==========================================
Structure for data base: CLI_INV.DBF
Number of data records: 83835

-continued

| Field | Field Name | Type | Width | Dec | Index |
|---|---|---|---|---|---|
| 1 | ACCT_NO | Numeric | 9 | | Asc |
| 2 | GALLERY | Character | 30 | | |
| 3 | STATUS | Character | 1 | | |
| 4 | OPEN_DATE | Date | 8 | | |
| 5 | FIRST_LIST | Date | 8 | | |
| 6 | CITY_KEY | Character | 20 | | |
| 7 | STATE_KEY | Character | 2 | | |
| 8 | ZIP_KEY | Character | 5 | | |
| 9 | ITEM_ID | Numeric | 6 | | Asc |
| 10 | PUBLISHER | Character | 24 | | |
| 11 | ITEM_NAM_1 | Character | 24 | | Asc |
| 12 | BY | Character | 24 | | Asc |
| 13 | PRICE | Numeric | 8 | | |
| 14 | WHOLESALE | Numeric | 8 | | |
| 15 | CDN_PRC | Logical | 1 | | |
| 16 | FRAMED | Character | 1 | | |
| 17 | CONDITION | Memo | 10 | | |
| 18 | ON_HAND | Numeric | 6 | | |
| 19 | UPD_DATE | Date | 8 | | |
| 20 | REF_FLAG | Character | 1 | | |
| 21 | WHOLE_Q | Character | 1 | | |
| 22 | NUM_REFS | Numeric | 6 | | |
| 23 | QUOTE_R | Character | 1 | | |
| 24 | CALL_Q | Character | 1 | | |
| 25 | WORK_TYPE | Character | 1 | | |
| 26 | ED_TYPE | Character | 10 | | |
| 27 | CATEGORY | Character | 16 | | |
| 28 | IMG_HIGH | Numeric | 6 | 2 | |
| 29 | IMG_WIDE | Numeric | 6 | 2 | |
| 30 | IMG_DEEP | Numeric | 6 | 2 | |
| 31 | CM | Logical | 1 | | |
| 32 | ISSUE_DATE | Character | 8 | | |
| 33 | ISSU_PRICE | Character | 8 | | |
| 34 | DESC_1 | Character | 24 | | |
| 35 | ED_SIZE | Character | 16 | | |
| 36 | R_AVG | Numeric | 7 | | |
| 37 | W_AVG | Numeric | 7 | | |
| 38 | W_LOW | Numeric | 7 | | |
| 39 | W_LOW2 | Numeric | 7 | | |
| 40 | W_LOW3 | Numeric | 7 | | |
| 41 | WPERCENT | Character | 5 | | |
| 42 | VERIF | Character | 1 | | Asc |
| 43 | PRIO_FLAG | Character | 1 | | |
| 44 | REF_STAT | Numeric | 2 | | |
| 45 | REF_ORD | Numeric | 12 | 2 | |
| 46 | REFS_TOT | Numeric | 4 | | |
| 47 | USED_SCFL | Numeric | 6 | | |
| 48 | ARTIST_COD | Numeric | 6 | | Asc |
| 49 | PUBCODE | Numeric | 6 | | Asc |
| 50 | USER | Character | 10 | | |
| | ** Total ** | | 404 | | |

```
Database Structure:   F:\ARTPROG\CLI_INV.DBF    Alias: CLI_INV
Structural CDX file:   F:\ARTPROG\CLI_INV.CDX
       Index tag:       ACCT_NO    Key: ACCT_NO
       Index tag:       ITEM_ID    Key: ITEM_ID
       Index tag:       ITEM_NAM_1   Key: ITEM_NAM_1
       Index tag:       BY  Key: BY
       Index tag:       VERIF    Key: VERIF
       Index tag:       STND    Key: BY+ITEM_NAM_1+ED_TYPE
       Index tag:       ARTIST_COD    Key: ARTIST_COD
       Index tag:       PUBCODE    Key: PUBCODE
       Index tag:       ACC_ITEM    Key:
 (ALLTRIM(STR(ACCT_NO))+"/"+ALLTRIM(STR(ITEM_ID)))
       Index tag:       ACC_NAM    Key:
 ALLTRIM(STR(ACCT_NO))+"/"+BY+ITEM_NAM_1+ED_TYPE
       Memo file:       F:\ARTPROG\CLI_INV.FPT
   Lock(s): <none>
========================================
Structure for:  ARTPROG\INV_MAS.DBF
Number of data records: 91910
```

| | | | | | |
|---|---|---|---|---|---|
| 1 | ITEM_ID | Numeric | 6 | | Asc |
| 2 | PUBLISHER | Character | 24 | | |
| 3 | ITEM_NAM_1 | Character | 40 | | Asc |
| 4 | BY | Character | 35 | | Asc |
| 5 | BY_LAST | Character | 35 | | Asc |
| 6 | BY_FIRST | Character | 17 | | Asc |

-continued

| | | | | | |
|---|---|---|---|---|---|
| 7 | DESC_1 | Character | 24 | | |
| 8 | CATEGORY | Character | 16 | | |
| 9 | ED_TYPE | Character | 10 | | |
| 10 | ED_SIZE | Character | 16 | | |
| 11 | ISSUE_DATE | Character | 8 | | |
| 12 | IMG_HIGH | Numeric | 6 | 2 | |
| 13 | IMG_WIDE | Numeric | 6 | 2 | |
| 14 | IMG_DEEP | Numeric | 6 | 2 | |
| 15 | CM | Logical | 1 | | |
| 16 | CATALOG | Character | 30 | | |
| 17 | ISSU_PRICE | Character | 8 | | |
| 18 | WORK_TYPE | Character | 1 | | |
| 19 | IMAGE | Character | 1 | | |
| 20 | ARTIST_COD | Numeric | 6 | | Asc |
| 21 | PUBCODE | Numeric | 5 | | Asc |
| 22 | R_LOW | Numeric | 7 | | |
| 23 | R_HIGH | Numeric | 7 | | |
| 24 | R_AVG | Numeric | 7 | | |
| 25 | R_ON_HAND | Numeric | 6 | | |
| 26 | W_LOW | Numeric | 7 | | |
| 27 | W_LOW2 | Numeric | 7 | | |
| 28 | W_LOW3 | Numeric | 7 | | |
| 29 | W_HIGH | Numeric | 7 | | |
| 30 | W_AVG | Numeric | 7 | | |
| 31 | W_ON_HAND | Numeric | 6 | | |
| 32 | RTREND | Character | 1 | | |
| 33 | WTREND | Character | 1 | | |
| 34 | RPERCENT | Character | 5 | | |
| 35 | WPERCENT | Character | 5 | | |
| 36 | NUM_REFS | Numeric | 6 | | |
| 37 | COLOR | Character | 16 | | |
| 38 | SUPPORT | Character | 16 | | |
| 39 | REFS_MON | Numeric | 5 | | |
| | ** Total ** | | 425 | | |

Database Structure:  F:\ARTPROG\INV_MAS.DBF    Alias: INV_MAS
Structural CDX file:        F:\ARTPROG\INV_MAS.CDX
    Index tag:          ITEM_ID     Key: ITEM_ID
    Index tag:          ITEM_NAM_1   Key: ITEM_NAM_1
    Index tag:          BY   Key: BY
    Index tag:          ARTIST_COD     Key: ARTIST_COD
    Index tag:          PUBCODE     Key: PUBCODE
    Index tag:          STND      Key: BY+ITEM_NAM_1
    Index tag:          HOT     Key: NUM_REFS (Descending)
    Index tag:          BY_LAST     Key: ALLTRIM(BY_FIRST)+"
"+ALLTRIM(BY_LAST)
    Index tag:          BY_FIRST     Key: ALLTRIM(BY_FIRST)+"
"+ALLTRIM(BY_LAST)
Lock(s): <none>
==========================================
Structure for database: ARTIST.DBF
Number of data records: 37402

| Field | Field Name | Type | Width | Dec | Index |
|---|---|---|---|---|---|
| 1 | BY_LAST | Character | 35 | | |
| 2 | BY_FIRST | Character | 17 | | Asc |
| 3 | PUBLISHER | Character | 120 | | |
| 4 | ARTIST_COD | Numeric | 6 | | Asc |
| 5 | NOTES | Memo | 10 | | |
| 6 | RECNUM | Numeric | 7 | | Asc |
| 7 | MARK | Character | 1 | | |
| 8 | AKA | Character | 45 | | |
| 9 | YEAR | Character | 10 | | |
| 10 | ORIG | Character | 10 | | |
| 11 | NUM_ITEMS | Numeric | 4 | | |
| | ** Total ** | | 266 | | |

Database Structure:  F:\ARTPROG\ARTIST.DBF    Alias: ARTIST
Structural CDX file:        F:\ARTPROG\ARTIST.CDX
    Index tag:          ARTIST_COD     Key: ARTIST_COD
    Index tag:          RECNUM     Key: RECNUM
    Index tag:          STND    Key: ALLTRIM(BY_LAST)+", "+ALLTRIM(BY_FIRST)
    Index tag:          BY_FIRST       Key: ALLTRIM(BY_FIRST)+"
"+ALLTRIM(BY_LAST)
    Index tag:          SND_LAST      Key: SOUNDEX(BY_LAST)
    Index tag:          SND_FIRST     Key: SOUNDEX(BY_FIRST)
    Memo file:         F:\ARTPROG\ARTIST.FPT
Lock(s): <none>

I claim:

1. An apparatus for searching a set of databases, the apparatus comprising:
a processor programmed to execute a search engine for conducting a search, the search engine being programmed to selectively control interaction and sequencing of sub-engines during the search, the sub-engines comprising:
a standard search sub-engine for performing a deterministic search,
a key-word search sub-engine for performing a textual search, and
a query search sub-engine for performing a fuzzy logic search, the sub-engines substantially simultaneously loaded to run in the processor to search the set of databases;
a storage device operably connected to the processor for storing a plurality of searchable databases from the set of databases, each of the searchable databases comprising a plurality of fields containing data;
a memory device having a plurality of blocks of memory, the memory device being operably connected to the processor to store selected data selected from the plurality of searchable databases; and
an input device operably connected to the processor for providing inputs to the processor in response to actuation of the input device by a user.

2. The apparatus of claim 1 further comprising a network interface device for communicating transferable data between the processor and a remote computer.

3. The apparatus of claim 2 wherein the transferable data further corresponds to digital image data representing a visual image recognizable by a user.

4. The apparatus of claim 3, wherein the processor is further programmed to operate a security process effective to transfer the digital image data to the remote computer in a format effective to be displayed by the remote computer and effective to prohibit retention of a copy of the digital image data within the remote computer.

5. The apparatus of claim 4, wherein the digital image data is transferable as an ASCII text file directly executable by the remote computer as assembled source code.

6. The apparatus of claim 5, wherein the ASCII text file is self destructive during successful execution.

7. The apparatus of claim 1, wherein each searchable database of the plurality of searchable databases is not directly related to any other searchable database of the plurality of searchable databases.

8. The apparatus of claim 7, wherein each searchable database of the plurality of searchable databases is not directly relatable to any other searchable database of the plurality of searchable databases.

9. A memory device programmable by a programmer, and operable by a user to be operably connectable to a processor for storing and accessing information corresponding to articles sought by a user, the memory device comprising:
a first memory block programmed to store a first database comprising at least one first record comprising at least one first field containing first field data;
a second memory block programmed to store a second database, unrelated to the first database, and comprising at least one second record comprising at least one second field containing second field data;
a third memory block programmed to store at least one index comprising at least one index record linking the at least one first record to the at least one second record according to a fuzzy logic relationship identified by the processor and corresponding to a subjective observation programmed into the processor by the user; and
a fourth memory block containing a search engine for execution by the processor for conducting a search, the engine being programmed to selectively control interaction and sequencing of sub-engines during the search, the sub-engines comprising:
a standard search sub-engine for peforming a deterministic search,
a key-word search sub-enginie for performing a textual search, and
a query search sub-engine for performing a fuzzy logic seach,
the sub-engines substantially simultaneously loaded to run in the processor to search the set of databases.

10. The memory device of claim 9, wherein the first database and second database are deterministically unrelatable to each other.

11. The memory device of claim 9, wherein the first database and second database are unrelatable to each other by objective criteria observable in the contents of the at least one first record and contents of the at least one second record.

12. The imemory device of claim 9, wherein the first memory block is programmed to store a plurality of databases, the second memory block is programmed to store a plurality of second databases, and the third memory block is programmmed to store a plurality of indices.

13. The memory device of claim 12, wherein each index record of the plurality of indices creates a correspondence between a record of the plurality of first records and a record of the plurality of second records, and wherein each index record relates exclusively by fuzzy logic the plurality of first databases to the plurality of second databases.

14. The memory device of claim 9 further comprising a fourth memory block programmed to store a pointer identifying a first location, in the memory device, of a first current record currently selected from the first database and a second location, in the memory device, corresponding to a second current record selected from the second database.

15. The memory device of claim 14, wherein changing the pointer to indicate a new first record in the at least one first database automatically changes the pointer to indicate a new second record in the at least one second database according to a correspondence of the new first record to the new second record in the at least one index.

16. The memory device of claim 9 further comprising a fourth memory block programmed to store a plurality of pointers, each pointer of the plurality of pointers identifying a location, in the memory device, of a currently selected record of the at least one record, and wherein the memory device is controlled by the processor to adjust every pointer of the plurality of pointers in response to a change of any pointer of the plurality of pointers.

17. A method for searching a set of non-linear databases, each non-linear database containing a plurality of records retrievable by the method, using a plurality of search processes relying on deterministic logic and fuzzy logic, the search processes operating on at least one processor simultaneously, and the method comprising:
providing at least one processor operable to receive digital data and programming instructions;
programming the at least one processor to operate a deterministic search sub-engine;
programming the at least one processor to operate a key-word search sub-engine;

programming the at least one processor to operate a query search sub-engine operable according to a fuzzy logic search methods; and programming the at least one processor to operate a search engine for performing a search and selectively controling interaction and sequencing of the sub-engines during the search.

18. The method of claim 17, wherein the key-word search is operable according to a simplified fuzzy logic search method.

19. The method of claim 18, wherein the fuzzy logic search method contains a first series of steps, and wherein the simplified fuzzy logic search method comprises a second series of steps selected from the first series of steps.

20. The method of claim 17, wherein the fuzzy search comprises a degradation process effective to selectively increase the number of records retrievable by the fuzzy search.

21. The method of claim 20, wherein the degradation process comprises a process selected from a swapping process, truncation process, ignoring process, and a synonym process.

22. The method of claim 20, wherein the degradation process includes a plurality of search criteria, and comprises an optimization process effective to eliminate from consideration a search criterion of the plurality of search criteria according to a priority associated with the search criterion.

23. The method of claim 20, wherein each record of the plurality of records corresponds to an article of a plurality of articles, and wherein the degradation process further comprises a linking routine effective to identify a record corresponding to a substitute article of the plurality of articles when no record is found corresponding to the article.

24. The method of claim 23 further comprising a findlinks routine effective to provide additional information to a user when the degradation process fails to identify a substitute article.

25. The method of claim 17 further comprising a training routine comprising an index, a monitoring routine, and a modifying routine, the index relating a pair of non-linear databases of the set of non-linear databases, and the monitoring routine effective to monitor search results provided by the fuzzy logic search method and to provide a monitor output to the modifying routine, and the modifying routine providing a modifying output to the processor effective to limit the search results according to a limiting criterion.

26. The method of claim 17 further comprising an input process operable by a user to input at least one fuzzy relational operator for use by the fuzzy logic search method.

27. The method of claim 26 wherein a fuzzy relational operator of the at least one fuzzy relational operator is selected from the group consisting of phonetic, lexical, morphological, and syntactical operators.

28. The method of claim 17 further comprising an input process operable by a user to input search criteria into the fuzzy logic search method using natural language.

29. The method of claim 28 wherein the input process further comprises presenting an interactive display operable by a user to communicate data to the fuzzy logic search method.

30. The method of claim 17 further comprising an expert selection process for providing to the fuzzy logic search method a selection criterion in response to an input provided by a user.

31. An apparatus for searching a set of databases, the apparatus comprising:

a processor programmed to operate sub-engines controlled by a search engine, the sub-engine comprising:

a standard search sub-engine for performing a deterministic search integrated with an integrated sub-engine selected from a key-word search sub-engine for performing a textual search, and a query search sub-engine for performing a fuzzy logic search, the standard sub-engine and integrated engine executing substantially simultaneously in the processor to search the set of databases, the search engine invokes a first sub-engine according to criteria reflecting the results of the search of a second sub-engine;

a storage device operably connected to the processor for storing a plurality of searchable databases from the set of databases, each of the searchable databases comprising a plurality of fields containing data;

a memory device having a plurality of blocks of memory, the memory device being operably connected to the processor to store selected data selected from the plurality of searchable databases; and an input device operably connected to the processor for providing inputs to the processor in resonse to actuation of the input device by a user.

32. The apparatus of claim 31 wherein the memory device further stores at least one index comprising at least one index record linking at least one first record to at least one second record according to a fuzzy logic relationship identified by the processor and corresponding to a subjective observation programmed into the processor, and wherein the integrated process is programmed to use an index.

33. The apparatus of claim 31, wherein the memory device further stores data structures comprising:

a first memory block programmed to store a first database comprising at least one first record comprising at least one first field containing first field data;

a second memory block programmed to store a second database, unrelated to the first database, and comprising at least one second record comprising at least one second field containing second field data;

a third memory block programmed to store at least one index comprising at least one index record linking the at least one first record to the at least one second record according to a fuzzy logic relationship identified by the processor and corresponding to a subjective observation programmed into the processor by the user.

* * * * *